US012372919B2

(12) United States Patent
Zhong et al.

(10) Patent No.: US 12,372,919 B2
(45) Date of Patent: Jul. 29, 2025

(54) PROCESS CARTRIDGE

(71) Applicant: Zhuhai Ninestar Information Technology Co., Ltd, Zhuhai (CN)

(72) Inventors: Baosheng Zhong, Zhuhai (CN); Jialu Yu, Zhuhai (CN); Yinghao Li, Zhuhai (CN); Likun Zeng, Zhuhai (CN); Qin Luo, Zhuhai (CN); Qijie Liang, Zhuhai (CN); Yang Jin, Zhuhai (CN); Roujuan Chen, Zhuhai (CN); Yu Chen, Zhuhai (CN); Hailong Ma, Zhuhai (CN); Jingna Xing, Zhuhai (CN)

(73) Assignee: Zhuhai Ninestar Information Technology Co., Ltd, Zhuhai (CN)

( * ) Notice: Subject to any disclaimer, the term of this patent is extended or adjusted under 35 U.S.C. 154(b) by 0 days.

(21) Appl. No.: 18/801,839

(22) Filed: Aug. 13, 2024

(65) Prior Publication Data

US 2025/0013194 A1 Jan. 9, 2025

Related U.S. Application Data

(63) Continuation of application No. PCT/CN2024/080547, filed on Mar. 7, 2024, and a (Continued)

(30) Foreign Application Priority Data

Jun. 8, 2022 (CN) ......................... 202221435791.7
Jun. 15, 2022 (CN) ......................... 202221501591.7

(Continued)

(51) Int. Cl.
*G03G 21/18* (2006.01)

(52) U.S. Cl.
CPC ..... *G03G 21/1857* (2013.01); *G03G 21/1814* (2013.01)

(58) Field of Classification Search
CPC ............. G03G 15/757; G03G 21/1814; G03G 21/1857; G03G 21/186

(Continued)

(56) References Cited

U.S. PATENT DOCUMENTS 10,877,434 B2 * 12/2020 Sato ................... G03G 21/1647
10,962,905 B1 * 3/2021 Boettcher .......... G03G 15/0881

(Continued)

FOREIGN PATENT DOCUMENTS

CN 1920701 A 2/2007
CN 104423239 A 3/2015

(Continued)

OTHER PUBLICATIONS

The World Intellectual Property Organization (WIPO) International Search Report for PCT/CN2023/099098 Sep. 11, 2023 7 Pages (including translation).

*Primary Examiner* — Hoang X Ngo
(74) *Attorney, Agent, or Firm* — Anova Law Group, PLLC

(57) ABSTRACT

The present disclosure provides a process cartridge. The process cartridge includes a drum unit, including a photosensitive drum; a developing unit, including a developing roller, where the developing unit is capable of moving relative to the drum unit between a first position where the developing roller is in contact with the photosensitive drum and a second position where the developing roller is separated from the photosensitive drum; a first force-receiving part, configured to receive a rotational driving force to be transmitted to the photosensitive drum; a second force-receiving part, configured to receive the rotational driving force to be transmitted to the developing roller; and a driving-side end cover, where the driving-side end cover includes a hole and a notch portion, a portion of the first force-receiving part is exposed through the hole, and a (Continued)

portion of the second force-receiving part is exposed through the notch portion.

20 Claims, 78 Drawing Sheets

Related U.S. Application Data continuation of application No. PCT/CN2023/099098, filed on Jun. 8, 2023.

(30) Foreign Application Priority Data

| | | |
|---|---|---|
| Oct. 18, 2022 | (CN) | 202222743725.2 |
| Dec. 12, 2022 | (CN) | 202223355376.3 |
| Feb. 21, 2023 | (CN) | 202320289429.1 |
| Mar. 29, 2023 | (CN) | 202320679262.X |
| Mar. 30, 2023 | (CN) | 202320681971.1 |
| Apr. 28, 2023 | (CN) | 202321047783.X |
| Jun. 6, 2023 | (CN) | 202321435871.7 |
| Aug. 9, 2023 | (CN) | 202322143414.7 |

(58) Field of Classification Search
USPC .......................................................... 399/167
See application file for complete search history.

(56) References Cited

U.S. PATENT DOCUMENTS

| | | | | |
|---|---|---|---|---|
| 2008/0138114 | A1* | 6/2008 | Chadani | G03G 15/757 399/167 |
| 2016/0216678 | A1* | 7/2016 | Kobayashi | G03G 21/1821 |
| 2021/0109478 | A1 | 4/2021 | Maeshima et al. | |
| 2022/0100121 | A1* | 3/2022 | Zhou | G03G 15/087 |
| 2022/0404759 | A1* | 12/2022 | Itabashi | G03G 21/1821 |

FOREIGN PATENT DOCUMENTS

| | | | |
|---|---|---|---|
| CN | 206411427 | U | 8/2017 |
| CN | 108398871 | A | 8/2018 |
| CN | 110647022 | A | 1/2020 |
| CN | 111665701 | A | 9/2020 |
| CN | 212623578 | U | 2/2021 |
| CN | 113608420 | A | 11/2021 |
| CN | 113671811 | U | 11/2021 |
| CN | 215297959 | U | 12/2021 |
| CN | 114077182 | A | 2/2022 |
| JP | H06258932 | A | 9/1994 |

* cited by examiner

PROCESS CARTRIDGE

CROSS-REFERENCE TO RELATED APPLICATION

This application is a continuation application of PCT Patent Application No. PCT/CN2023/099098, filed on Jun. 8, 2023, which claims the priority to Chinese patent application No. 202221435791.7, filed on Jun. 8, 2022, No. 202221501591.7, filed on Jun. 15, 2022, No. 202222743725.2, filed on Oct. 18, 2022, No. 202223355376.3, filed on Dec. 12, 2022, No. 202320289429.1, filed on Feb. 21, 2023, and No. 202320679262.X, filed on Mar. 29, 2023; and PCT Patent Application No. PCT/CN2024/080547, filed on Mar. 7, 2024, which claims the priority to Chinese patent application No. 202320681971.1, filed on Mar. 30, 2023, No. 202321047783.X, filed on Apr. 28, 2023, No. 202321435871.7, filed on Jun. 6, 2023, and No. 202322143414.7, filed on Aug. 9, 2023, the entirety of all of which is incorporated herein by reference.

TECHNICAL FIELD

The present disclosure generally relates to the field of image-forming apparatus technology and, more particularly, relates to a process cartridge.

BACKGROUND

Electronic image-forming apparatuses utilize electrophotographic image-forming processes to form images on recording materials such as paper. Examples of electronic image-forming apparatuses may include electrophotographic copiers, electrophotographic printers, fax machines, word processors, and the like. A process cartridge may include at least one of an electrophotographic photosensitive drum as a photosensitive member or unit and a developing member or unit (such as a developing roller) capable of acting on the photosensitive drum. The photosensitive member and the developing member may also be integrally configured to form a cartridge (referred to as the process cartridge) detachably installed in the electronic image-forming apparatus. The frame including the photosensitive member in the process cartridge may be a photosensitive frame, and the frame including the developing member may be a developing frame.

In the existing technology, such type of process cartridge adopts a dual-drive structure. That is, one driving head is configured on the photosensitive frame, and one driving head is also configured on the developing frame. The driving head on the photosensitive frame drives the photosensitive member, and the driving head on the developing frame drives the developing member. Such dual-driving method has a relatively complex structure and high cost.

SUMMARY

One aspect of the present disclosure provides a process cartridge. The process cartridge includes a drum unit, including a photosensitive drum and a photosensitive frame; a developing unit, including a developing roller and a developing frame, where the developing unit is capable of moving relative to the drum unit between a first position in which the developing roller contacts the photosensitive drum and a second position in which the developing roller is separated from the photosensitive drum; a first force-receiving part, configured to receive a rotational driving force and transmit the rotational driving force to the photosensitive drum; a second force-receiving part, configured to receive the rotational driving force and transmit the rotational driving force to the developing roller; and a driving-side end cover, disposed at one end of the developing unit, where the driving-side end cover includes a hole and a notch portion; the notch portion extends upward to an upper end of the driving-side end cover; a portion of the first force-receiving part is exposed to outside of the driving-side end cover through the hole; and a portion of the second force-receiving part is exposed to outside of the driving-side end cover through the notch portion.

Another aspect of the present disclosure provides a process cartridge. The process cartridge includes a drum unit, including a photosensitive drum and a photosensitive frame; a developing unit, including a developing roller and a developing frame, where the developing unit is capable of moving relative to the drum unit between a first position in which the developing roller contacts the photosensitive drum and a second position in which the developing roller is separated from the photosensitive drum; a first coupling, configured to receive a rotational driving force and transmit the rotational driving force to the photosensitive drum; a second coupling, configured to receive the rotational driving force and transmit the rotational driving force to the developing roller; and a driving-side end cover disposed at one end of the developing unit, where the driving-side end cover includes a hole and a notch portion; the notch portion extends upward and backward to an upper end and a rear end of the driving-side end cover; a portion of the first coupling is exposed to outside of the driving-side end cover through the hole; and a portion of the second coupling is exposed through the notch portion.

Another aspect of the present disclosure provides a process cartridge. The process cartridge includes a drum unit, including a photosensitive drum and a photosensitive frame; a developing unit, including a developing roller and a developing frame, where the developing unit is capable of moving relative to the drum unit between a first position in which the developing roller contacts the photosensitive drum and a second position in which the developing roller is separated from the photosensitive drum; a first coupling, configured to receive a rotational driving force and transmit the rotational driving force to the photosensitive drum; a second coupling, configured to receive the rotational driving force and transmit the rotational driving force to the developing roller; a driving-side end cover, disposed at one end of the developing unit, where the driving-side end cover includes a hole through which a portion of the first coupling is exposed to outside of the driving-side end cover; and a connecting portion, where the developing unit is movably connected with the drum unit; the connecting portion is disposed at one end of the process cartridge; and the connecting portion is positioned below a rotation axis of the second coupling along a height direction of the process cartridge.

Another aspect of the present disclosure provides a process cartridge. The process cartridge includes a drum unit, including a photosensitive drum and a photosensitive frame; a developing unit, including a developing roller and a developing frame, where the developing unit is capable of moving relative to the drum unit between a first position in which the developing roller contacts the photosensitive drum and a second position in which the developing roller is separated from the photosensitive drum; a connecting portion at which the developing unit is movably connected with the drum unit, the connecting portion is disposed at one end of the process cartridge; a first coupling, configured to receive a rotational driving force and transmit the rotational driving force to the photosensitive drum; a second coupling, configured to receive the rotational driving force and transmit the rotational driving force to the developing roller; and a driving-side end cover, disposed at one end of the developing unit, where the driving-side end cover includes a hole and a notch portion; the notch portion extends upward to an upper end of the driving-side end cover or extends backward to a rear end of the driving-side end cover; a portion of the first coupling is exposed to outside of the driving-side end cover through the hole; a portion of the second coupling is exposed to outside of the driving-side end cover through the notch portion.

Other aspects of the present disclosure may be understood by those skilled in the art in light of the description, the claims, and the drawings of the present disclosure.

Compared with the existing technology, the present disclosure adopts a single driving mode, the electronic image-forming apparatus only needs to be disposed with one driving head, and the process cartridge also only needs to be disposed with a coupling for receiving rotational force. The structure of the electronic image-forming apparatus and the process cartridge is relatively simple with reduced cost.

DETAILED DESCRIPTION

Figure 1:
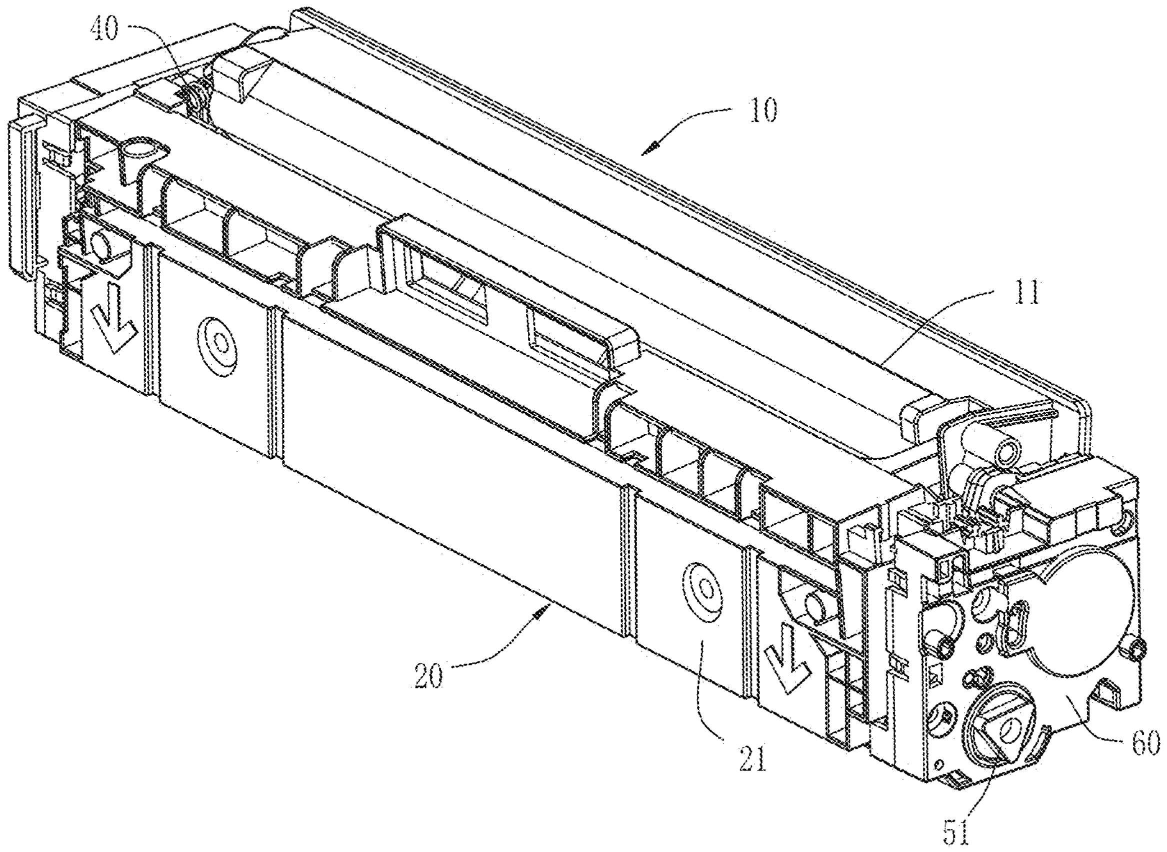
FIG. 1 illustrates a structural schematic of a process cartridge from a viewing angle according to exemplary embodiment one of the present disclosure.

In order to make the purpose, technical solution and advantages of the present disclosure more clearly understood, the present disclosure is further described in detail below in conjunction with accompanying drawings and embodiments. It should be understood that specific embodiments described herein are only used to explain the present disclosure and are not used to limit the present disclosure.

In the description of the present disclosure, unless otherwise clearly specified and limited, the terms “first”, “second” and the like are only used for descriptive purposes and cannot be understood as indicating or implying relative importance. Unless otherwise specified or explained, the term “a plurality of” means two or more, and the term “multiple types” means two or more types. The terms “connection”, “fixation” and other terms should be understood in a broad sense. For example, “connection” may be a fixed connection, a detachable connection or an integral connection; an electrical connection; and may be a direct connection or an indirect connection through an intermediate medium.

In the description of the present disclosure, it should be understood that the directional words such as “on”, “below” and the like described in embodiments of the present disclosure are described at the angles shown in accompanying drawings, which may not be understood as the limitation on embodiments of the present disclosure. In addition, in the context, it also should be understood that when an element is connected “on” or “below” another element, it may not only be directly connected “on” or “below” another element but also can be indirectly connected “on” or “under” another element through an intermediate element.

Electronic image-forming apparatuses form images on recording materials using, for example, electrophotographic image-forming processes. Electronic image-forming apparatus may include, for example, electrophotographic copiers, electrophotographic printers (LED printers, laser printers and the like), electrophotographic printer-type fax machines, and the like. The process cartridge may be detachably installed in the electronic image-forming apparatus and include a photosensitive drum, a developing roller for developing an electrostatic latent image formed on the photosensitive drum, and the like. The electronic image-forming apparatus may include a driving head, configured to transmit the driving force of the electronic image-forming apparatus to the process cartridge, thereby making the process cartridge to operate.

The orientation description is specified as the following.

The directions A1 and A2 are the first directions, the direction indicated by A1 is the positive direction of the first direction, and the direction indicated by A2 is the negative direction of the first direction.

The directions B1 and B2 are the second directions, the direction indicated by B1 is the positive direction of the second direction, and the direction indicated by B2 is the negative direction of the second direction.

The directions C1 and C2 are the third directions, the direction indicated by C1 is the positive direction of the third direction, and the direction indicated by C2 is the negative direction of the third direction.

The first direction, the second direction and the third direction may be intersected with each other.

Exemplary Embodiment One

Figure 2:
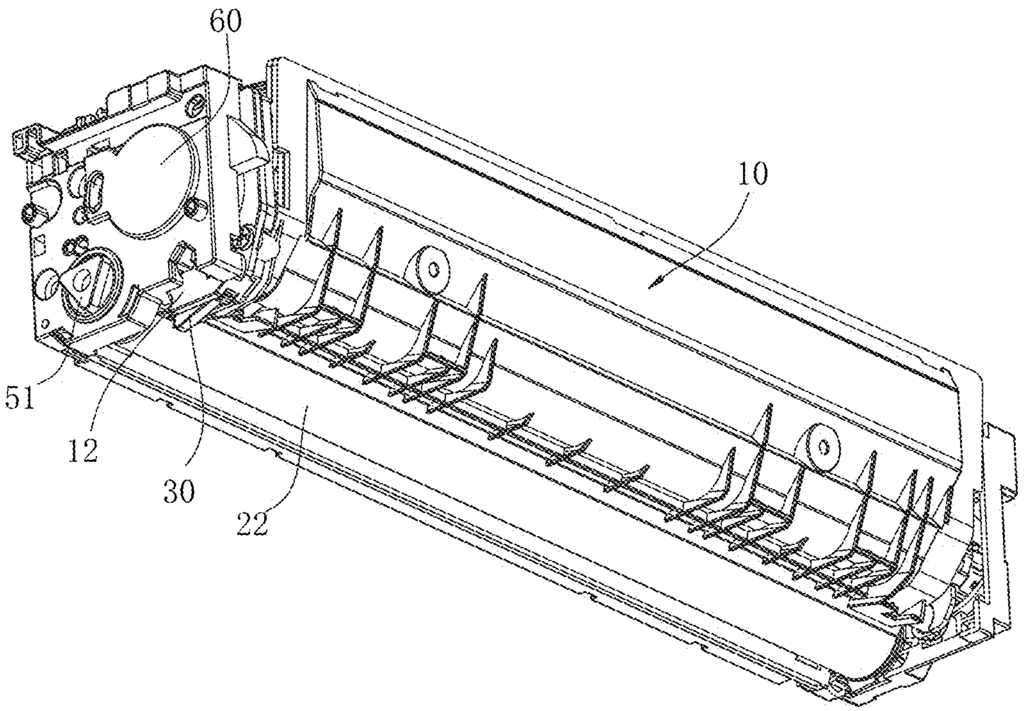
FIG. 2 illustrates a structural schematic of a process cartridge from another viewing angle according to exemplary embodiment one of the present disclosure.

As shown in FIGS. 1-2, a process cartridge is provided in one embodiment. The process cartridge may include a developing unit 10, a drum unit 20, a pushing part 30 and a driving assembly, where the frames of the developing unit 10 and the drum unit 20 may form a cartridge body.

The developing unit 10 may include a developing frame 11, a developing roller, a toner feeding roller and a toner discharging knife. The drum unit 20 may include a photosensitive frame 21, a photosensitive drum 22, a charging roller, and a cleaning blade. The developing frame 11 may surround a toner bin for storing developer (e.g., toner). The developing frame 11 may be approximately in the shape of a rectangular box. The developing frame 11 may have end faces at two ends along the length direction. The developing frame 11 may be disposed with a toner inlet, the toner may be added to the toner bin through the toner inlet, and the toner inlet may be formed on one of the end faces of the developing frame 11. The toner feeding roller and the developing roller may be rotatably supported at two ends of the developing frame 11 along the length direction; and the developing roller may be at the lower end side of the developing frame 11 along the height direction. The toner feeding roller and the developing roller may rotate under the action of the driving assembly, and the rotation axes of the toner feeding roller and the developing roller may be along the length direction of the developing frame 11. The toner feeding roller may send the toner to the developing roller, and the toner may be adsorbed by charged developing roller.

As shown in FIG. 2, the photosensitive frame 21 may surround a waste toner bin for collecting waste toner; the photosensitive frame 21 may also have a length direction which is consistent with the length direction of the developing frame 11. The photosensitive drum 22 may be rotatably supported on two ends of the photosensitive frame 21 along the length direction. For example, the photosensitive drum 22 may be disposed on the lower end side of the photosensitive frame 21 along the height direction. The waste toner bin may be disposed along the length direction of the photosensitive frame 21; and the waste toner bin may be located on one side of the photosensitive drum 22. The toner adsorbed by the developing roller may be transferred to the photosensitive drum 22 through the potential difference between the developing roller and the photosensitive drum 22. The toner on the photosensitive drum may be transferred through a transferring belt of the electronic image-forming apparatus to form an image on the recording material (such as paper). After transferring, the cleaning blade may make linear contact with the photosensitive drum 22 to clean the toner that has not been completely transferred on the surface of the photosensitive drum, that is, waste toner. The waste toner after cleaning may be stored in the waste toner bin. The charging roller may be configured to uniformly charge the surface of the photosensitive drum 22, such that the photosensitive drum 22 may absorb toner.

When the electronic image-forming apparatus is operating, the developing roller and the photosensitive drum 22 may need to be in tight contact. When the image-forming apparatus is not operating, the developing roller and photosensitive drum 22 may need to be separated by a certain distance, which may avoid problems including the photosensitive drum 22's contamination by excess developer attached to the developing roller caused by long-term contact between the developing roller and the photosensitive drum 22, deformation of the developing roller, wear and tear of the photosensitive drum 22, and the like.

Therefore, the drum unit 20 and the developing unit 10 in one embodiment may be configured to move relative to each other, such that the developing roller and the photosensitive drum 22 may be in contact with each other when the electronic image-forming apparatus is operating and may be separated from each other when the electronic image-forming apparatus is not operating. When the process cartridge is installed in the electronic image-forming apparatus, the drum unit 20 may be in contact with components in the electronic image-forming apparatus, and the drum unit 20 may be not movable. The developing unit 10 may be configured to be movable relative to the drum unit 20 between the first position and the second position. When the developing unit 10 is in the first position, the developing roller may be in contact with the photosensitive drum 22; and when the developing unit 10 is in the second position, the developing roller may be separated from the photosensitive drum 22.

In one embodiment, the movement manner of the developing unit 10 may be to swing using the middle position of the developing unit 10 along the height direction as the axis. That is, when the developing unit 10 is in the first position, the lower end of the developing unit 10 may be adjacent to the lower end of the drum unit 20, such that the developing roller may be in contact with the photosensitive drum 22. At this point, the upper end of the developing unit 10 may be away from the drum unit 20. When the developing unit 10 moves from the first position to the second position, the lower end of the developing unit 10 may swing along the direction away from the drum unit 20, thereby driving the developing roller to separate from the photosensitive drum 22. At this point, the upper end of the developing unit 10 may swing along the direction adjacent to the drum unit 20.

As shown in FIG. 2, the movement of the developing unit 10 from the first position to the second position may be achieved by the cooperation of the pushing part 30 and the force-applying part in the electronic image-forming apparatus. For example, the developing unit 10 may be configured with the pushing part 30 on one end face or two end faces along the length direction. The pushing part 30 may be rotatably configured on the end surface of the developing unit 10. The pushing part 30 may be in the shape of a strip arm. One end of the pushing part 30 may be hinged with the developing unit 1; and another end of the pushing part 30 may drive the developing unit 10 to move from the first position to the second position along the direction away from the drum unit 20 when receiving the force from the force-applying part, such that the developing roller may be separated from the photosensitive drum 22.

Figure 3:
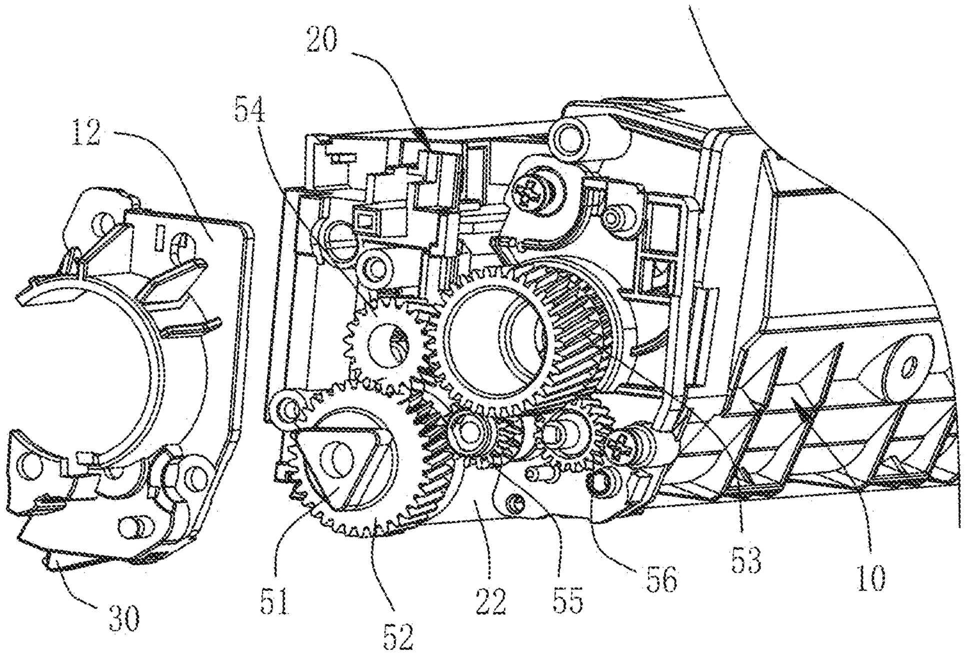
FIG. 3 illustrates a partial exploded schematic of a process cartridge according to exemplary embodiment one of the present disclosure (an end cover is omitted).

As shown in FIG. 3, in one embodiment, the developing unit 10 may also include a driving end bracket 12; the driving end bracket 12 may be disposed on one end surface of the developing frame 11; the pushing part 30 may be hinged on the driving end bracket 12; and the driving end bracket 12 may be fixed to the end surface of the developing frame 11 by screws. In some other embodiments, the pushing part 30 may not be disposed on the driving end bracket 12. A supporting axle may be configured on the end surface of the developing unit 10, and one end of the pushing part 30 may be sleeved on the supporting axle, which may also complete the installation of the pushing part 30. A portion of the free end of the pushing part 30 may be exposed from below outside the developing frame 11, such that the force-applying part may be in contact with such portion from below, thereby applying force on such portion.

As shown in FIG. 1, the first elastic part 40 may be disposed between the drum unit 20 and the developing unit 10 and may be configured to move the developing unit 10 from the second position to the first position and drive the developing roller to be in contact with the photosensitive drum. For example, one end of the first elastic part 40 may be connected to the upper end of the photosensitive frame 21, and the other end of the first elastic part 40 may be connected to the upper end of the developing frame 11. The first elastic part 40 may be, optionally, a spring, and may also be an elastic rubber, an elastic sponge, an elastic part, or other components capable of providing elastic force.

When the electronic image-forming apparatus is not operating, the force-applying part may be in contact with the pushing part 30 from below and apply force to the pushing part 30. In such way, the free end of the pushing part 30 may synchronously drive the developing unit 10 to move from the first position to the second position during rotation, and the photosensitive drum 22 may be separated from the developing roller. At this point, the upper end of the developing unit 10 may move toward the direction adjacent to the photosensitive drum 22 to compress the first elastic part 40.

When the electronic image-forming apparatus is operating, the force exerted by the force-applying part on the pushing part 30 may be removed, and the elastic deformation of the first elastic part 40 may be restored. The developing unit 10 may be pushed to move from the second position to the first position, and the developing roller may be in contact with the photosensitive drum 22; and simultaneously, the pushing part 30 may also return to original position with the movement of the developing unit 100.

The driving assembly may be disposed outside the end surface of the process cartridge along the length direction, for example, may be disposed outside an end surface of the developing frame 11 and the photosensitive frame 21 along the length direction. The driving assembly may be configured to receive and transmit the driving force of the electronic image-forming apparatus (such as a laser printer) to make the process cartridge to operate.

As shown in FIGS. 1-2, the process cartridge may also include an end cover 60 (e.g., a driving-side end cover or a conductive-side end cover). The end cover 60 may be disposed on the outer side of the end surface of two ends of the cartridge body along the length direction and may be configured to protect the driving assembly disposed on the end surface of the process cartridge.

In one embodiment, a hole may be formed at the end cover 60 located at the driving end of the cartridge body. The hole may be configured to make the first force-receiving part (that is, the first coupling 51 (e.g., in FIGS. 6-7 or suitable figures) or the photosensitive drum coupling b310 (e.g., in FIGS. 62-64 or suitable figures) described below) connected to the photosensitive drum to be exposed to the outside of the end cover 60, such that the first force-receiving part connected to the photosensitive drum may be meshed with the driving head of the electronic image-forming apparatus. In addition, other parts of the developing protection cover and the driving assembly, such as the developing roller gear and the toner feeding roller gear and the like, may be blocked by the end cover 60, such that the end cover 60 may be configured to prevent the developing protection cover or the developing roller gear from being damaged.

Figure 4:
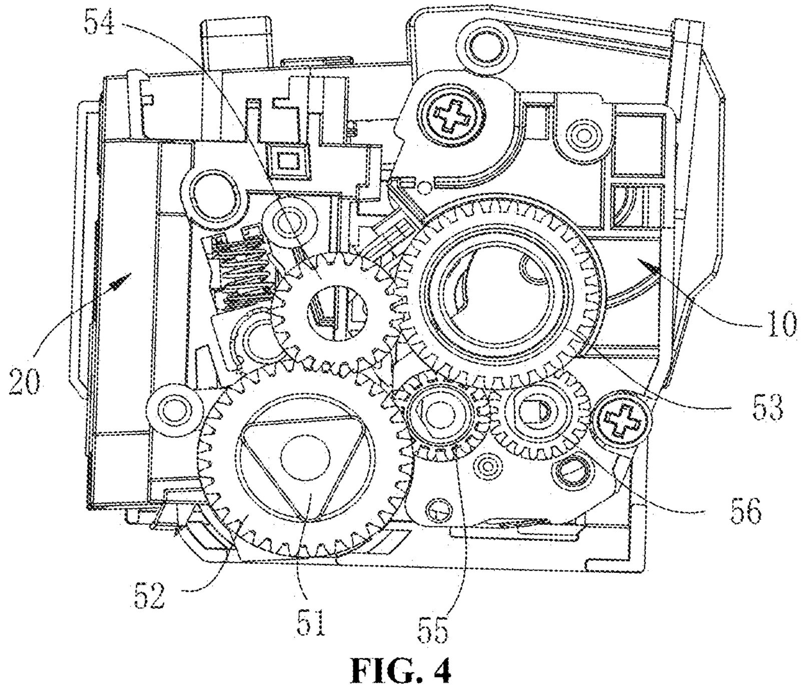
FIG. 4 illustrates a structural schematic of a process cartridge from another viewing angle according to exemplary embodiment one of the present disclosure (an end cover is omitted).
Figure 5:
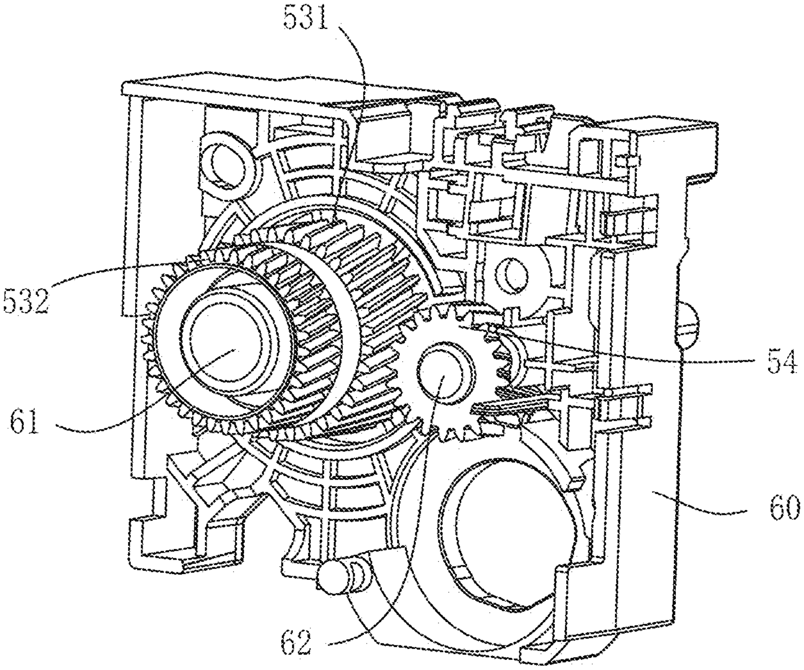
FIG. 5 illustrates a structural schematic of an end cover of a process cartridge according to exemplary embodiment one of the present disclosure.

As shown in FIGS. 3-5, the driving assembly may include a first coupling 51, a first transmission part 52, a second transmission part 53, a third transmission part 54, a developing roller gear 55 and a toner feeding roller gear 56. The first coupling 51 may be the first force-receiving part.

For example, the first coupling 51 may be fixedly disposed at one end of the photosensitive drum 22 along the length direction and may also be formed into a single piece with the photosensitive drum 22. The first coupling 51 may be configured to be meshed with the driving head of the electronic image-forming apparatus, thereby receiving the rotational driving force of the electronic image-forming apparatus and driving the photosensitive drum 22 fixedly connected thereto to rotate. One end of the first coupling 51 away from the end face of the drum unit 20 may be disposed with a triangular prism-shaped meshing head. The shape of the meshing head may also be other shapes, as long as the meshing head may mesh with the driving head to stably receive the driving force.

The first transmission part 52 may be configured as the first gear; the first gear may be coaxially sleeved on the outside of the first coupling 51; the gear portion of the first gear may be helical teeth; and the first transmission part 52 may be connected to the first coupling 51. For example, a convex rib may be disposed on the inner wall of the first transmission part 52 along the axial direction of the first transmission part 52; and a groove matching the rib may be disposed on the outer wall of the first coupling 51 along the axial direction of the first coupling 51, such that the first coupling 51 and the first transmission part 52 may be connected by the rib and the groove. Therefore, when the first coupling 51 receives the driving force to rotate, the first transmission part 52 may also rotate synchronously. Optionally, the first transmission part 52 and the first coupling 51 may also be connected by manners including welding, pasting and the like.

The developing roller gear 55 may be disposed at one end of the developing roller along the length direction. The developing roller gear 55 and the developing roller may be fixedly connected or detachably connected, as long as the rotation of the developing roller gear 55 can drive the developing roller to rotate synchronously.

The toner feeding roller gear 56 may be disposed at one end of the toner feeding roller along the length direction. The toner feeding roller gear 56 and the toner feeding roller may be fixedly connected or detachably connected, as long as the rotation of the toner feeding roller gear 56 can drive the toner feeding roller to rotate synchronously.

Referring to FIGS. 3-5, the second transmission part 53 may be on the outer side of the end face of the developing unit 10; the second transmission part 53 may be meshed with the developing roller gear 55 and the toner feeding roller gear 56; the second transmission part 53 may be configured as a second gear; the second gear may include the first gear portion 531 and the second gear portion 532; the first gear portion 531 and the second gear portion 532 may be arranged along the axial direction of the second transmission part 53; the first gear portion 531 may be farther from the end face of the developing unit 10 than the second gear portion 532 along the axial direction; the diameter of the first gear portion 531 may be greater than the diameter of the second gear portion 532; and both the first gear portion 531 and the second gear portion 532 may be helical teeth.

As shown in FIG. 5, the first installation column 61 may be disposed on the inner side of the end cover 60, and the second transmission part 53 may be sleeved and mounted on the first installation column 61. When the second transmission part 53 and the end cover 60 are assembled together to the outer side of the end surface of the developing unit 10, the first gear portion 531 of the second transmission part 53 may be meshed with the developing roller gear 55, and the second gear portion 532 may be meshed with the toner feeding roller gear 56. The rotation of the second transmission part 53 may simultaneously drive the developing roller gear 55 and the toner feeding roller gear 56 to rotate.

As shown in FIGS. 3-5, the third transmission part 54 may be an intermediate gear meshing with the first transmission part 52 and the second transmission part 53. For example, the second installation column 62 may be disposed on the inner side of the end cover 60, and the third transmission part 54 may be sleeved and mounted on the second installation column 62. When the third transmission part 54 and the end cover 60 are assembled together to the outer side of the end surface of the developing unit 10, the third transmission part 54 may be meshed with the gear portion of the first transmission part 52, and the third transmission part 54 may be also meshed with the first gear portion 531 of the second transmission part 53. The gear portion of the third transmission part 54 may be also helical teeth.

When the process cartridge is operating, the first coupling 51 may be meshed with the driving head of the electronic image-forming apparatus, receive the rotational driving force to rotate and drive the photosensitive drum 22 and the first transmission part 52 to rotate coaxially; the first transmission part 52 may drive the third transmission part 54 connected thereto to rotate; the third transmission part 54 may drive the second transmission part 53 connected thereto to rotate; and the second transmission part 53 may drive the developing roller gear 55 and the toner feeding roller gear 56 connected thereto to rotate. The rotational driving force received by the first coupling 51 from the electronic image-forming apparatus may be transmitted through above force transmission process, such that the photosensitive drum 22, the developing roller, and the toner feeding roller may be all driven to rotate, and the process cartridge may operate normally.

In the process cartridge provided in one embodiment, the developing unit 10 may move relative to the drum unit 20, and a single driving manner may be adopted. In one embodiment, the driving assembly may replace the dual driving mode of the existing technology. The electronic image-forming apparatus may only need to be disposed with one driving head, and the process cartridge may also only need to be disposed with one coupling for receiving the rotational force, such that the structure of the electronic image-forming apparatus and the process cartridge may be relatively simple, and the cost may be reduced. Furthermore, in one embodiment, when the developing unit 10 is in the first position and the second position, the third transmission part 54 may be always meshed with the first transmission part 52 and the second transmission part 53. In such way, the developing roller and the photosensitive drum 22 may change from the separation state to the contact state more smoothly, which may avoid the collision caused by the direct meshing of the first transmission part 52 and the second transmission part 53 and may extend the service life of the first transmission part 52 and the second transmission part 53.

Exemplary Embodiment Two

The structures in one embodiment may be substantially same as the structures in exemplary embodiment one, and the difference is that that the structures of the driving assembly may be different.

In one embodiment, the third transmission part 54 may be a transmission belt, which may be connected to the first transmission part 52 and the second transmission part 53.

Figure 6:
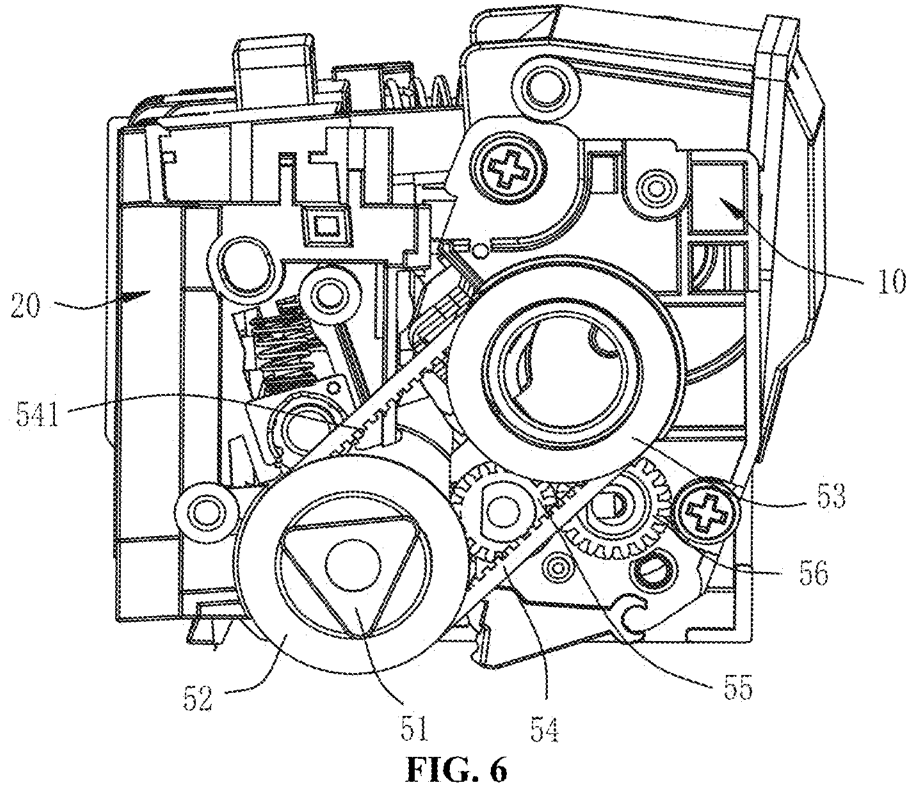
FIG. 6 illustrates a structural schematic of a process cartridge according to exemplary embodiment two of the present disclosure.

As shown in FIG. 6, the transmission belt may be a crawler belt, and the transmission teeth 541 may be disposed on the inner side of the crawler belt, and the first transmission part 52 may be disposed as a sprocket that can cooperate with the transmission teeth 541.

The second transmission part 53 may be also disposed with the third gear portion. The third gear portion may be disposed on the side of the first gear portion 531 away from the end face of the developing unit 10. The third gear portion may be meshed with the transmission teeth 541 of the crawler belt.

During assembly, the crawler belt sleeve may be outside the gear portion of the first transmission part 52 and the third gear portion of the second transmission part 53 and may be meshed with the gear portion of the first transmission part 52 and the third gear portion of the second transmission part 53.

When the first coupling 51 receives the rotational driving force to rotate, the first transmission part 52 may follow to rotate and may be used as the driving wheel to drive the second transmission part 53 to rotate through the crawler belt. The second transmission part 53 may drive the developing roller gear 55 and the toner feeding roller gear 56 connected thereto to rotate.

Figure 7:
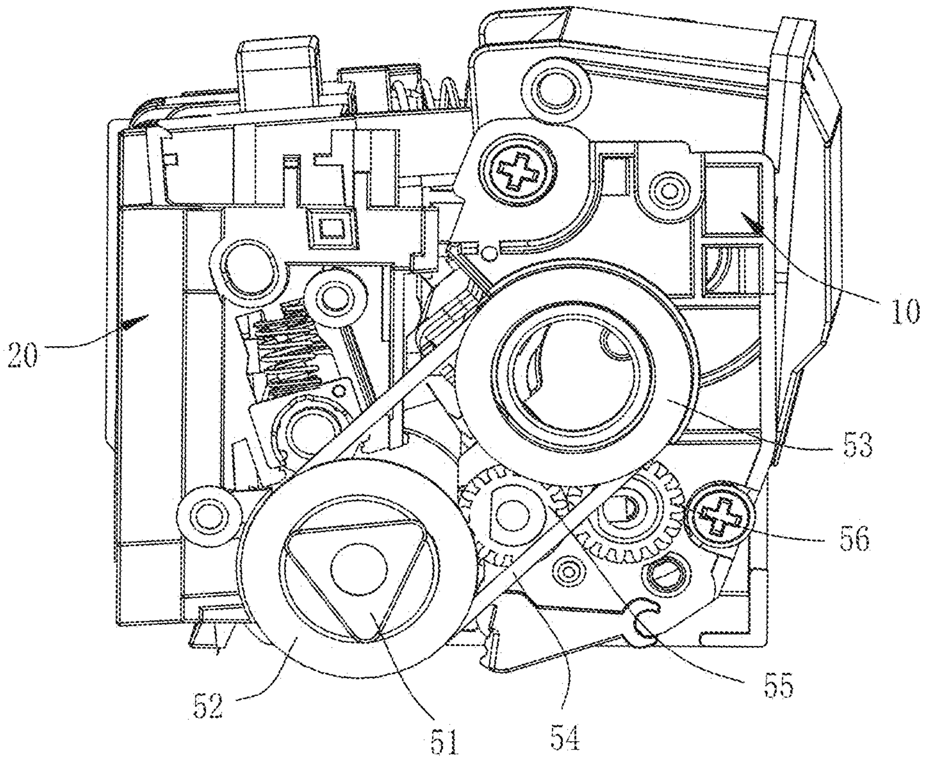
FIG. 7 illustrates a structural schematic of modification of a process cartridge according to exemplary embodiment two of the present disclosure (an end cover is omitted).
Figure 8:
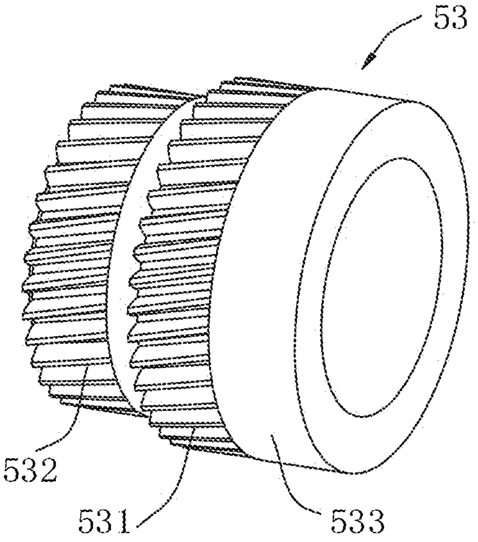
FIG. 8 illustrates a structural schematic of a second transmission part of modification of a process cartridge according to exemplary embodiment two of the present disclosure.

As a variation of exemplary embodiment two, as shown in FIGS. 7 and 8, the transmission belt may be a leather belt. When the transmission belt is configured as a leather belt, the first transmission part 52 may be correspondingly configured as a round wheel, and the second transmission part 53 may be also correspondingly increased with a round wheel portion 533. The round wheel portion 533 may be disposed on the side of the first gear portion 531 away from the end surface of the developing unit 10.

The leather belt may be sleeved on the round wheel portion 533 of the first transmission part 52 and the second transmission part 53. When the first coupling 51 receives the rotational driving force to rotate, the first transmission part 52 may follow to rotate, and the friction between the leather belt and the first transmission part 52 and the round wheel portion 533 may transmit the driving force. Therefore, the second transmission part 53 may be driven to rotate, and the second transmission part 53 may drive the developing roller gear 55 and the toner feeding roller gear 56 connected thereto to rotate.

In one embodiment, single driving effect may also be achieved by the transmission manner of transmission belt.

In one embodiment, other structures of the process cartridge may be same as those in exemplary embodiment one, which may not be described in detail herein.

Exemplary Embodiment Three

The structures in one embodiment may be substantially same as the structures in exemplary embodiment one and two, and the difference is that that the structures of the driving assembly may be different.

Figure 9:
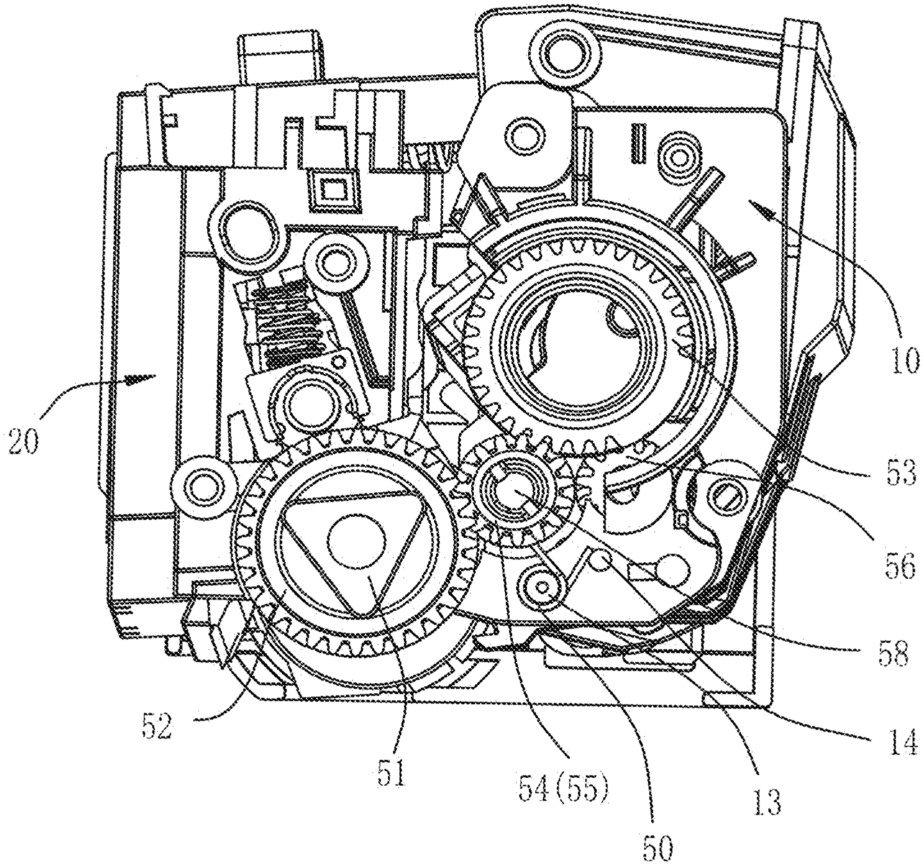
FIG. 9 illustrates a structural schematic of a process cartridge according to exemplary embodiment three of the present disclosure.

In one embodiment, as shown in FIG. 9, the third transmission part 54 may be the developing roller gear 55 which may be installed on the inner side of the end cover 60. For example, the third installation column may be disposed on the inner side of the end cover 60, and the developing roller gear 55 may be sleeved on the third installation column. The developing roller gear 55 may be connected to the developing roller 15 through a transmission structure.

Figure 10:
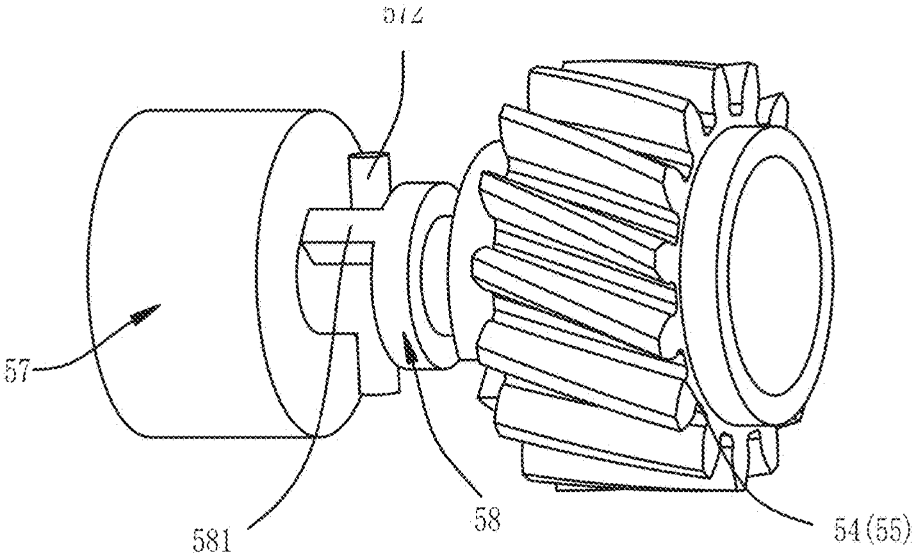
FIG. 10 illustrates a schematic of a transmission structure of a process cartridge according to exemplary embodiment three of the present disclosure.
Figure 11:
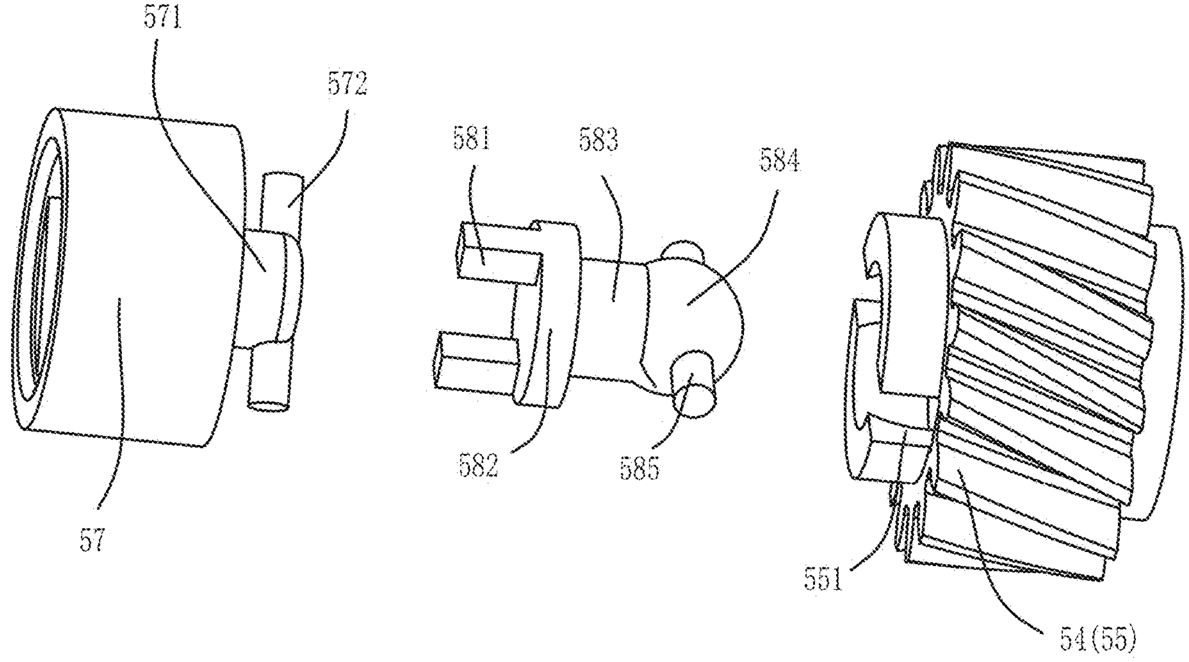
FIG. 11 illustrates an exploded schematic of a transmission structure of a process cartridge according to exemplary embodiment three of the present disclosure.

As shown in FIGS. 10-11, the transmission structure may include a connecting part 57 and a transmission part 58; the connecting part 57 may be fixedly disposed at one end of the developing roller 15; and two ends of the transmission part 58 may be respectively connected to the connecting part 57 and the developing roller gear 55.

For example, as shown in FIGS. 10-13, one end of the connecting part 57 may be fixedly connected to one end of the developing roller 15, and a protruding platform 571 may be disposed in the middle portion of another end of the connecting part 57 (the end away from the end surface of the developing unit 10). The third abutting portion 572 may be disposed on the outer wall of the protruding platform 571. The third abutting portion 572 may be two third protruding columns formed on the outer sidewall of the protruding platform 571. Two third protruding columns may be on a same straight line. The extension direction of two third protruding columns may extend along the direction intersecting with the axial direction of the developing roller 15; that is, two third protruding columns may extend along the radial direction of the protruding platform 571. Two third protruding columns may be cylindrical structures or other geometric shapes. The third abutting portion 572 may be integrally formed on the protruding platform 571 or may be a split structure connected by the manners including welding, pasting, snapping and the like.

As shown in FIGS. 10-11, the transmission part 58 may include a second abutting portion 581, a circular platform portion 582, a first connecting portion 583 and a spherical portion 584 which may be sequentially arranged along the end surface direction away from the developing unit 10. A first abutting portion 585 may be formed on the spherical portion 584.

As shown in FIGS. 10-11, the second abutting portion 581 may be configured to be abutted against the third abutting portion 572 when transmitting force. The second abutting portion 581 may be two second protruding columns formed at one end of the circular platform portion 582. Two second protruding columns may extend along the axial direction of the developing roller 15. Two second protruding columns may also be integrally formed at one end of the circular platform portion 582. Two second protruding columns may be arranged to be adjacent to the outermost surface of the circular platform portion 582. The outermost surfaces of two second protruding columns may be configured to be coplanar with the outermost surface of the circular platform portion 582. Two second protruding columns may be arranged oppositely along the radial direction of the circular platform portion 582. A gap may be between two second protruding columns; and the size of the gap may be adapted to the size of the protruding platform 571. The extension direction of the third abutting portion 572 may intersect with the extension direction of the second abutting portion 581. When the connecting part 57 is meshed with the transmission part 58, the protruding platform 571 may be inserted into the gap between two protruding columns of the second abutting portion 581. In addition, the second protruding column of the second abutting portion 581 may be abutted and meshed with the third protruding column of the third abutting portion 572, such that when the rotation of the transmission part 58 rotates may drive the connecting part 57 to rotate.

As shown in FIG. 11, another end of the circular platform portion 582 may be the first connecting portion 583; the first connecting portion 583 may be a cylindrical part; and the outer diameter of the first connecting portion 583 may be less than the outer diameter of the circular platform portion 582.

As shown in FIG. 11, the first abutting portion 585 may be two first protruding columns formed on the outer wall of the spherical portion 584. The two first protruding columns may be located on a same straight line. The extension direction of two first protruding columns may extend along the direction intersecting the axial direction of the developing roller 15; that is, two first protruding columns may extend along the radial direction of the spherical portion 584. A certain angle may be between the straight line where two first protruding columns of the first abutting portion 585 are located and the line connecting two second protruding columns of the second abutting portion 581. Optionally, the angle may be 90°, that is, the straight line where the two first protruding columns of the first abutting portion 585 are located may perpendicularly intersect the connecting line between the two second protruding columns of the second abutting portion 581.

The developing roller gear 55 may include a hollow channel inside, and the outer circumferential surface of the hollow channel may be disposed with helical teeth. The developing roller gear 55 may be meshed with the first transmission part 52 and the second transmission part 53 through the helical teeth. Therefore, the driving force received by the first coupling 51 may be sequentially transmitted to the first transmission part 52, the developing roller gear 55, the second transmission part 53, and the toner feeding roller gear 56.

Figure 12:
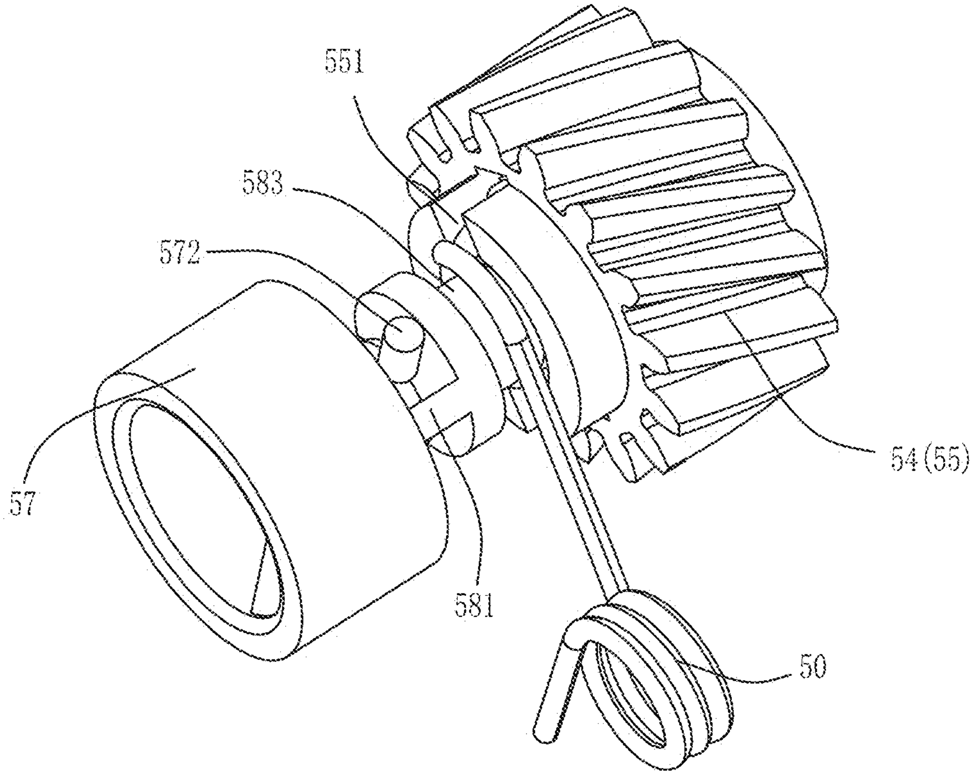
FIG. 12 illustrates a schematic of a transmission structure and a second plastic part of a process cartridge according to exemplary embodiment three of the present disclosure.
Figure 13:
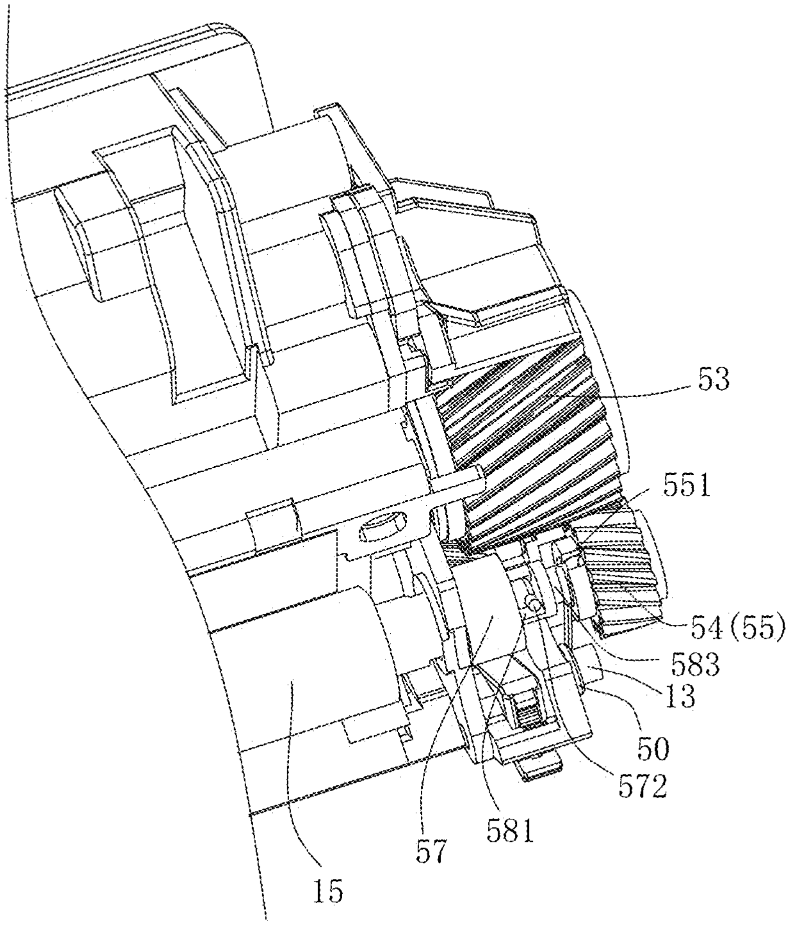
FIG. 13 illustrates a partial schematic of a developing unit of a process cartridge according to exemplary embodiment three of the present disclosure.

Furthermore, as shown in FIGS. 11-13, a limiting groove 551 may be disposed on the inner wall of the developing roller gear 55. The limiting groove 551 may be configured to cooperate with the first abutting portion 585. For example, when the transmission part 58 is assembled with the developing roller gear 55, a part of the spherical portion 584 may be inserted into the hollow channel of the developing roller gear 55, and two first protruding columns of the first abutting portion 585 may be inserted into the limiting groove 551 of the developing roller gear 55. In such way, the rotation of the developing roller gear 55 may drive the transmission part 58 to rotate, and the transmission part 58 may then drive the connecting part 57 to rotate, thereby transmitting the driving force to the developing roller 15.

Furthermore, as shown in FIGS. 9, 12 and 13, the process cartridge may also include the second elastic part 50, which may be configured to tilt the axis of the transmission part 58 relative to the axis of the developing roller 15 when the developing roller 15 and the photosensitive drum 22 are separated. For example, the second elastic part 50 may be a torsion spring. The first column 13 may be disposed on the end surface of the developing frame 11, and the coil of the torsion spring may be sleeved on the first column 13. One end of the torsion spring may be abutted against the second column 14 disposed on the end surface of the developing frame 11, and another end of the torsion spring may be abutted against the first connecting portion 583 of the transmission part 58. The torsion spring may be constructed to always apply a force to the transmission part 58. The direction of the force may be from the first position of the developing unit 10 to the second position, that is, from the developing roller 15 to the photosensitive drum 22.

When the developing unit 10 moves from the first position to the second position and the developing roller 15 is separated from the photosensitive drum 22, the connecting part 57 and the developing roller 15 may move together along the direction away from the photosensitive drum 22; the third abutting portion 572 of the connecting part 57 may be disengaged from the second abutting portion 581 of the transmission part 58, and the force between the third abutting portion 572 and the second abutting portion 581 may disappear; the transmission part 58 may be tilted along the direction away from the photosensitive drum 22 under the action of the second elastic part 50; and the axis of the transmission part 58 may form a certain angle with the axis of the connecting part 57, and remain in an inclined state before the developing roller 15 re-contacts the photosensitive drum 22.

The transmission part 58 may be in an inclined state, which may prevent the third abutting portion 572 from interfering with the second abutting portion 581 and make the third abutting portion 572 and the second abutting portion 581 to be meshed with each other smoothly when the developing roller 15 is in contact with the photosensitive drum 22. During the meshing process of the third abutting portion 572 and the second abutting portion 581, the connecting part 57 may apply a force to the transmission part 58 along the direction adjacent to the photosensitive drum 22 and push the transmission part 58 to be aligned, that is, the axis of the transmission part 58 coincides with the axis of the connecting part 57, thereby being capable of transmitting the driving force. Such structure may make the meshing time of the transmission part 58 and the connecting part 57 to be shorter and smoother during the contact process of the developing roller 15 and the photosensitive drum 22 and may also avoid impact damage during the meshing process.

In one embodiment, other structures of the process cartridge may be same as those in exemplary embodiment one, which may not be described in detail herein.

Exemplary Embodiment Four

The structures in one embodiment may be substantially same as the structures in exemplary embodiment one and two, and the difference is that that the structures of the driving assembly may be different.

Figure 14:
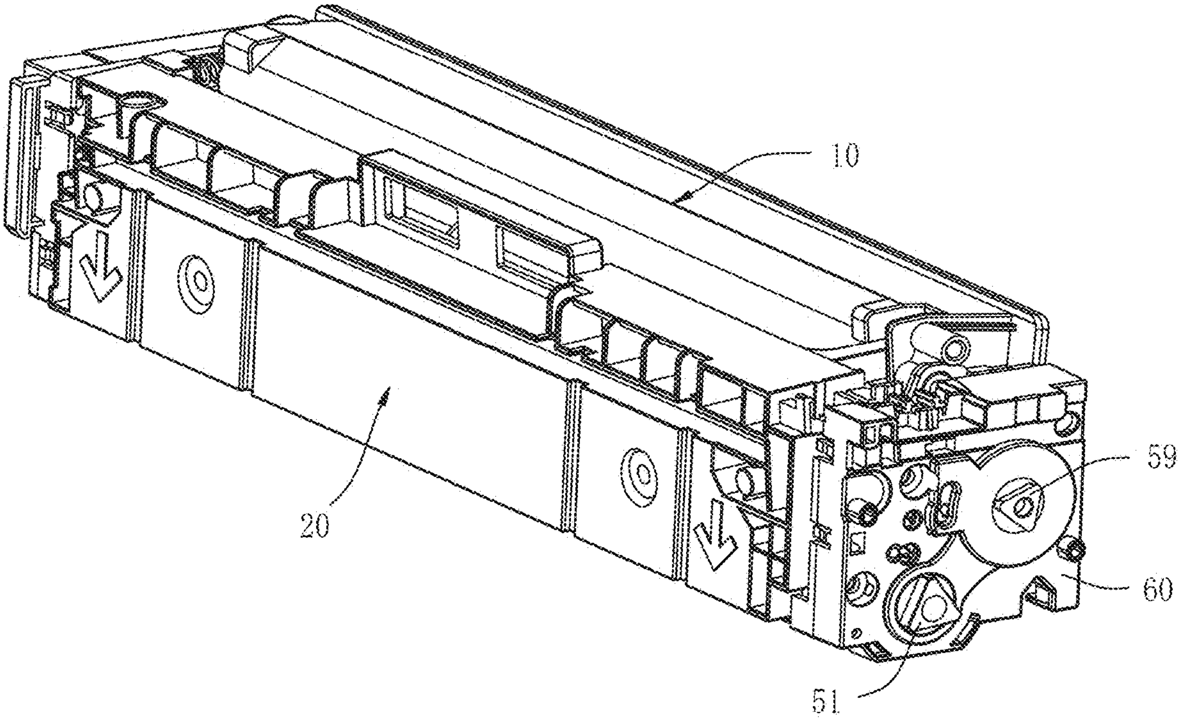
FIG. 14 illustrates a structural schematic of a process cartridge according to exemplary embodiment four of the present disclosure.
Figure 15:
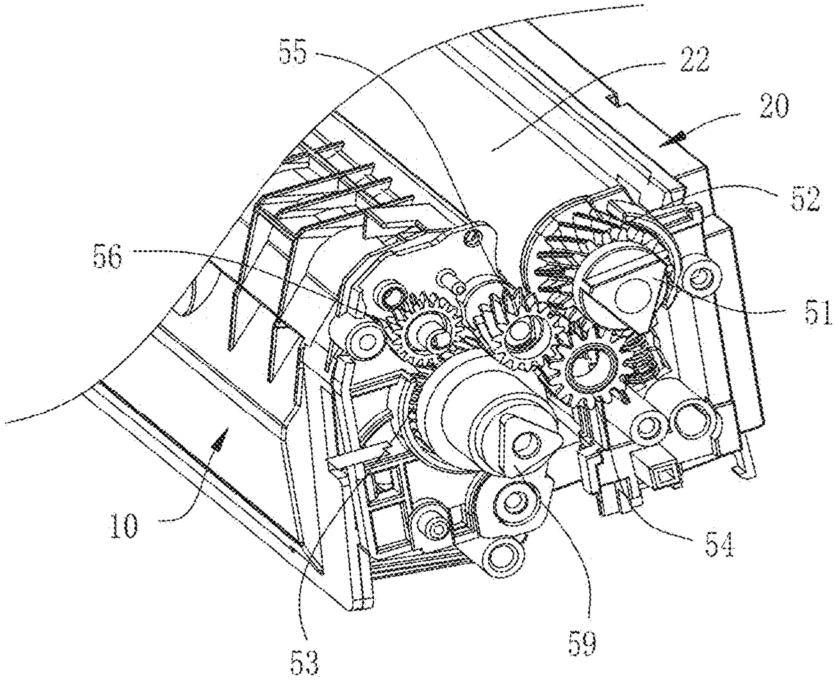
FIG. 15 illustrates a partial schematic of a process cartridge according to exemplary embodiment four of the present disclosure (an end cover is omitted).

In one embodiment, as shown in FIGS. 14-15, the second force-receiving part (that is, the second coupling 59 (e.g., in FIGS. 14-15 or suitable figures) or the developing roller coupling b320 (e.g., in FIGS. 62-64 or suitable figures) described below) may be added to the driving assembly; and the structure of the second transmission part 53 may be also different from the structure of the second transmission part 53 in exemplary embodiment one. The other components in the driving assembly may be same as those in exemplary embodiment one, and only the differences are described herein.

As shown in FIG. 15, the second coupling 59 may be rotatably disposed on the end surface of the developing unit 10, and the second coupling 59 may be configured to mesh with the driving head of the electronic image-forming apparatus, thereby receiving the rotational driving force of the electronic image-forming apparatus to rotate.

The second coupling 59 may be configured with a triangular prism-shaped meshing head at one end away from the end face of the developing unit 10. The shape of the meshing head may also be other shapes, as long as the meshing head may mesh with the driving head of the electronic image-forming apparatus to stably receive the driving force.

The second transmission part 53 may be a gear coaxially arranged with the second coupling 59. The second transmission part 53 and the second coupling 59 may be an integral structure or a split structure which is connected by means of snapping, pasting, welding and the like, as long as the second transmission part 53 may rotate synchronously when the second coupling 59 rotates.

The second transmission part 53 may be disposed with a second gear portion. The second gear portion may be meshed with the toner feeding roller gear 56. The second coupling 59 may receive the driving force of the electronic image-forming apparatus to rotate and drive the second transmission part 53 to rotate synchronously. The second transmission part 53 may then drive the toner feeding roller gear 56 to rotate. That is, in one embodiment, the second coupling 59 and the second transmission part 53 may be only configured to drive the toner feeding roller to rotate. The second transmission part 53 may omit the first gear portion configured to drive the developing roller gear 55 as in exemplary embodiment one.

In one embodiment, as shown in FIG. 15, the third transmission part 54 may be an intermediate gear meshing with the first transmission part 52 and the developing roller gear 55. The structure and installation manner of the third transmission part 54 may be same as those of exemplary embodiment one.

When the process cartridge is operating, the first coupling 51 may be meshed with the driving head of the electronic image-forming apparatus, receive the rotational driving force to rotate and drive the photosensitive drum 22 and the first transmission part 52 to rotate coaxially; the first transmission part 52 may drive the third transmission part 54 connected thereto to rotate; and the third transmission part 54 may drive the developing roller gear 55 connected thereto to rotate. Simultaneously, the second coupling 59 may be meshed with another driving head of the electronic image-forming apparatus, receive the rotational driving force to rotate, and drive the second transmission part 53 to rotate coaxially; and the second transmission part 53 may drive the toner feeding roller gear 56 connected thereto to rotate.

The second coupling 59 may be meshed with another driving head of the electronic image-forming apparatus. The driving assembly in one embodiment may adopt a dual driving structure. The driving force received by the first coupling 51 may drive the photosensitive drum 22 and the developing roller to rotate; and the driving force received by the second coupling 59 may drive the toner feeding roller to rotate. For above-mentioned structure, since the first coupling 51 drives the photosensitive drum 22 and the developing roller to rotate but does not drive the toner feeding roller to rotate, the torque at the first coupling 51 may be reduced.

In one embodiment, other structures of the process cartridge may be same as those in exemplary embodiment one, which may not be described in detail herein.

Exemplary Embodiment Five

The structures in one embodiment may be substantially same as the structures in exemplary embodiment one and two, and the difference is that that when the electronic image-forming apparatus is not operating, the developing roller and the photosensitive drum 22 may not need to be separated.

Figure 16:
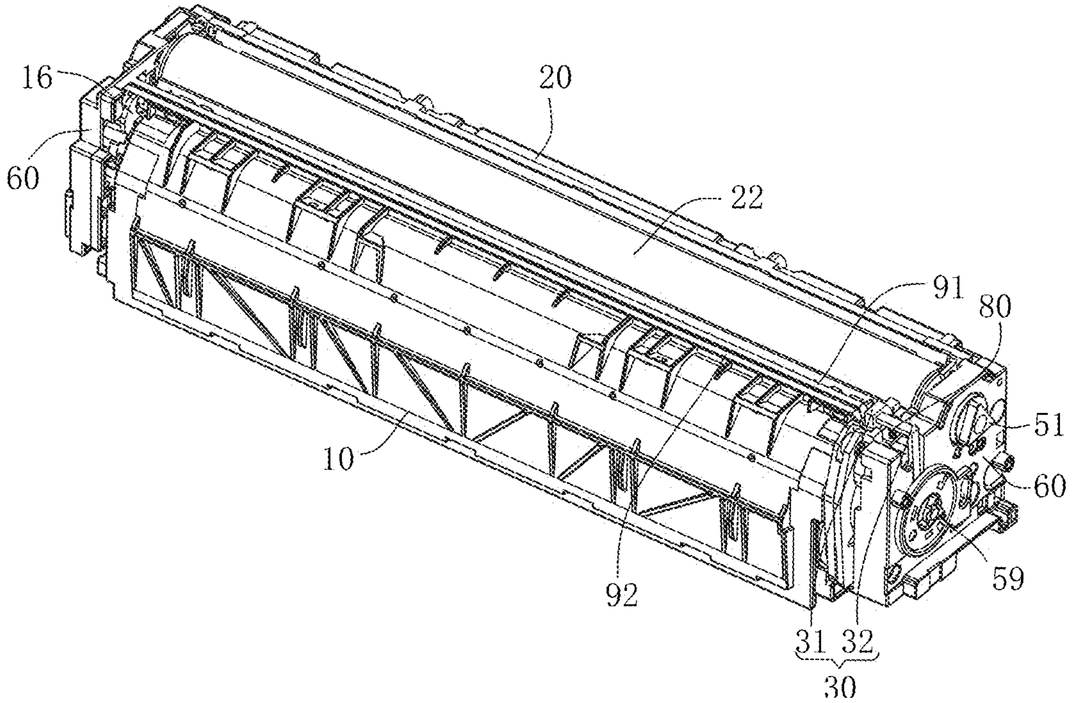
FIG. 16 illustrates a structural schematic of a process cartridge from a viewing angle according to exemplary embodiment five of the present disclosure.
Figure 17:
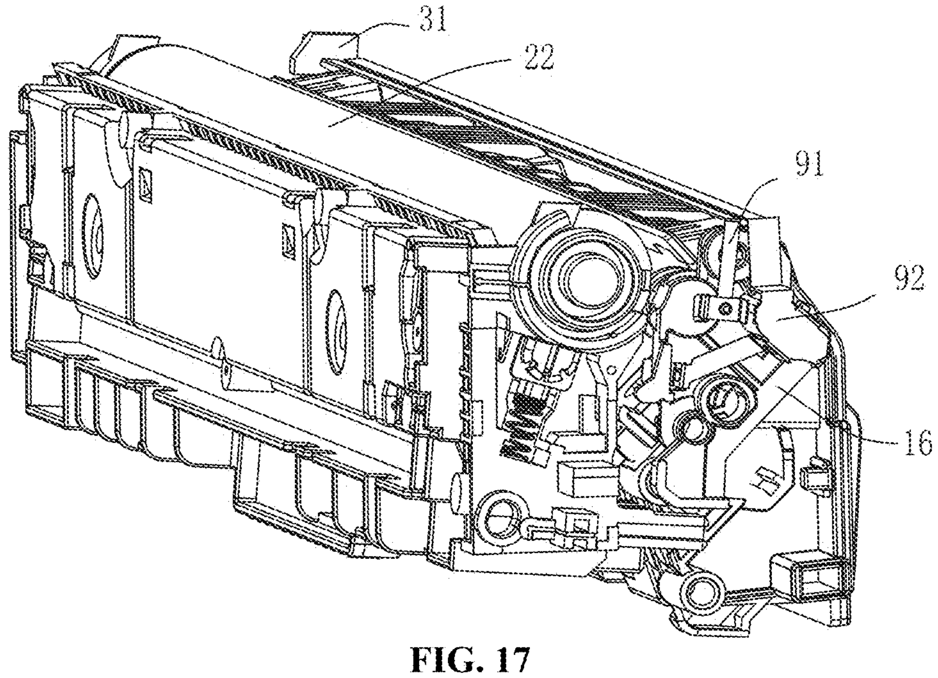
FIG. 17 illustrates a structural schematic of a process cartridge from another viewing angle according to exemplary embodiment five of the present disclosure (an end cover is omitted).
Figure 18:
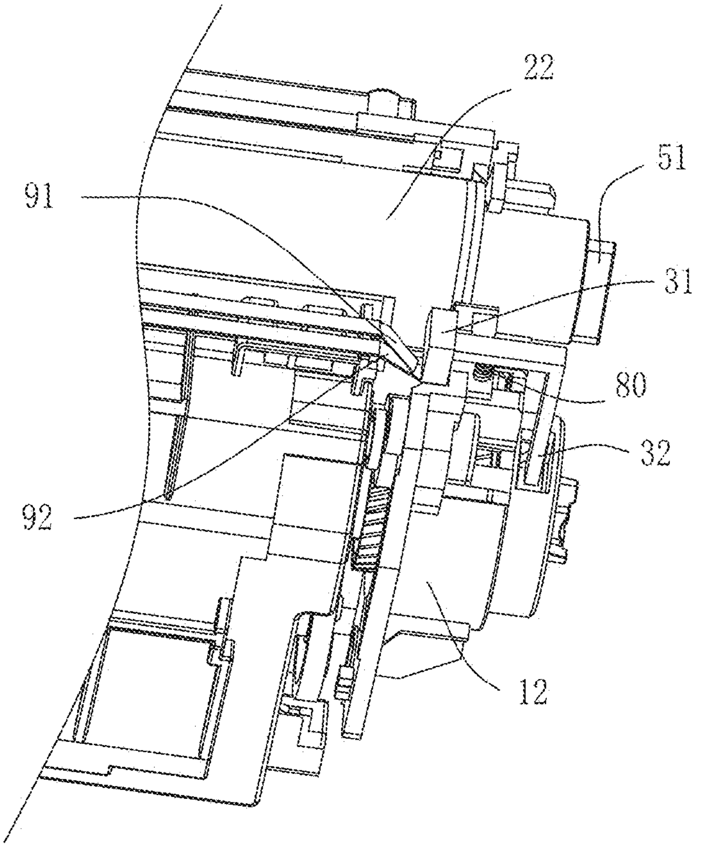
FIG. 18 illustrates a partial schematic of a driving end of a process cartridge from a viewing angle according to exemplary embodiment five of the present disclosure.

As shown in FIGS. 16-18, one end of the process cartridge along the length direction may be the driving end, and the other end of the process cartridge opposite thereto may be the non-driving end. The driving assembly may be disposed at the driving end of the process cartridge; the developing unit 10 may be disposed with a driving end bracket 12 on the outside of the driving end; the developing unit 10 may be disposed with a non-driving end bracket 16 on the outside of the non-driving end; and the driving end bracket 12 and the non-driving end bracket 16 may be each disposed with an end cap 60 on the outer side.

The driving assembly in one embodiment may adopt a dual driving structure as in exemplary embodiment four. The difference from exemplary embodiment four is that the first coupling 51 may be only configured to drive the photosensitive drum 22; the first transmission part 52 and the third transmission part 54 may be omitted; and the second coupling 59 and the second transmission part 53 may drive the developing roller and the toner feeding roller.

Figure 20:
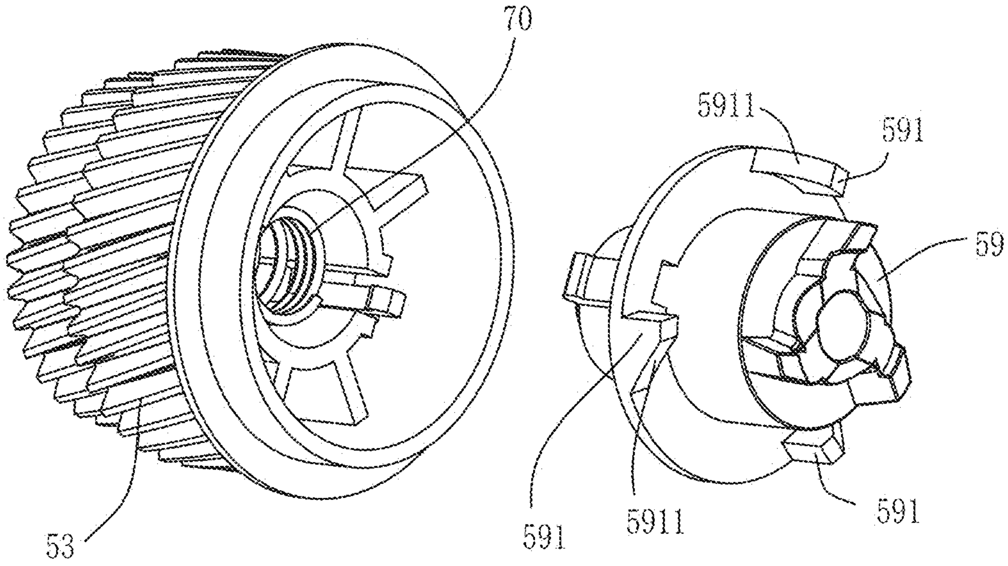
FIG. 20 illustrates an exploded structural schematic of a second coupling and a second transmission part of a process cartridge according to exemplary embodiment five of the present disclosure.

As shown in FIG. 20, in one embodiment, the second coupling 59 and the second transmission part 53 may be connected in a detachable manner. A portion of the second coupling 59 may be inserted into the inner cavity of the second transmission part 53 and locked with the second transmission part 53, such that the second coupling 59 cannot be disengaged from the second transmission part 53 and cannot move relative to each other along the circumferential direction; that is, the second coupling 59 and the second transmission part 53 may be relatively stationary (synchronous rotation) during rotation.

In one embodiment, the second coupling 59 may be constructed to be able to move along the axial direction of the cartridge body, for example, move in the inner cavity of the second transmission part 53 along the axis of the inner cavity adjacent to or away from the end face of the developing unit 10.

As shown in FIG. 20, in one embodiment, the third elastic part 70 may be disposed in the inner cavity of the second transmission part 53. One end of the third elastic part 70 may be abutted against the inner wall of the second transmission part 53, and another end of the third elastic part 70 may be abutted against the second coupling 59. The third elastic part 70 may be constructed in a compressed state, such that the second coupling 59 may be maintained at a position away from the end face of the developing unit 10 without external force.

Figure 19:
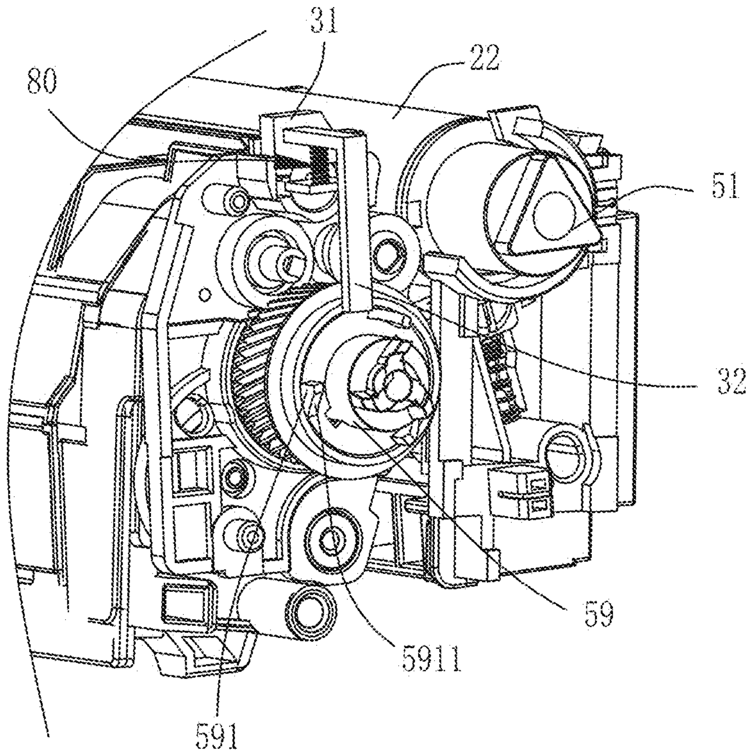
FIG. 19 illustrates a partial schematic of a driving end of a process cartridge from another viewing angle according to exemplary embodiment five of the present disclosure.

As shown in FIGS. 19-20, in one embodiment, the second coupling 59 may be also disposed with a guiding portion 591. The guiding portion 591 may be a protrusion formed on the second coupling 59. The guiding portion 591 may be at the periphery of the meshing head of the second coupling 59 and may not protrude from the meshing head along the axial direction. A guiding surface 5911 may be formed on the guiding portion 591. Optionally, the guiding surface 5911 may be an inclined surface or an arc surface. The number of the guiding portions 591 may be configured to be multiple, and the guiding portions 591 may be distributed along the circumference of the second coupling 59. When the second coupling 59 receives the driving force to rotate, the guiding portion 591 may also move along the circumferential trajectory.

As shown in FIGS. 16-19, in one embodiment, the structure of the pushing part 30 may be different from the structure of the pushing part 30 in exemplary embodiment one. The pushing part 30 may be located at the driving end of the developing unit 10. The pushing part 30 may be connected to the driving end bracket 12 through the fourth elastic part 80. The pushing part 30 may include a pressing block 31 and an arm portion 32. The arm portion 32 may be roughly L-shaped. One end of the arm portion 32 may be connected to the pressing block 31, and another end of the arm portion 32 may extend to the vicinity of the second coupling 59. One end of the fourth elastic part 80 may be connected to the driving end bracket 12, and another end of the fourth elastic part 80 may be connected to the arm portion 32 or the pressure block 31 of the pushing part 30. Without external force, another end of the arm portion 32 may be outside the motion trajectory of the guiding portion 591, that is, when the second coupling 59 rotates, the pushing part 30 may not interfere with the guiding portion 591. The end cover 60 of the driving end and the driving end bracket 12 may be each configured with an avoiding groove for avoiding the arm portion 32, such that another end of the arm portion 32 may extend to a position adjacent to the guiding portion 591.

When the electronic image-forming apparatus is not operating, the force-applying part may be in contact with the pushing part 30 and apply force to the pushing part 30 and force the pushing part 30 to move downward; another end of the arm portion 32 of the pushing part 30 may move into the motion track of the guiding part 591; and the fourth elastic part 80 may be compressed during the movement of the pushing part 30. As the second coupling 59 rotates, another end of the arm portion 32 may be in contact with the guiding surface 5911 and slide relatively along the guiding surface 5911 and form a pushing force on the guiding portion 591, thereby pushing entire second coupling 59 to move toward the end surface of the developing unit 10. The second coupling 59 may be disengaged from the driving head of the electronic image-forming apparatus; the second coupling 59 cannot receive the driving force; and the developing roller may also stop rotation. Therefore, when the electronic image-forming apparatus is not operating, the developing roller may not continue to contact (rub) the photosensitive drum 22, such that the developing roller and the photosensitive drum 22 may avoid wear even if not being separated. When the second coupling 59 moves toward the end face of the developing unit 10, the second coupling 59 may compress the third elastic part 70 during movement. When the electronic image-forming apparatus starts to operate, the force exerted by the force-applying part on the pushing part 30 may be removed. The elastic deformation of the fourth elastic part 80 may be restored to drive the forced pushing part 30 to move and reset; and another end of the arm portion 32 of the pushing part 30 may leave the motion trajectory of the guiding portion 591 and no longer be abutted against the guiding portion 591. The elastic deformation of the third elastic part 70 may be restored to drive the second coupling 59 to move along the direction away from the end face of the developing unit 10; and the second coupling 59 may re-engage with the driving head of the electronic image-forming apparatus and receive the driving force, and the process cartridge may start to operate.

Furthermore, as shown in FIGS. 16-18, the process cartridge may also include the first conductive part 91 and the second conductive part 92; the first conductive part 91 and the second conductive part 92 may be both conductive steel sheets in long-stripped shapes. The lengths of the first conductive part 91 and the second conductive part 92 may be roughly equivalent to the length of the process cartridge and may extend from the non-driving end to the driving end of the process cartridge.

As shown in FIG. 17, the first conductive part 91 and the second conductive part 92 may be both installed on the non-driving end bracket 16. For example, the first ends of the first conductive part 91 and the second conductive part 92 along the length direction may be installed on the non-driving end bracket 16. In addition, the first end of the first conductive part 91 may be also in contact with the steel axle of the developing roller; the first end of the second conductive part 92 may be also in contact with the toner discharging knife; the first end of the first conductive part 91 may be not in contact with the first end of the second conductive part 92; and the first end of the second conductive part 92 may be in contact with the conductive terminal of the electronic image-forming apparatus to be charged. The first ends of the first conductive part 91 and the second conductive part 92 may be shapes after one or more bends, which may fit the surface of the non-driving end bracket 16 and extend to corresponding position to be in contact with the developing roller and the toner discharging knife. The second ends of the first conductive part 91 and the second conductive part 92 along the length direction may extend to the vicinity of the pushing part 30.

The first conductive part 91 and the second conductive part 92 may have an on (i.e., connected) state and an off (i.e., separated) state. When the second end of the first conductive part 91 is in contact with the second end of the second conductive part 92 to be in the on state, a voltage may be provided to the developing roller and the toner knife.

In the on state, the developing roller may be charged and may absorb the developer and transfer the developer to the photosensitive drum 22 through the potential difference. After the toner knife conducts electricity, the developer may be charged with more charges, and the developer roller may absorb the developer desirably. Meanwhile, when the blade contacts and rubs with the developing roller, the thickness of the developer layer may be adjusted to be more uniform.

When the second end of the first conductive part 91 is separated from the second end of the second conductive part 92 to be in the off state, the developing roller may be no longer charged at this point, and the developing roller may not absorb the developer and transfer the developer to the photosensitive drum 22 through the potential difference.

In one embodiment, the switching between the on and off states of the first conductive part 91 and the second conductive part 92 may be controlled by the movement of the pushing part 30. For example, the pressing block 31 of the pushing part 30 may be in contact with the second end of the second conductive part 92 or the second end of the first conductive part 91. In the state without external force, the pressing block 31 of the pushing part 30 may have no force on the first conductive part 91 or the second conductive part 92; and the first conductive part 91 and the second conductive part 92 may not be separated. The first conductive part 91 and the second conductive part 92 may be in the on state. When the pushing part 30 receives the force of the force-applying part to move, the pressing block 31 may push the second end of the second conductive part 92 to move, such that the second end of the second conductive part 92 may be separated from the second end of the first conductive part 91. Therefore, the first conductive part 91 and the second conductive part 92 may be switched from the on state to the off state.

When the electronic image-forming apparatus is not operating, the force-applying part may apply force to the pushing part 30 to move the pushing part 30, and the pressing block 31 of the pushing part 30 may push the second conductive part 92 to move to be separated from the first conductive part 91, the circuit may be disconnected, and the developing roller may be powered off. Meanwhile, the arm portion 32 of the pushing part 30 may move into the motion trajectory of the guiding portion 591 to be interfered with the guiding portion 591 and push the second coupling 59 to move toward the end face of the developing unit 10; the second coupling 59 may be separated from the driving head of the electronic image-forming apparatus to not receive the driving force. At this point, the developing roller may be neither charged nor rotated, such that the developer on the developing roller cannot be transferred to the photosensitive drum through the potential difference; and the developing roller may stop rotating to prevent friction with the photosensitive drum.

When the electronic image-forming apparatus is operating, the force of the force-applying part may be removed; the pushing part 30 may be reset under the force of the fourth elastic part 80; the pressing block 31 may no longer push the second conductive part 92; the second end of the second conductive part 92 may be in contact with the second end of the first conductive part 91; the circuit may be connected; and the developing roller may be charged. Meanwhile, the arm portion 32 of the pushing part 30 may also leave the motion trajectory of the guiding portion 591 to be no longer interfered with the guiding portion 591; and the second coupling 59 may move along the direction away from the end face of the developing unit 10 under the force of the third elastic part 70 and re-meshed with the driving head of the electronic image-forming apparatus to receive the driving force to operate.

Exemplary Embodiment Six

The driving assembly in one embodiment may be same as the driving assembly of exemplary embodiment four, and both driving assemblies may be dual driving structures. In addition, the first coupling 51 may only drive the photosensitive drum 22, and the second coupling 59 may drive the toner feeding roller and the developing roller 15.

Figure 21:
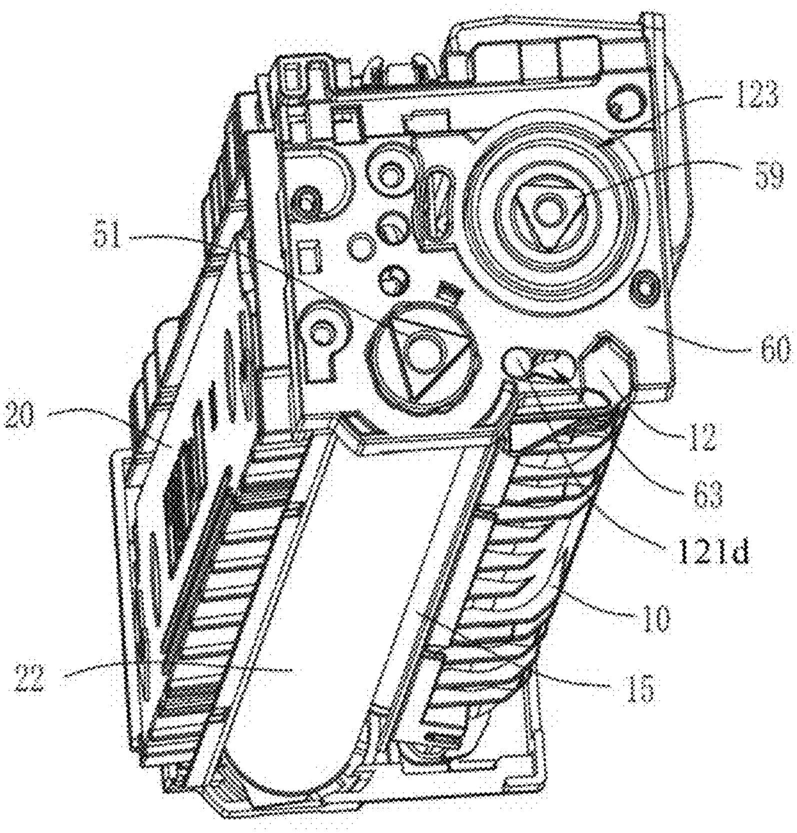
FIG. 21 illustrates a structural schematic of a process cartridge according to exemplary embodiment six of the present disclosure.
Figure 22:
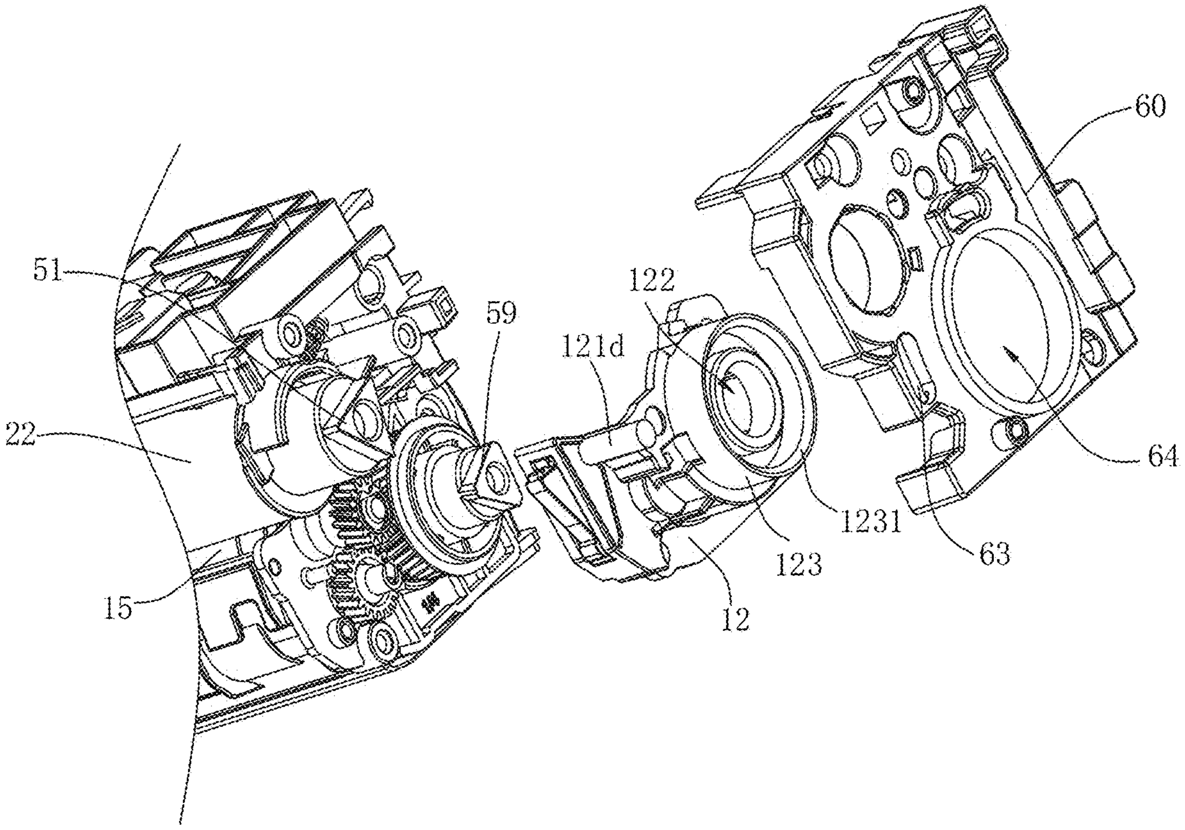
FIG. 22 illustrates a partial exploded schematic of a process cartridge according to exemplary embodiment six of the present disclosure.
Figure 23:
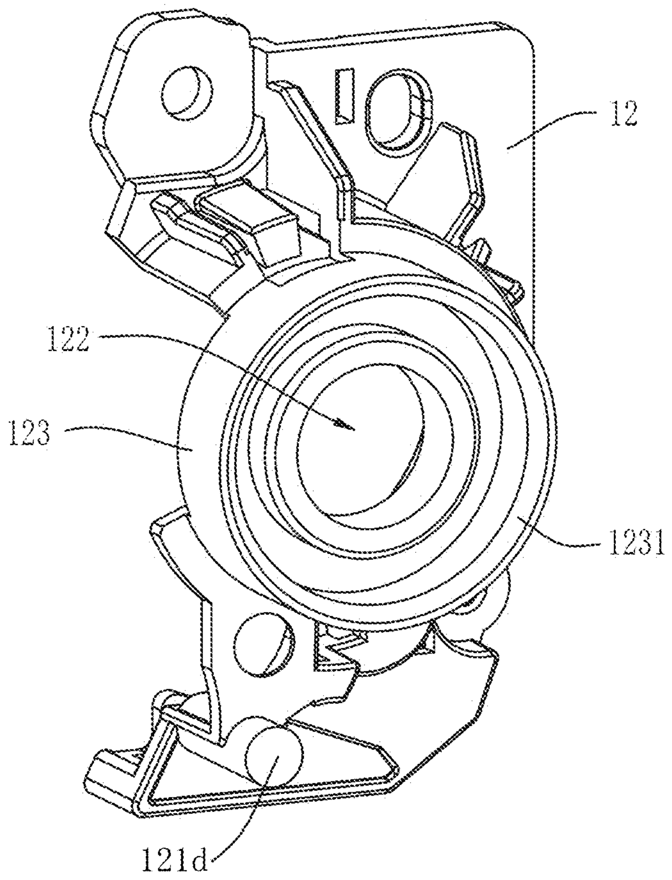
FIG. 23 illustrates a structural schematic of a developing frame of a process cartridge according to exemplary embodiment six of the present disclosure.

As shown in FIGS. 21-23, in one embodiment, the first hole 122 may be formed on the driving end bracket 12; the second hole 64 coaxial with the first hole 122 may be formed on the end cover 60 of the driving end; and a part of the second coupling 59 may pass through the first hole 122 and the second hole 64 in sequence and extend to the outside of the end cover 60. The second coupling 59 may be at a position approximately in the middle of the developing unit 10 along the height direction. Correspondingly, the first hole 122 may be also located at a position approximately in the middle portion of the driving end bracket 12, and the inner diameter of the first hole 122 may be less than the inner diameter of the second hole 64.

As shown in FIG. 21, in one embodiment, the process cartridge may include the second connecting portion, which may be configured to make the developing unit 10 to move between the first position and the second position relative to the drum unit 20. In the first position, the developing roller

15 may be in contact with the photosensitive drum 22. In the second position, the developing roller 15 may be separated from the photosensitive drum 22. When viewed along the axial direction of the developing roller 15, the second connecting portion may not overlap with the second coupling 59.

As shown in FIGS. 21-22, in one embodiment, the second connection part may include a supporting column 121*d* and a guiding portion 63. The supporting column 121*d* may be disposed near one end of the driving end bracket 12 along the height direction, for example, at a position on the end surface of the driving end bracket 12 near the lower end thereof. The end cover 60 may be disposed with the guiding portion 63 cooperating with the supporting column 121*d*, and the supporting column 121*d* may move within the range of the guiding portion 63. For example, the supporting column 121*d* may be a columnar element formed on the end surface of the driving end bracket 12, which may be optionally cylindrical or other multi-faceted prism structures. The guiding portion 63 may be a hole or a through groove formed on the end cover 60. The hole or the through groove may be an arc-shaped hole or an arc-shaped groove. During assembly, the supporting column 121*d* may be inserted in the guiding portion 63. The range of the guiding portion 63 may limit the moving range of the supporting column 121*d*, that is, limit the range of the swing of the developing unit 10 relative to the drum unit 20.

In one embodiment, the swing axis of the developing unit 10 may be roughly the middle position of the height direction thereof and may be also the rotation center of the second coupling 59. When the developing unit 10 is in the first position, the lower end of the developing unit 10 may be adjacent to the lower end of the drum unit 20, such that the developing roller 15 may be in contact with the photosensitive drum 22, and the supporting column 121*d* may be located at one end in the guiding portion 63. When the developing unit 10 moves from the first position to the second position under the force of the pushing part 30, the supporting column 121*d* may move from one end to another end in the guiding portion 63, and the lower end of the developing unit 10 may swing away from the drum unit 20 to drive the developing roller 15 to separate from the photosensitive drum 22.

Furthermore, as shown in FIGS. 22-23, the driving-end bracket 12 may be also disposed with an annular protruding edge 123 which may surround the periphery of the first hole 122. The annular protruding edge 123 may extend from the second hole 64 to the outside of the end cover 60, and a gap may be between the annular protruding edge 123 and the second hole 64. Furthermore, when the developing unit 10 moves from the first position to the second position under the force of the pushing part 30, the annular protruding edge 123 may be not in contact with the second hole 64. A gap may be also between the annular protruding edge 123 and the first hole 122, and the inner diameter of the annular protruding edge 123 may adapt to the size of the driving head of the electronic image-forming apparatus. When the driving head of the electronic image-forming apparatus extends axially to be meshed with the second coupling 59, a portion of the driving head may extend into the gap between the annular protruding edge 123 and the first hole 122; and the annular protruding edge 123 may cover a portion of the driving head, which can play a certain supporting and positioning role.

Furthermore, as shown in FIGS. 22-23, a guiding surface 1231 may be disposed at one end of the annular protruding edge 123 away from the developing unit 10. The guiding surface 1231 may be an inclined surface, which may play a guiding role when the driving head of the electronic image-forming apparatus is meshed with the second coupling 59, such that the meshing of the driving head of the electronic image-forming apparatus and the second coupling 59 may be smoother, and the meshing time may be shortened.

In one embodiment, other structures of the process cartridge may be same as those in exemplary embodiment four, which may not be described in detail herein.

Exemplary Embodiment Seven

The structures in one embodiment may be substantially same as the structures in exemplary embodiment six, and the difference is that the structures of the end cover may be different.

Figure 24:
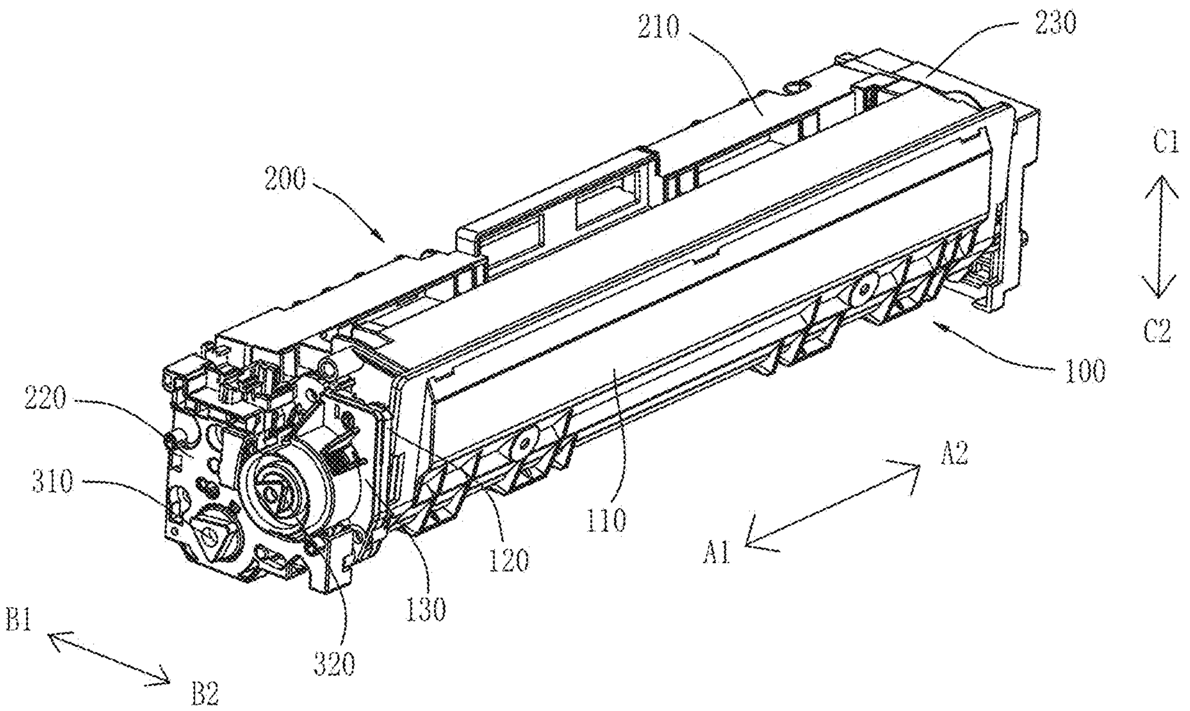
FIG. 24 illustrates an overall structural schematic of a process cartridge from a viewing angle according to exemplary embodiment seven of the present disclosure.
Figure 25:
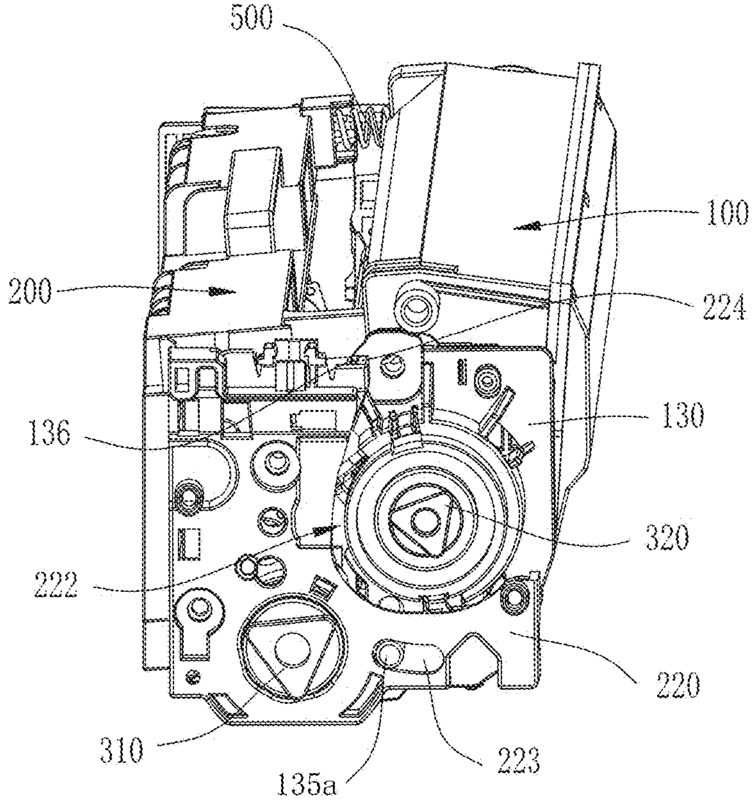
FIG. 25 illustrates an overall structural schematic of a process cartridge from another viewing angle according to exemplary embodiment seven of the present disclosure.

As shown in FIGS. 24-25, the process cartridge may be approximately in the shape of a rectangular box, which has length along the first direction (directions A1 and A2), width along the second direction (directions B1 and B2), and height along the third direction (directions C1 and C2). One end of the process cartridge along the A1 direction may be the driving end, and another end of the process cartridge along the A2 direction may be the conductive end. The developing unit 100 and the drum unit 200 may be arranged to be opposite to each other along the second direction. The direction from the developing unit 100 toward the drum unit 200 is the B1 direction, one end of the process cartridge along the B1 direction may be a front end; the direction from the drum unit 200 toward the developing unit 100 is the B2 direction, and another end of the process cartridge along the B2 direction may be a rear end; and one end of the process cartridge along the C1 direction may be an upper end, and another end of the process cartridge along the C2 direction may be a lower end.

The length direction of the developing frame 110 may extend along the first direction (A1 and A2 directions). The developing frame 110 may be disposed with the driving side bracket 120 and the conductive-side bracket at two ends of the length direction (A1 and A2 directions) respectively. The stirring frame, the toner feeding roller and the developing roller may be rotatably supported on the driving side bracket 120 and the conductive-side bracket at two ends of the developing frame 110 along the length direction. The stirring frame, the toner feeding roller and the developing roller may rotate under the action of the driving assembly; and the axial directions of the stirring frame, the toner feeding roller and the developing roller may be all along the length direction of the developing frame 110 (the first direction). The toner in the toner bin may be stirred by the stirring frame to prevent the toner in the toner bin from agglomerating, and the toner may also be transported to the toner feeding roller. The toner feeding roller may transport the toner to the developing roller to be adsorbed by the charged developing roller.

As shown in FIGS. 24-25, the photosensitive frame 210 may be disposed with end covers at two ends along the first direction, which may respectively be a driving-side end cover 220 fixedly arranged at one end of the photosensitive frame 210 along the A1 direction and a conductive-side end cover 230 fixedly arranged at one end of the photosensitive frame 210 along the A2 direction. The photosensitive drum may be rotatably supported on the driving-side end cover 220 and the conductive-side end cover 230. For example, the photosensitive drum may be disposed on the lower end side (the side of C2 direction) of the photosensitive frame 210 along the height direction.

Figure 26:
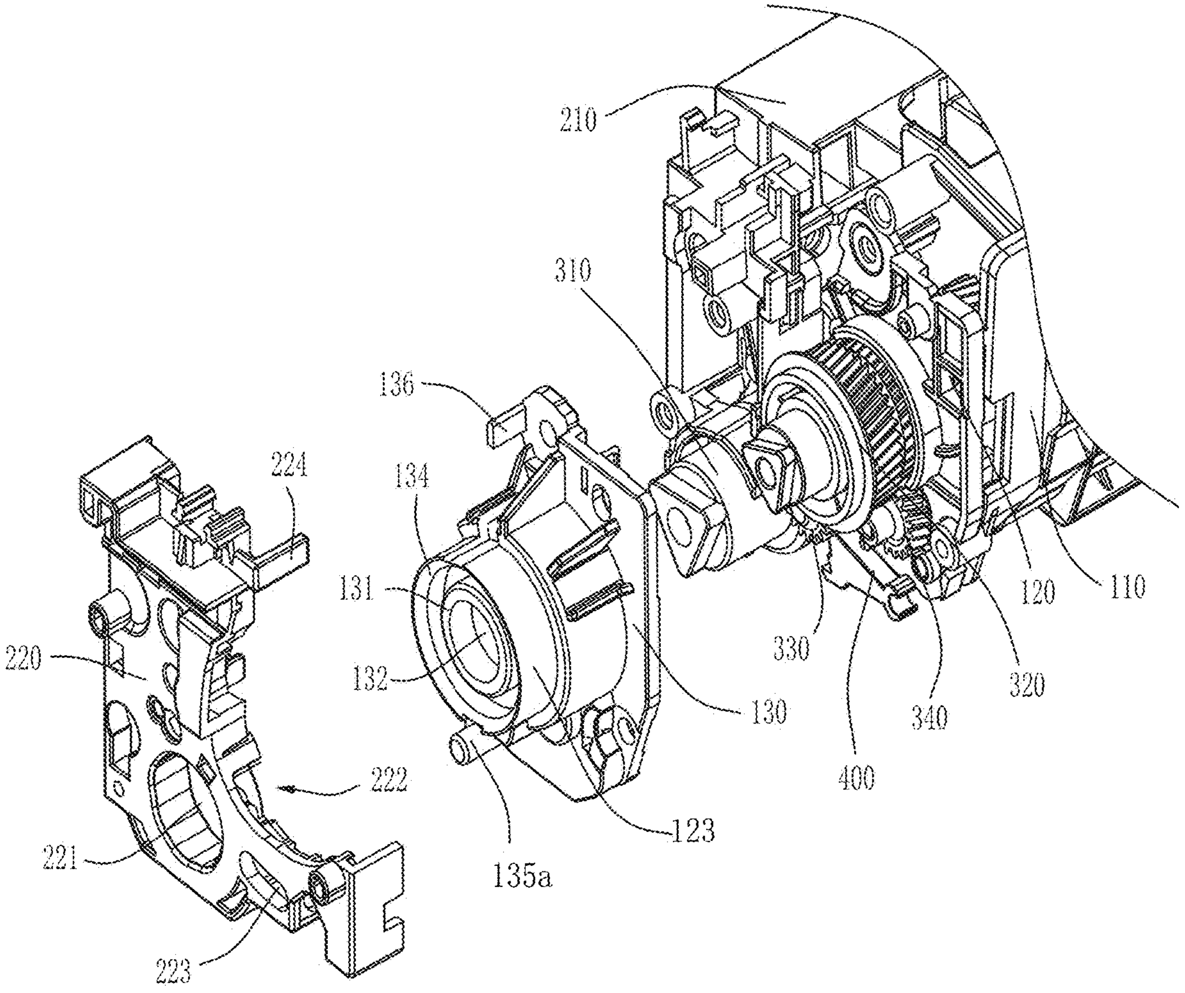
FIG. 26 illustrates a partial exploded structural schematic of a process cartridge according to exemplary embodiment seven of the present disclosure.

As shown in FIGS. 24-26, the driving assembly may include a first coupling 310, a second coupling 320, a developing roller gear 330, a toner feeding roller gear 340 and a stirring frame gear. The driving assembly may be disposed at one or two ends of the cartridge body along the first direction (the length direction). In one embodiment, the driving assembly may be disposed at same end of the developing unit 100 along the length direction, optionally, the driving end (the end along the A1 direction). The first coupling 310 may be disposed at one end of the photosensitive drum along the A1 direction and configured to mesh with the photosensitive driving head of the electronic image-forming apparatus to receive the driving force and drive the photosensitive drum to rotate. The second coupling 320, the developing roller gear 330, the toner feeding roller gear 340, and the stirring frame gear may be disposed on the outer side of the driving side bracket 120. For example, the driving side bracket 120 may be disposed with a supporting hole for supporting the second coupling 320; the second coupling 320 may be configured to mesh with the developing driving head of the electronic image-forming apparatus to receive the driving force; and the second coupling 320 may be located approximately in the middle portion of the developing unit 100 along the third direction. The developing roller gear 330 may be sleeved on one end of the developing roller axle extending from the driving side bracket 120; the toner feeding roller gear 340 may be sleeved on one end of the toner feeding roller axle extending from the driving side bracket 120; the stirring frame gear may be sleeve on one end of the stirring frame extending from the driving side bracket 120; and the developing roller gear 330, the toner feeding roller gear 340 and the stirring frame gear may be directly or indirectly meshed with the second coupling 320. Therefore, the second coupling 320 may transmit received driving force, thereby driving the developing roller, the toner feeding roller, and the stirring frame to rotate. Along the third direction, the second coupling 320 may be located on the upper side of the first coupling 310 (the side of the C1 direction).

As shown in FIGS. 24-26, a developing protection cover 130 may be also disposed on the outside of the driving side bracket 120. The developing protection cover 130 may cover the developer roller gear 330, the toner feeding roller gear 340, the stirring frame gear and a part of the second coupling 320 and may protect the driving assembly. For example, a cylindrical portion 131 may be disposed on the developing protection cover 130; the cylindrical portion 131 may protrude along a side away from the developing frame 110; the cylindrical portion 131 may be hollowed inside to form the third hole 132; the axial direction of the third hole 132 may extend along the first direction; and a portion of the second coupling 320 may extend out of the developing protection cover 130 through the third hole 132.

Figure 27:
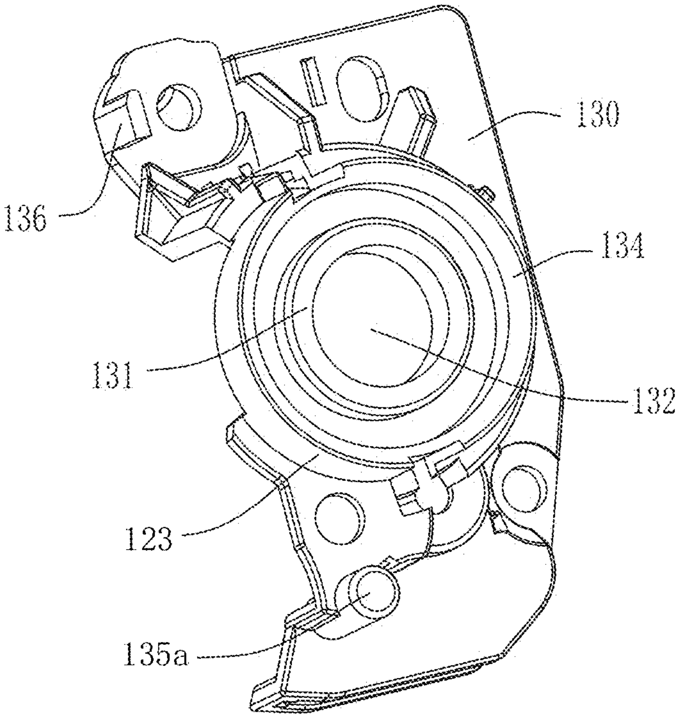
FIG. 27 illustrates a structural schematic of a developing protection cover of a process cartridge according to exemplary embodiment seven of the present disclosure.

As shown in FIGS. 26-27, the developing protection cover 130 may be also disposed with the annular protruding edge 123 which may surround the outer periphery of the cylindrical portion 131. A gap may be between the annular protruding edge 123 and the cylindrical portion 131. The inner diameter of the annular protruding edge 123 may adapt to the size of the developing driving head of the electronic image-forming apparatus. When the developing driving head of the electronic image-forming apparatus extends axially to mesh with the second coupling 320, a portion of the developing driving head may extend into the gap between the annular protruding edge 123 and the cylindrical portion 131; and the annular protruding edge 123 may cover a portion of the developing driving head, which can play a certain supporting and positioning role.

Furthermore, as shown in FIGS. 26-27, a guiding surface 134 may be disposed at one end of the annular protruding edge 123 away from the developing unit 100. The guiding surface 134 may be an inclined surface, which may play a guiding role when the developing driving head of the electronic image-forming apparatus is meshed with the second coupling 320, such that the developing driving head of the electronic image-forming apparatus and the second coupling 320 may be meshed more smoothly and the meshing time may be shortened.

As shown in FIGS. 24-26 and 28, the conductive-side end cover 230 may be disposed on the outside of the conductive-side bracket, and the driving-side end cover 220 may be disposed on the outside of the developing protection cover 130. Viewed along the length direction of the process cartridge, the driving-side end cover 220 and the developer protection cover 130 may be at least partially overlapped with each other. The driving-side end cover 220 and the conductive-side end cover 230 may cover at least a portion of the end of the photosensitive frame 210 and the developing frame 110, respectively. The driving-side end cover 220 may be fixedly connected to the end of the photosensitive frame 210.

As shown in FIGS. 24-26 and 28, the driving-side end cover 220 may be disposed with the first hole 221 and a notch portion 222 (notch structure). When the driving-side end cover 220 is installed at the end of the developing frame 110 and the photosensitive frame 210, a portion of the first coupling 310 may be exposed through the first hole 221, and a portion of the second coupling 320 may be exposed through the notch portion 222, such that the coupling may be meshed with the driving head of the electronic image-forming apparatus to receive the driving force. The notch portion 222 may extend upward and backward from the position corresponding to the second coupling 320 to the upper end and rear end of the drive side end cover 220. That is, an opening part may be dug out on the driving-side end cover 220, and most of the developing protection cover 130 may be exposed through the notch portion 222. Through the notch portion 222, the internal structure of the process cartridge (especially the internal structure of the developing unit 100) may be observed to a certain extent. In the case of partial maintenance, maintenance may be achieved without removing the drive side end cover 220, which may be more convenient for maintenance. After the drive side end cover 220 is installed in place, the annular protruding edge 123 of the developing protection cover 130 may extend from the notch portion 222 of the drive side end cover 220 and protrude from the surface of the drive side end cover 220. The annular protruding edge 123 may be not in contact with the drive side end cover 220; that is, the annular protruding edge 123 may be completely located within the range of the notch portion 222.

As shown in FIGS. 25-28, in one embodiment, the process cartridge may also include a connecting portion, a limiting portion 224, a limited portion 136, a pushing part 400 and an elastic part 500, which may be configured to realize the movement of the developing unit 100 between the first position and the second position relative to the drum unit 200. In the first position, the developing roller may be in contact with the photosensitive drum; in the second position, the developing roller may be separated from the photosensitive drum. Viewed along the axial direction (the first direction) of the developing roller, the connecting portion may not be overlapped with the second coupling 320.

As shown in FIGS. 25-28, in one embodiment, the connecting portion may include a supporting column 135*a* and a guiding portion 223. The supporting column 135*a* may be disposed near one end of the developing protection cover 130 along the third direction, for example, at the position near the lower end on the end surface of the developing protection cover 130. The driving-side end cover 220 may be disposed with the guiding portion 223 cooperating the supporting column 135*a*. The supporting column 135*a* may move within the range of the guiding portion 223, and the guiding portion 223 may be located below the notch portion 222 along the third direction. The supporting column 135*a* may correspond to the guiding portion 223 and may be also located below the notch portion 222. That is, when viewed along the axial direction of the developing roller, the connecting portion may be always located below the notch portion 222 and have no overlapping portion with the notch portion 222; and the second coupling 320 and the annular protruding edge 123, the cylindrical portion 131 and the like on the developing protection cover 130 may be all within the range of the notch portion 222. Therefore, when viewed along the axial direction of the developer roller, there is no overlapping portion between the connecting portion and the second coupling 320.

Figure 28:
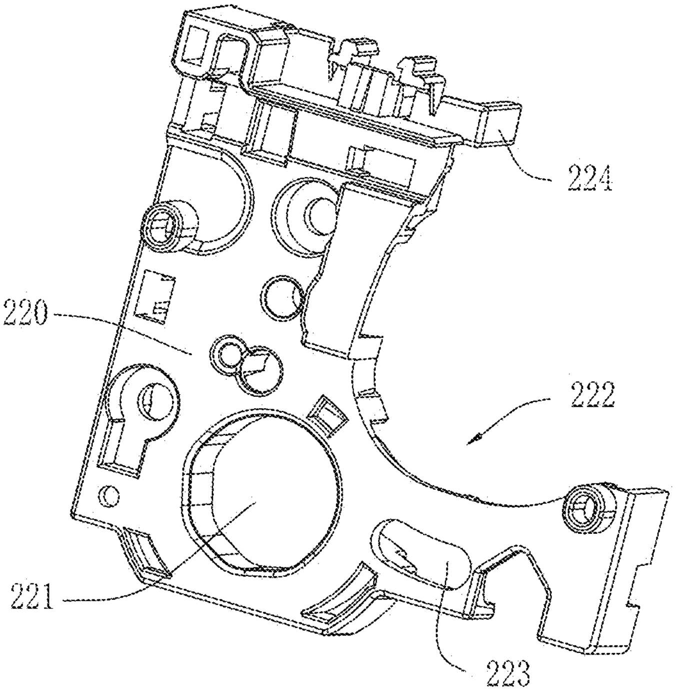
FIG. 28 illustrates a structural schematic of a driving-side end cover of a process cartridge according to exemplary embodiment seven of the present disclosure.
Figure 29:
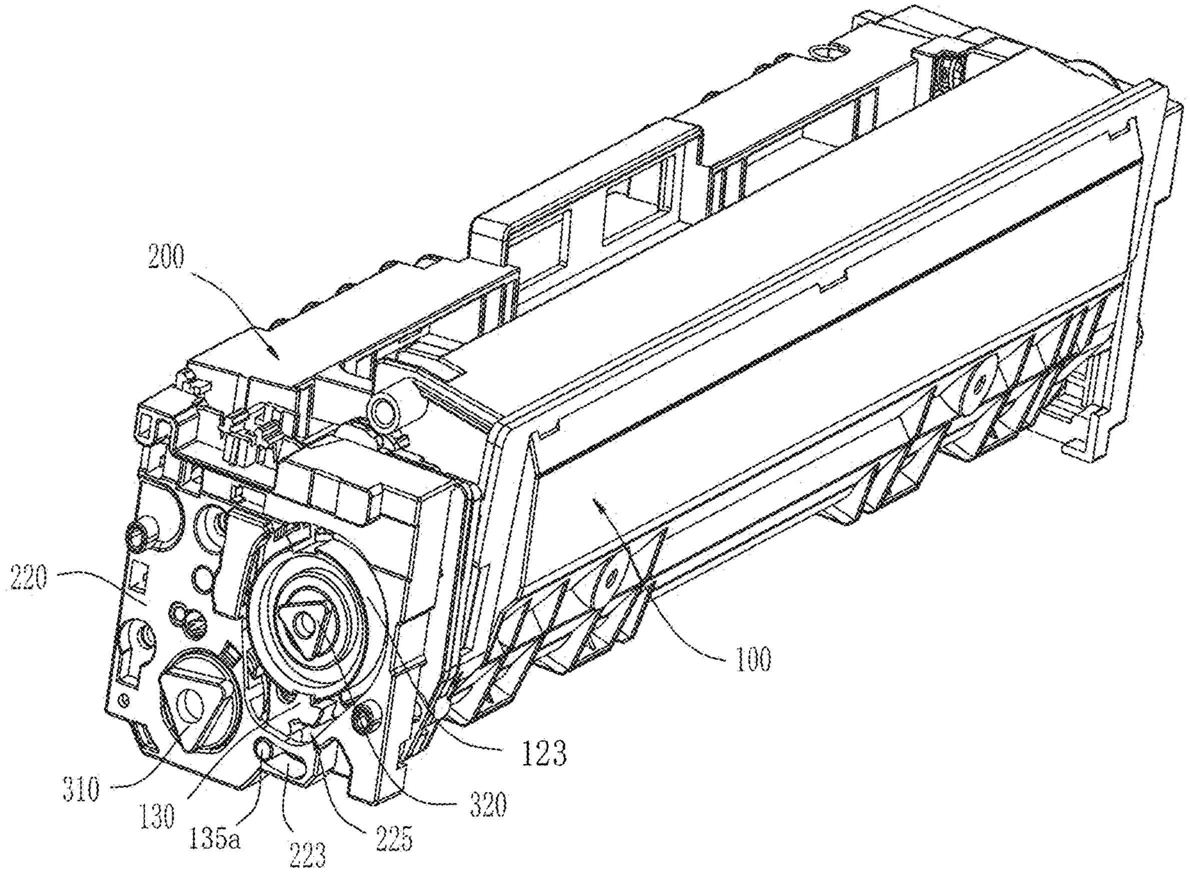
FIG. 29 illustrates an overall structural schematic of a process cartridge from a viewing angle according to exemplary embodiment eight of the present disclosure.
Figure 30:
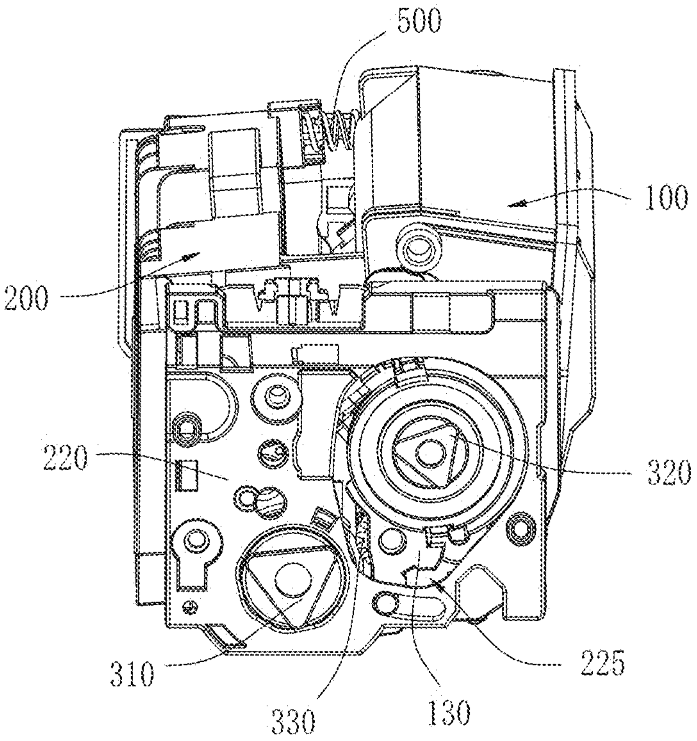
FIG. 30 illustrates an overall structural schematic of a process cartridge from another viewing angle according to exemplary embodiment seven of the present disclosure.

For example, as shown in FIGS. 27-28, the supporting column 135*a* may be a columnar element formed on the end surface of the developing protection cover 130, optionally, a cylindrical shape or other multi-faceted prism structures. The guiding portion 223 may be a hole or a through groove formed on the drive side end cover 220. The hole or through groove may be an arc-shaped hole or arc-shaped groove, and the guiding portion 223 may extend roughly along the second direction. During assembly, the supporting column 135*a* may be inserted in the guiding portion 223, and the range of the guiding portion 223 may limit the moving range of the supporting column 135*a*, that is, limit the swing range of the developing unit 100 relative to the drum unit 200.

In one embodiment, as shown in FIGS. 25-28, the limiting portion 224 may be disposed at the position of the upper edge of the driving-side end cover 220 near the notch portion 222, that is, the limiting portion 224 may be disposed at the upper end of the driving-side end cover 220 and beside the notch portion 222. The limiting portion 224 may be a protrusion formed on the inner wall of the driving-side end cover 220 and extend along the A2 direction. The developing protection cover 130 may be disposed with the limited portion 136 cooperating with the limiting portion 224. The limited portion 136 may be a protrusion formed on the outer wall of the developing protection cover 130 and extend along the A1 direction. The limiting portion 224 may be in contact with the limited portion 136 when the developing unit 100 moves from the second position to the first position; and along the second direction, the limiting portion 224 may be located at the rear side of the limited portion 136 (the side along the B2 direction). The limiting portion 224 may be in contact with the limited portion 136 to play a limiting role, thereby preventing the developing unit 100 from deviating from the first position. When the developing unit 100 is in the first position, the lower end of the developing unit 100 may be adjacent to the lower end of the drum unit 200, such that the developing roller may be in contact with the photosensitive drum. The supporting column 135*a* may be at one end along the B1 direction in the guiding portion 223. When the developing unit 100 is moved from the first position to the second position by the force of the electronic image-forming apparatus, the supporting column 135*a* may move from one end along the B1 direction to one end along the B2 direction in the guiding portion 223; the lower end of the developing unit 100 may swing along the direction away from the drum unit 200 (roughly along the B2 direction) to drive the developing roller to separate from the photosensitive drum; and the upper end of the developing unit 100 may swing toward the direction adjacent to the drum unit 200 (approximately move along the B1 direction), and the limited portion 136 may move along the B1 direction to be separated from the limiting portion 224.

As shown in FIG. 26, the movement of the developing unit 100 from the first position to the second position may be achieved by the cooperation of the pushing part 400 and the force-applying part in the electronic image-forming apparatus. For example, the developing unit 100 may be disposed with the pushing part 400 at one or two ends along the length direction. The pushing part 400 may be rotatably disposed on the end surface of the developing unit 100. The pushing part 400 may be in a strip arm shape. One end of the pushing part 400 may be hinged to the developing unit 100, and another end of the pushing part 400 may drive the developing unit 100 to move from the first position to the second position along the direction away from the drum unit 200 when receiving the force of the force-applying part, such that the developing roller may be separated from the photosensitive drum.

In one embodiment, the pushing part 400 may be hinged on the lower end of the developing protection cover 130. The pushing part 400 may not be disposed on the developing protection cover 130. The supporting axle may be disposed on the end surface of the developing unit 100, and one end of the pushing part 400 may be sleeved on the supporting axle, which may also complete the installation of the pushing part 400. A portion of the free end of the pushing part 400 may be exposed from below outside the developing frame 110, such that the force-applying part may be in contact with such portion from below, thereby applying the force to such portion.

As shown in FIG. 25, the elastic part 500 may be disposed between the drum unit 200 and the developing unit 100 and configured to move the developing unit 100 from the second position to the first position and drive the developing roller to be in contact with the photosensitive drum. For example, one end of the elastic part 500 may be connected to the upper end of the photosensitive frame 210, and the other end of the elastic part 500 may be connected to the upper end of the developing frame 110. The elastic part 500 may be, optionally, a spring, and may also be an elastic rubber, an elastic sponge, an elastic part, or other components capable of providing elastic force.

When the electronic image-forming apparatus is not operating, the force-applying part may be in contact with the pushing part 400 from below and apply force to the pushing part 400, which may make the pushing part 400 to rotate relatively around the connecting end thereof. After the force is applied to the developing unit 100, the lower end of the developing unit 100 may swing away from the drum unit 200 (roughly along the B2 direction) to drive the developing roller to separate from the photosensitive drum. The upper end of the developing unit 100 may move toward the direction adjacent to the photosensitive drum (roughly along the B1 direction) to compress the elastic part 500; and the limited portion 136 may follow the developing unit 100 to move along the B1 direction to be separated from the limiting portion 224. Meantime, the supporting column 135*a* may move from one end along the B1 direction to another end along the B2 direction in the guiding portion 223, and the connecting portion may play a supporting and positioning role during the movement of the developing unit 100.

When the electronic image-forming apparatus needs to operate, the force exerted by the force-applying part on the pushing part 400 may be removed, and the elastic part 500 may recover elastic deformation to push the developing unit 100 from the second position to the first position; the developing roller may be in contact with the photosensitive drum; and the pushing part 400 may also return to original position with the movement of the developing unit 100. Meantime, the supporting column 135*a* may move from one end along the B2 direction to another end along the B1 direction in the guiding portion 223. The limited portion 136 may swing with the developing unit 100 to contact the limiting portion 224, such that the developing unit 100 may be maintained in the first position.

During the movement of the developing unit 100 relative to the drum unit 200, the annular protruding edge 123 on the developing cover 130 may be not in contact with the driving-side end cover 220. That is, regardless of whether the developing unit 100 is in the first position or the second position, the annular protruding edge 123 may be not in contact with the driving-side end cover 220.

Exemplary Embodiment Eight

The structures in one embodiment may be substantially same as the structures in exemplary embodiment seven, and the difference is that the structures of the end cover may be different.

As shown in FIGS. 29-32, in one embodiment, the limiting portion 224 may be omitted on the driving-side end cover 220, and the limited portion 136 may be omitted on the developer protection cover 130; and the notch portion may be configured as the second hole, that is, the first hole 221 and the second hole 225 may be configured on the driving-side end cover 220. A portion of the first coupling 310 may be exposed through the first hole 221, and a portion of the second coupling 320 may be exposed from the second hole 225. The first hole 221 may be a circular hole, and the second hole 225 may be approximately an elliptical hole. Along the third direction, the first hole 221 and the second hole 225 may have an overlapping portion. The second coupling 320 and the annular protruding edge 123, the cylindrical portion 131 and the like on the developing protection cover 130 may be all within the range of the second hole 225; and the connecting portion may be at the lower side of the second hole 225. Therefore, viewed along the axial direction of the developing roller, the connecting portion may have no overlapping portion with the second coupling 320.

During the movement of the developing unit 100 relative to the drum unit 200, the annular protruding edge 123 on the developing protection cover 130 may be never in contact with the inner edge of the second hole 225. That is, regardless of whether the developing unit 100 is in the first position or the second position, the annular protruding edge 123 may be not in contact with the inner edge of the second hole 225.

Figure 31:
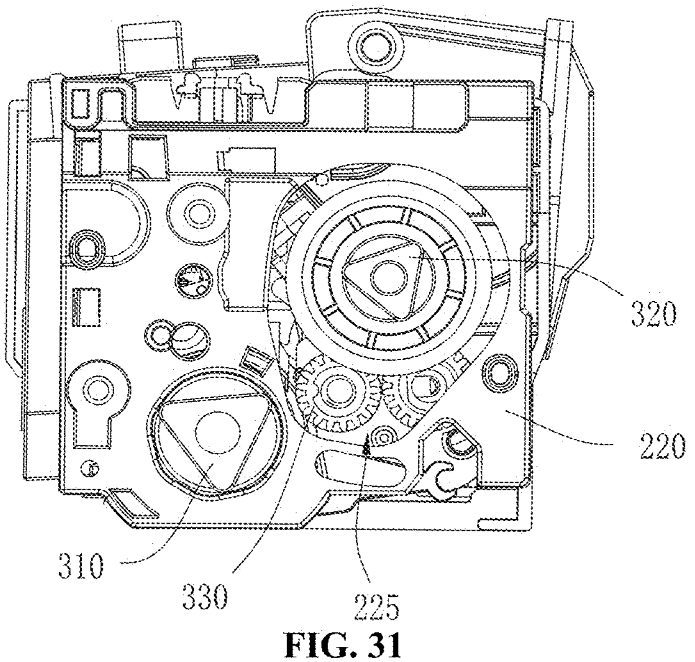
FIG. 31 illustrates a schematic of a process cartridge viewed along an axial direction of a developing roller according to exemplary embodiment eight of the present disclosure (the developing protection cover is omitted).
Figure 32:
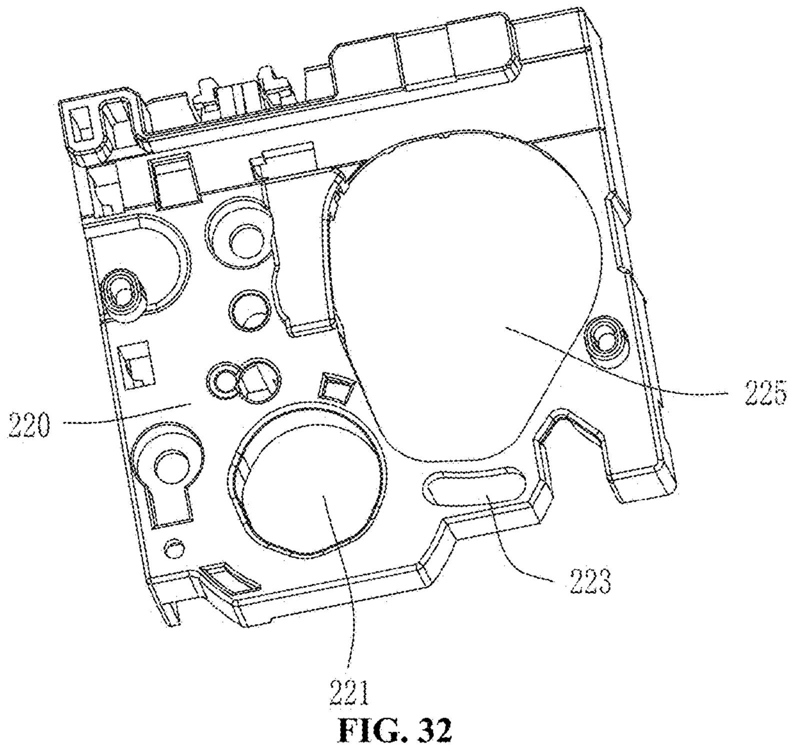
FIG. 32 illustrates a structural schematic of a driving-side end cover of a process cartridge according to exemplary embodiment eight of the present disclosure.
Figure 33:
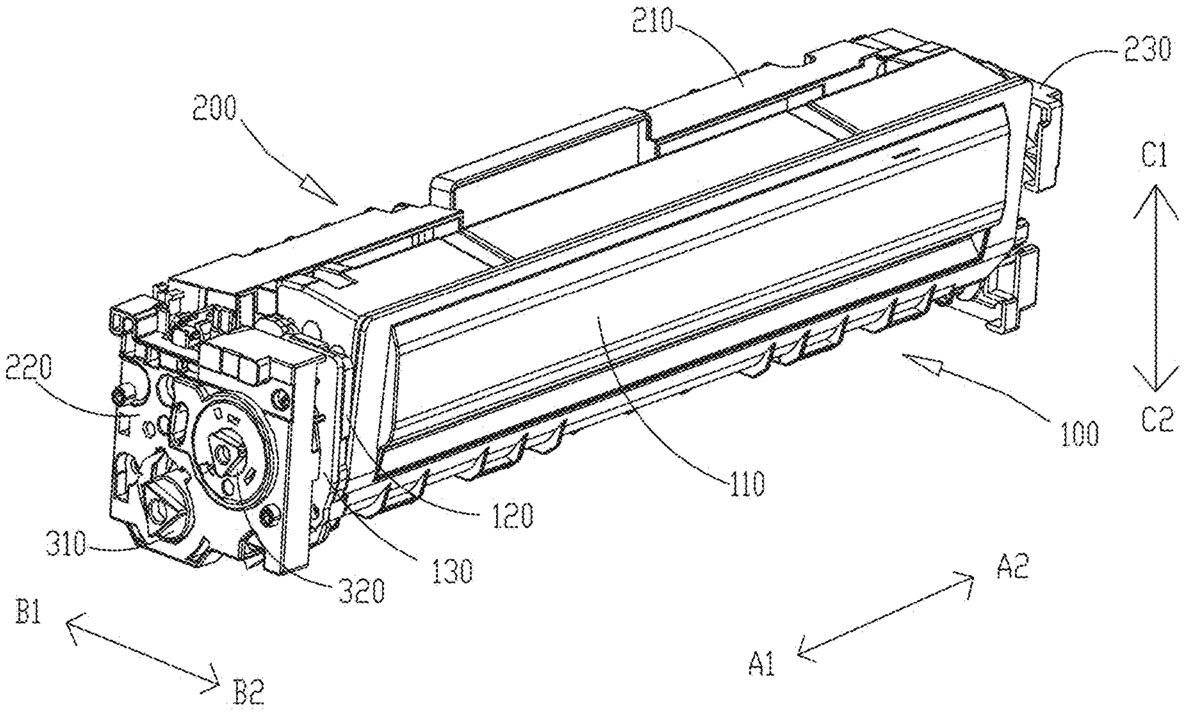
FIG. 33 illustrates an overall structural schematic of a process cartridge from a viewing angle according to exemplary embodiment nine of the present disclosure.
Figure 34:
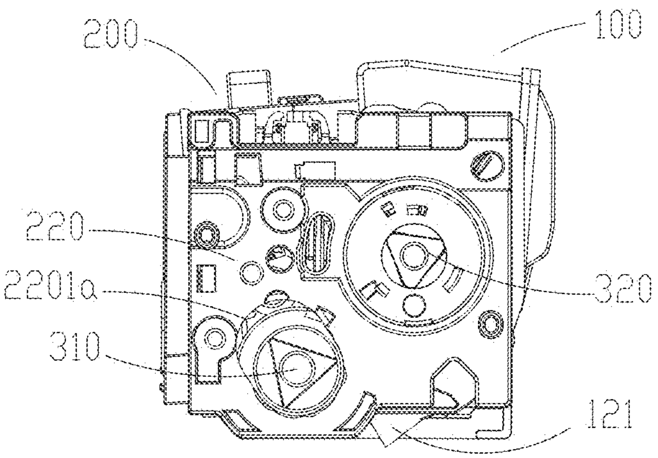
FIG. 34 illustrates a structural schematic of a driving side of a process cartridge according to exemplary embodiment nine of the present disclosure.

In one embodiment, as shown in FIG. 31, the developing roller gear 330 may be meshed with the second coupling 320; the rotation axis of the developing roller gear 330 may be located below the rotation axis of the second coupling 320 along the third direction; and along the second direction, the rotation axis of the developing roller gear 330 may be located in front of the rotation axis of the second coupling 320. The developing roller gear 330 may be exposed through the second hole 225, that is, the developing roller gear 330 may be located within the range of the second hole 225. When observed along the axial direction (the first direction) of the developing roller, the developing roller gear 330 may have no overlapping portion with the driving-side end cover 220.

During the movement of the developing unit 100 relative to the drum unit 200, the developing roller gear 330 may move accordingly. The motion trajectory of the developing roller gear 330 may reciprocate roughly along the second direction. Regardless of whether the developing unit 100 is located in the first position or the second position, the developing roller gear 330 may be always located within the range of the second hole 225. That is, viewed along the axial direction of the developing roller, the projection of the developing roller gear 330 may completely fall into the projection of the second hole 225, and the developing roller gear 330 may be never overlapped with the driving-side end cover 220.

In one embodiment, other structures of the process cartridge may be same as those in exemplary embodiment seven, which may not be described in detail herein.

Exemplary Embodiment Nine

The structures in one embodiment may be substantially same as the structures in above-mentioned exemplary embodiments, and the difference is that during the process of separation or contact between the developing roller and the photosensitive drum, the developing unit 100 as a whole may not move relative to the drum unit 200, but the photosensitive drum itself may move relative to the developing unit 100.

Figure 35:
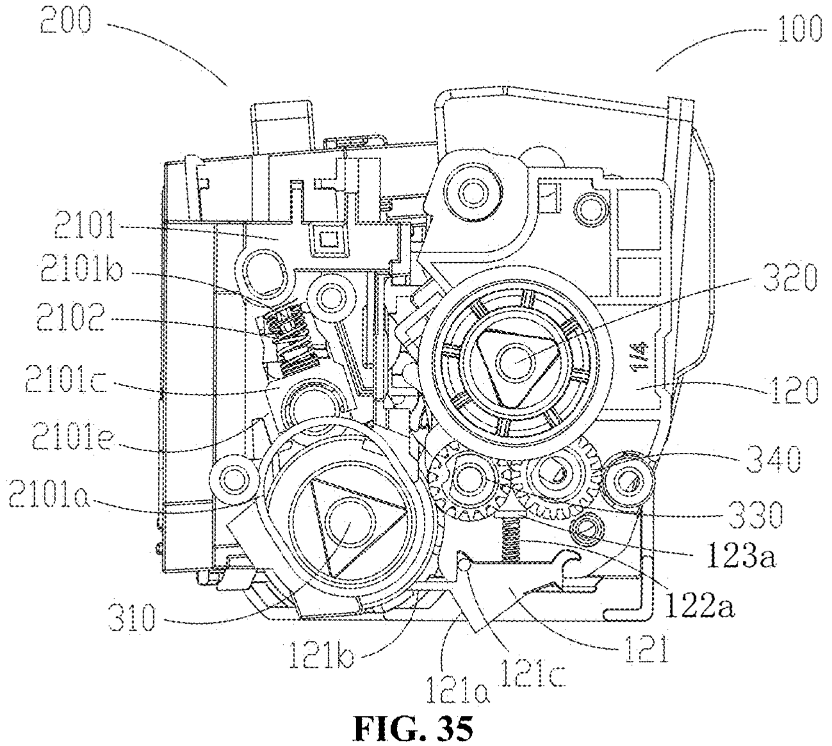
FIG. 35 illustrates a structural schematic of a process cartridge after removing an end cover and a developing protection cover according to exemplary embodiment nine of the present disclosure.
Figure 36:
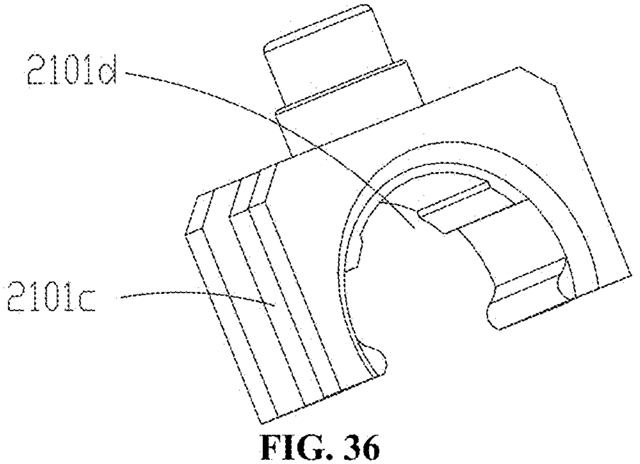
FIG. 36 illustrates a structural schematic of a sliding block installed on a process cartridge according to exemplary embodiment nine of the present disclosure.

As shown in FIGS. 33-36, the photosensitive frame 210 may be disposed with an integral or split photosensitive bracket 2101 at two ends along the first direction. Taking the driving side as an example, the photosensitive bracket 2101 may be disposed with the first avoiding portion 2101*a*. For example, the first avoiding portion 2101*a* may be roughly elliptical, so that the first coupling 310 may move in the first avoiding portion 2101*a* when subjected to an external force perpendicular to the axial direction of the photosensitive drum. The photosensitive bracket 2101 may be also disposed with a charging roller installation structure. The charging roller installation structure may include a fifth elastic part 2102, an elastic part disposing portion 2101*b* and an installation sliding block 2101*c* (as shown in FIG. 36). The elastic part disposing portion 2101*b* may be configured to install the fifth elastic part 2102; the installation sliding block 2101*c* may be configured to install the charging roller and include a first guiding-sliding groove 2101*d*; and the first guiding-sliding groove 2101*d* may be locked with the sidewall 2101*e* of the photosensitive bracket 2101, where two ends of the charging roller may be installed on the installation sliding block 2101*c*. The outer side of the photosensitive bracket 2101 along the first direction of the photosensitive frame 210 may be disposed with end covers, which may respectively be the driving-side end cap 220 fixedly disposed at one end of the photosensitive frame 210 along the A1 direction and the conductive-side end cap 230 fixedly disposed at one end of the photosensitive frame 210 along the A2 direction. The driving-side end cover 220 and the conductive-side end cover 230 may be respectively disposed with avoiding portions which may be same as the avoiding portion of the photosensitive bracket 2101 and cooperate with the first coupling 310 to move. Taking the driving side as an example, in some embodiments, the driving-side end cover 220 may include the second avoiding portion 2201*a* having a shape substantially same as the first avoiding portion 2101*a* of the photosensitive bracket 2101. The first coupling 310 may be exposed through the first avoiding portion 2101*a* of the photosensitive bracket 2101 and the second avoiding portion 2201*a* of the drive side end cover 220. In addition, the first coupling 310 may move in two avoiding portions. Meanwhile, the non-driving side of the process cartridge may be also disposed with same avoiding portion as the driving side. Therefore, the photosensitive drum may be rotatably supported on the driving-side end cover 220 and the conductive-side end cover 230; and the photosensitive drum may be disposed on the lower end side (the side of the C2 direction) of the photosensitive frame 210 along the height direction.

Further, the driving-side end cover 220 may be disposed outside the photosensitive bracket 2101 and the developing protection cover 130; and the driving-side end cover 220, the photosensitive bracket 2101 and the developing protection cover 130 may be fixedly connected to each other.

Figure 37:
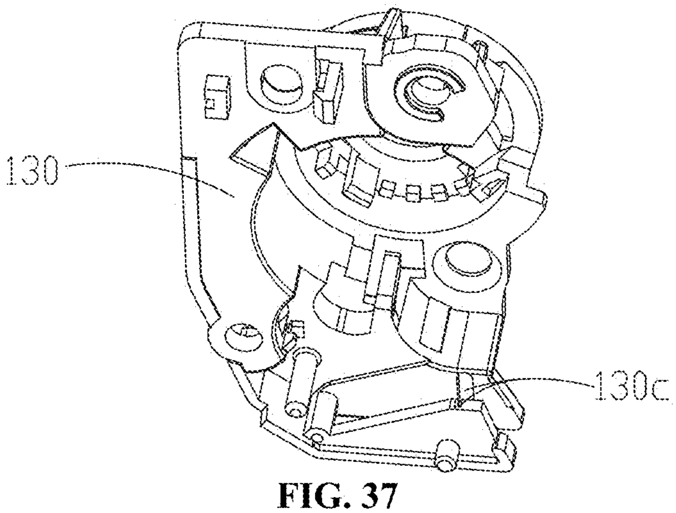
FIG. 37 illustrates a structural schematic of a developing protection cover of a process cartridge according to exemplary embodiment nine of the present disclosure.
Figure 38:
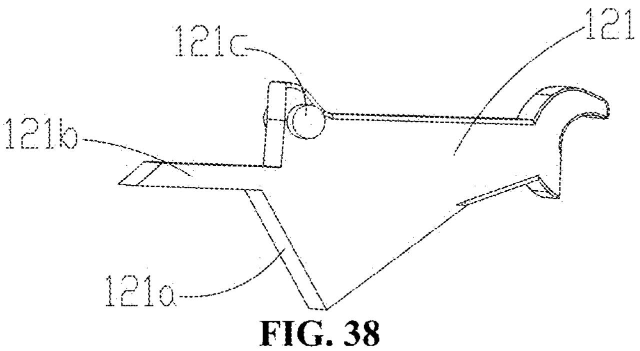
FIG. 38 illustrates a structural schematic of a force-receiving part of a process cartridge according to exemplary embodiment nine of the present disclosure.

As shown in FIGS. 35, 37 and 38, the driving side bracket 120 and the developing protection cover 130 may be disposed with a pushing part 121 for receiving the force from the electronic image-forming apparatus, a sixth elastic part 122*a* and an installation portion 123*a* for installing the sixth elastic part. The pushing part 121 may include a force-receiving portion 121*a*, a force-applying portion 121*b* and a protrusion 121*c*. The forced pushing part 121 may be installed on the installation portion 123*a* of the driving side bracket 120 through the sixth elastic part 122*a*. The force-applying portion 121*b* of the forced pushing part 121 may be abutted against the end of the photosensitive drum to receive the force from the electronic image-forming apparatus through the force-receiving portion 121*a* of the forced pushing part 121 and then apply the force to the photosensitive drum through the force-applying portion 121*b*. The forced pushing part 121 may be also disposed with the protrusion 121*c*, and the developing protection cover 130 may be disposed with the second guiding groove 130*c* cooperating with the protrusion 121*c*. When the forced pushing part 121 is subjected to external force, the protrusion 121*c* may move in the second guiding groove 130*c* along the third direction. The force-receiving portion 121*a* may be a force-receiving inclined surface. When the electronic image-forming apparatus applies a horizontal force to the force-receiving portion 121*a*, the force-receiving inclined surface may decompose the horizontal force; and the component force along the C1 direction may make the pushing part 121 to move along the C1 direction in the second guiding groove 130*c*. The tail of the pushing part 121 (the other side opposite to the force-receiving portion 121*a* along the second direction) may be abutted against the driving side bracket 120 to limit the position of the pushing part 121. In some embodiments, the fifth elastic part 2102 and the sixth elastic part 122*a* may be springs, or may be elastic rubber, elastic sponges, elastic plates or other components that can provide elastic force.

When the electronic image-forming apparatus is operating, the developing roller and the photosensitive drum may need to be in tight contact. When the image-forming apparatus is not operating, the developing roller and photosensitive drum may need to be separated by a certain distance, which may avoid problems including the photosensitive drum's contamination by excess developer attached to the developing roller caused by long-term contact between the developing roller and the photosensitive drum, deformation of the developing roller, wear and tear of the photosensitive drum, and the like.

Therefore, the photosensitive drum in one embodiment may be configured to be able to move relative to the developing roller itself on the photosensitive frame 210, such that the developing roller and the photosensitive drum may be in contact with each other when the electronic image-forming apparatus is operating and may be separated from each other when the electronic image-forming apparatus is not operating. When the process cartridge is installed in the electronic image-forming apparatus, the drum unit 200 may be in contact with components in the electronic image-forming apparatus, and the drum unit 200 may be not movable; and the driving-side end cover 220 may fixedly connect the developing unit 100 with the drum unit 200, such that the developing unit 100 may also be not movable. The photosensitive drum may be configured to be movable between the first position and the second position relative to the developing roller (i.e., relative to the drum unit 200 and the developing unit 100). When the photosensitive drum is in the first position, the developing roller may be in contact with the photosensitive drum; and when the photosensitive drum is in the second position, the developing roller may be separated from the photosensitive drum.

As shown in FIG. 35, when the process cartridge is in the initial position of being installed in the electronic image-forming apparatus, the photosensitive drum may be in contact with the developing roller. At this point, the fifth elastic part 2102 may be in the initial state; the protrusion 121*c* of the forced pushing part 121 may be at the end of the second guiding groove 130*c* along the C2 direction on the developing protection cover 130; the force-applying portion 121*b* of the pushing part 121 may be not abutted against the photosensitive drum; the first coupling 310 may be at the end of the avoiding portion along the C2 direction; the charging roller may be abutted against the photosensitive drum; and the sixth elastic part 122*a* may be in the initial state. When the process cartridge does not perform developing operation, the force-receiving portion 121*a* may receive the force applied by the electronic image-forming apparatus to the pushing part 121; and the pushing part 121 may follow the protrusion 121*c* to move along the C1 direction in the second guiding groove 130*c* on the developing cover 130. At this point, the sixth elastic part 122*a* may be compressed; the force-applying portion 121*b* of the forced-applying part 121 may be abutted against the photosensitive drum to apply force to the photosensitive drum; and the first coupling 310 may move in the first avoiding portion 2101*a* of the photosensitive bracket 2101 and the second avoiding portion 2201*a* of the drive side end cover 220 along the direction away from the developing roller (roughly along the C1 and B1 directions). The photosensitive drum and the charging roller are always in contact with each other, such that under the pushing of the photosensitive drum, the first guiding-sliding groove 2101*d* of the installation sliding block 2101*c* of the charging roller installation structure may move along the sidewall 2101*e* in same direction as the photosensitive drum, and the fifth elastic part 2102 may be compressed. At this point, the photosensitive drum may move from the first position being in contact with the developing roller to the second position being separated from the developing roller.

When the process cartridge needs to perform developing operation, the electronic image-forming apparatus may no longer apply force to the pushing part 121. Due to the reaction force from compression to release of the sixth elastic part 122*a*, the protrusion 121*c* of the forced pushing part 121 may move to the initial position along the C2 direction in the second guiding groove 130*c*. At this point, the photosensitive drum may lose the force of the force-applying portion 121*b* of the pushing part 121. Under the force of its own gravity and the charging roller installation structure (the fifth elastic part 2102), the first coupling 310 may move to the initial position in the first avoiding portion 2101*a* of the photosensitive bracket 2101 and the second avoiding portion 2201*a* of the driving-side end cover 220 along the direction adjacent to the developing roller (roughly along the C2 and B2 directions); and the fifth elastic part 2102 may return to the initial state. At this point, the photosensitive drum may move from the second position being separated from the developing roller to the first position being in contact with the developing roller.

Exemplary Embodiment Ten

The structures in one embodiment may be substantially same as the structures in above-mentioned exemplary embodiments, and the difference is that the structures and operation manners of the pushing part 400 may be different.

Figure 39:
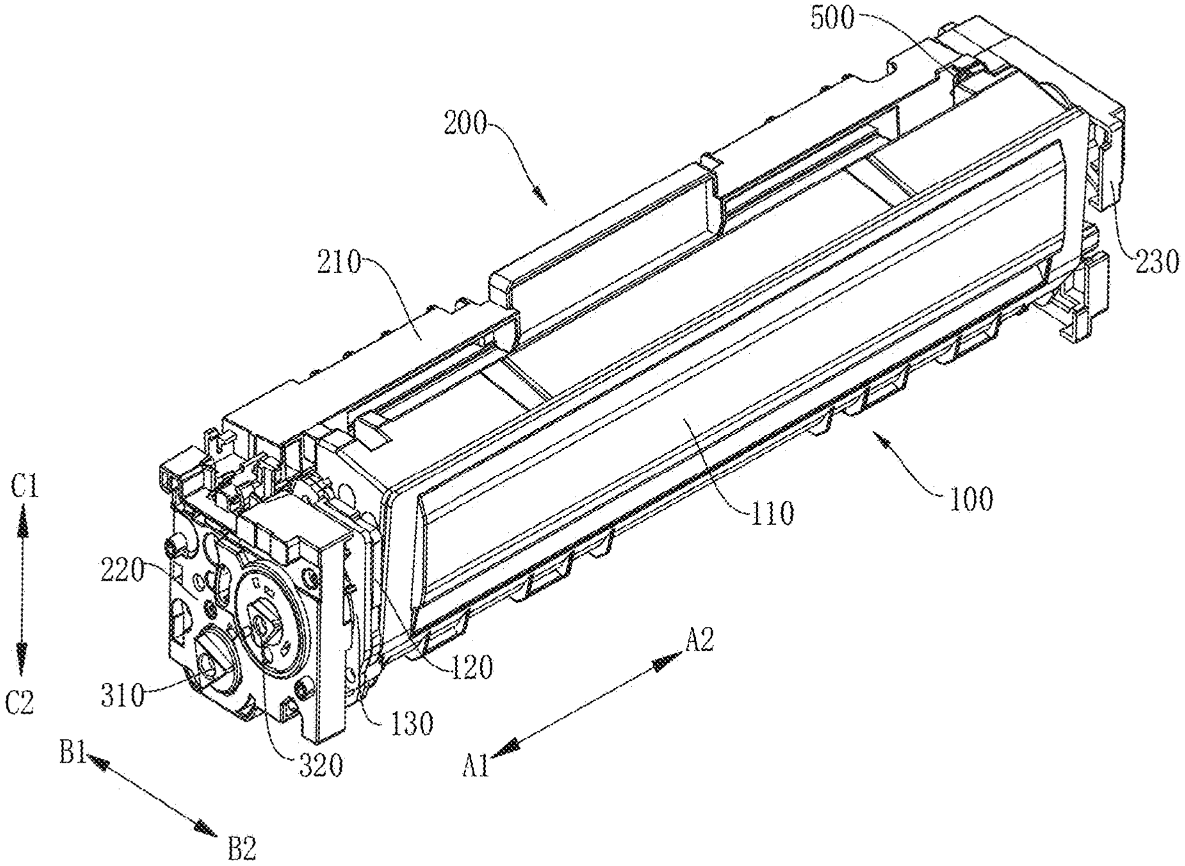
FIG. 39 illustrates an overall structural schematic of a process cartridge according to exemplary embodiment ten of the present disclosure.
Figure 40:
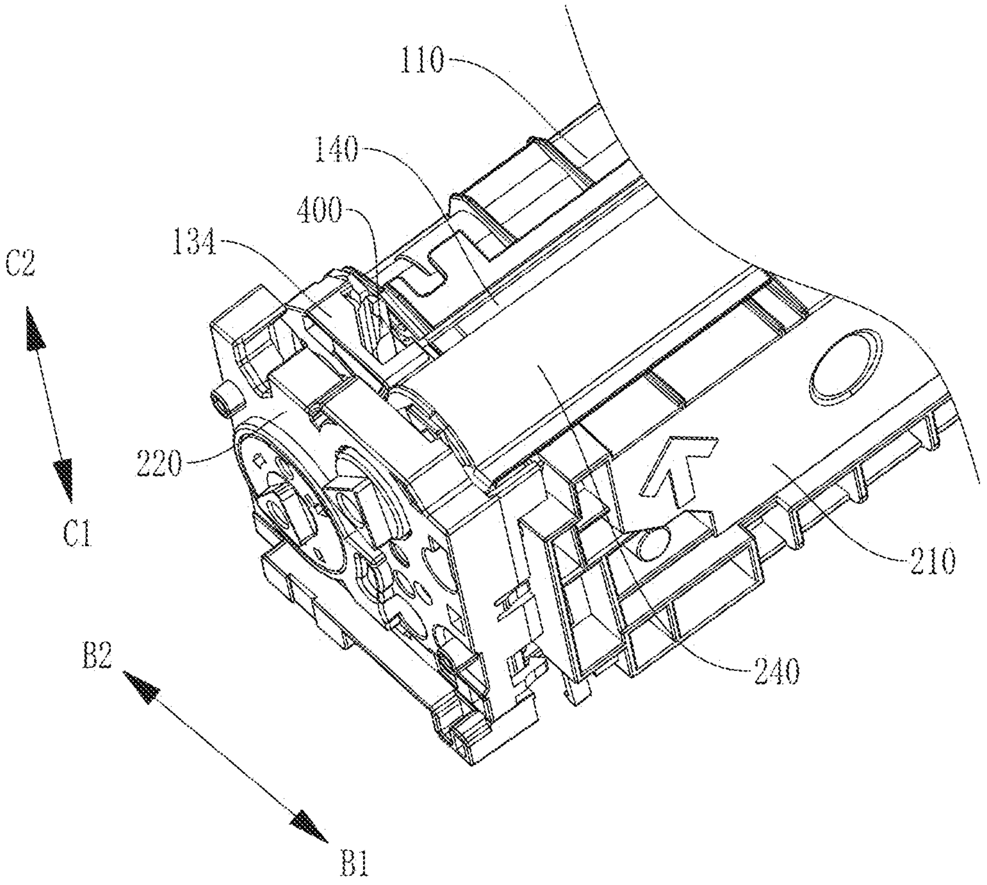
FIG. 40 illustrates a partial structural schematic of a process cartridge according to exemplary embodiment ten of the present disclosure.
Figure 41:
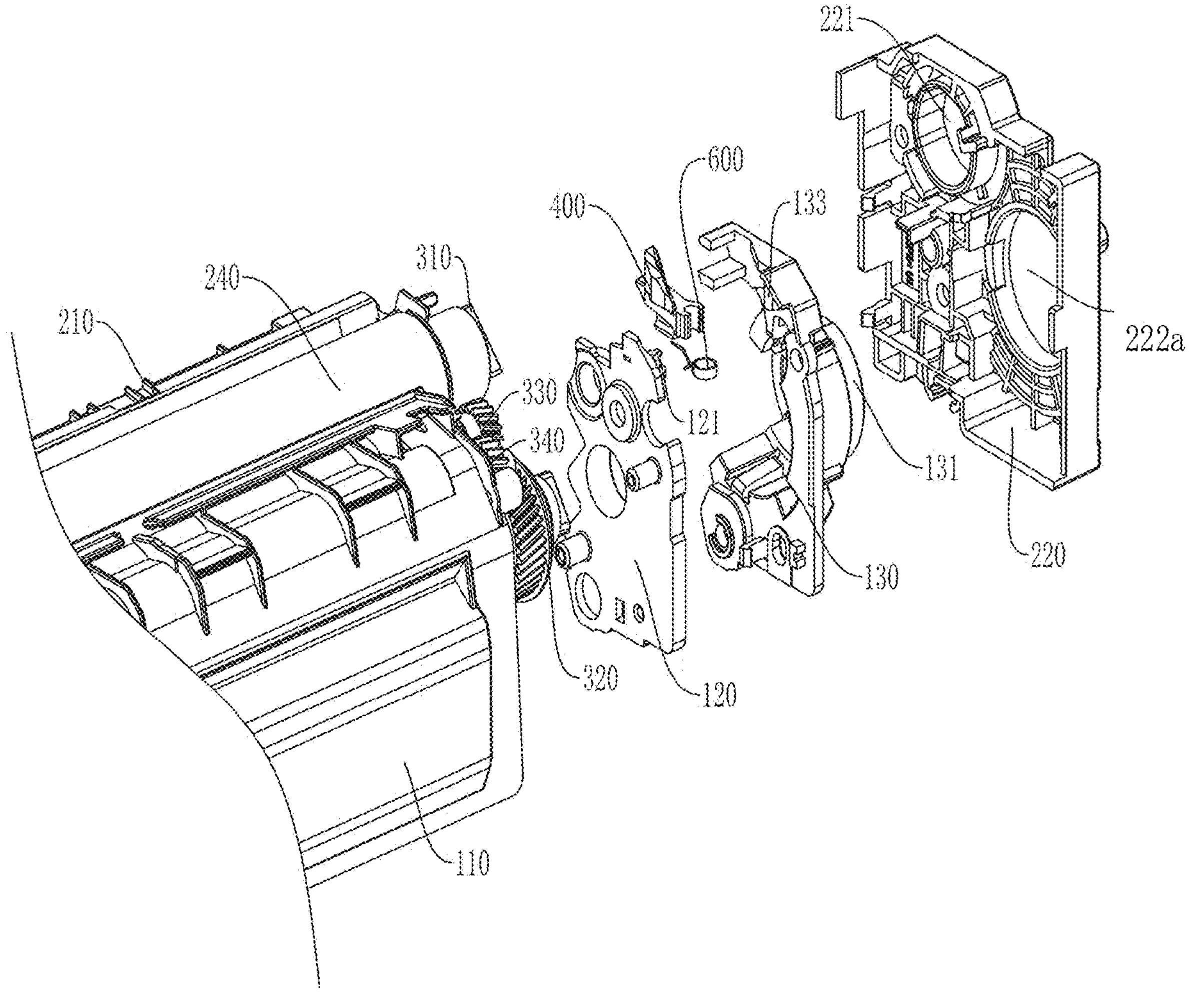
FIG. 41 illustrates a partial exploded structural schematic of a process cartridge according to exemplary embodiment ten of the present disclosure.

As shown in FIGS. 39-41, the conductive-side end cover 230 may be disposed outside the conductive-side bracket, and the driving-side end cover 220 may be disposed outside the developing protection cover 130. Viewed along the length direction of the process cartridge, the driving-side end cover 220 and the developing protection cover 130 may be at least partially overlapped with each other. The driving-side end cover 220 and the conductive-side end cover 230 may cover at least a portion of the ends of the photosensitive frame 210 and the developing frame 110, respectively. The driving-side end cover 220 may be fixedly connected to the end of the photosensitive frame 210.

As shown in FIG. 41, in one embodiment, the driving-side end cover 220 may be configured with the first hole 221 and the second hole 222*a*. When the drive side end cover 220 is installed at the ends of the developing frame 110 and the photosensitive frame 210, the first coupling 310 may be exposed through the first hole 221, and the second coupling 320 may be exposed through the second hole 222*a*, so that the couplings may be meshed with the driving head of the electronic image-forming apparatus to receive the driving force. On a side of the developing frame 110, the second coupling 320, the cylindrical portion 131 and the second hole 222*a* may be coaxially arranged, and at least a portion of the cylindrical portion 131 may be inserted into the second hole 222*a*.

When the electronic image-forming apparatus is operating, the developing roller 140 and the photosensitive drum 240 may need to be in tight contact. When the image-forming apparatus is not operating, the developing roller 140 and photosensitive drum 240 may need to be separated by a certain distance, which may avoid problems including the photosensitive drum 240's contamination by excess developer attached to the developing roller 140 caused by long-term contact between the developing roller 140 and the photosensitive drum 240, deformation of the developing roller 140, wear and tear of the photosensitive drum 240, and the like.

Based on above, the drum unit 200 and the developing unit 100 in one embodiment may be configured to move relative to each other, such that the developing roller 140 and the photosensitive drum 240 may be in contact with each other when the electronic image-forming apparatus is operating and separated from each other when the electronic image-forming apparatus is not operating. When the process cartridge is installed in the electronic image-forming apparatus, the drum unit 200 may be abutted against the components in the electronic image-forming apparatus, and the drum unit 200 may be not movable. The developing unit 100 may be configured to move between the first position and the second position relative to the drum unit 200. When the developing unit 100 is in the first position, the developing roller 140 may be in contact with the photosensitive drum 240; and when the developing unit 100 is in the second position, the developing roller 140 may be separated from the photosensitive drum 240. In one embodiment, the movement manner of the developing unit 100 may be to swing with the axis of the second coupling 320 as the rotation center. That is, when the developing unit 100 is at the first position, the lower end of the developing unit 100 may be adjacent to the lower end of the drum unit 200, so that the developing roller 140 may be in contact with the photosensitive drum 240. At this point, the upper end of the developing unit 100 may be away from the drum unit 200. When the developing unit 100 moves from the first position to the second position, the lower end of the developing unit 100 may swing away from the drum unit 200, thereby driving the developing roller 140 to separate from the photosensitive drum 240. At this point, the upper end of the developing unit 100 may swing toward the direction adjacent to the drum unit 200.

As shown in FIGS. 39-42, in one embodiment, the process cartridge may also include the pushing part 400. The forced pushing part 400 may cooperate with the force-applying part 300 (shown in FIG. 47) in the electronic image-forming apparatus to separate the developing roller 140 from the photosensitive drum 240 when the developing operation is not operating.

As shown in FIG. 41, the forced pushing part 400 may be movably disposed on the developing unit 100, and the forced pushing part 400 may rotate between the working position and the avoiding position. For example, the forced pushing part 400 may be rotatably mounted at the lower end (one end along the C2 direction) of the developing protection cover 130. The forced pushing part 400 may be approximately a long strip block-shaped part, and the length direction of the pushing part 400 may extend along the second direction. The forced pushing part 400 may include a main body 410. The main body 410 may be disposed with a locking portion 420, a sliding-avoiding surface 430 and an abutting surface 440.

Figure 42:
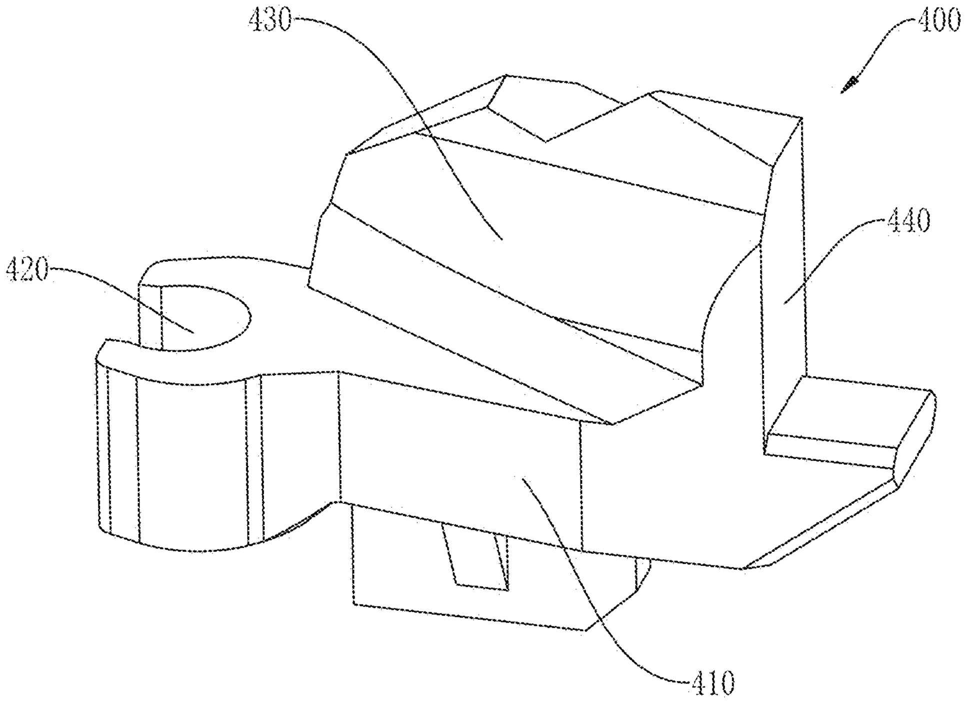
FIG. 42 illustrates a structural schematic of a separating part according to exemplary embodiment ten of the present disclosure.
Figure 43:
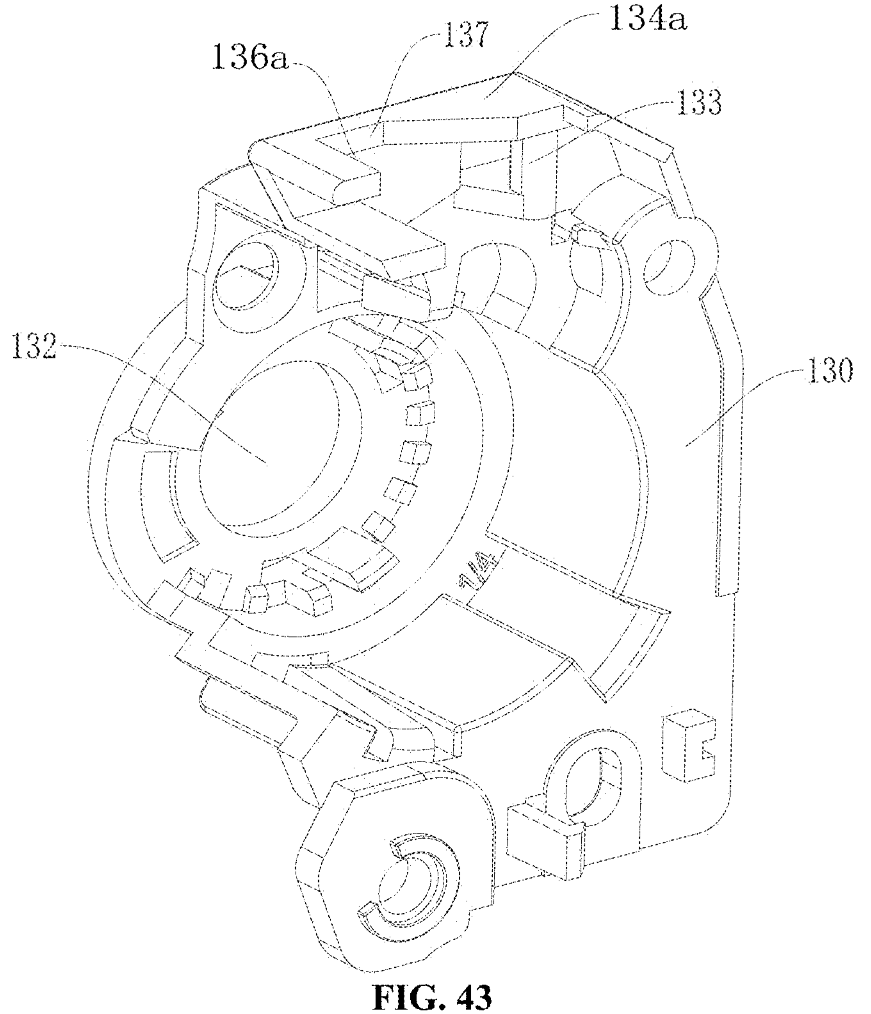
FIG. 43 illustrates a structural schematic of a developing protection cover according to exemplary embodiment ten of the present disclosure.

As shown in FIGS. 41-43, the locking portion 420 may be configured at one end of the main body 410 along the length direction, and the developer protection cover 130 may be disposed with a jointing portion 133 cooperating with the locking portion 420. Optionally, the locking portion 420 may be a locking groove formed on the main body 410. The jointing portion 133 may be a locking column disposed near the lower end of the developer protection cover 130, and the axial direction of the locking column may extend along the third direction. After the locking portion 420 is engaged with the locking column, the forced pushing part 400 may rotate around the locking column. That is, the forced pushing part 400 may rotate around the locking column in the plane formed by the first direction and the second direction. That also is, with the locking column as the axis, the end of the forced pushing part 400 away from the locking portion 420 may swing along the A1 direction or the A2 direction, where the end may swing to the avoiding position along the A2 direction and swing to the working position along the A1 direction. Optionally, the locking portion 420 may be a locking column and the jointing portion 133 may be a locking groove, so that the forced pushing part 400 and the developing protection cover 130 may be rotatably connected to each other. The hole and the rotating axle may also cooperate with each other.

Figure 45:
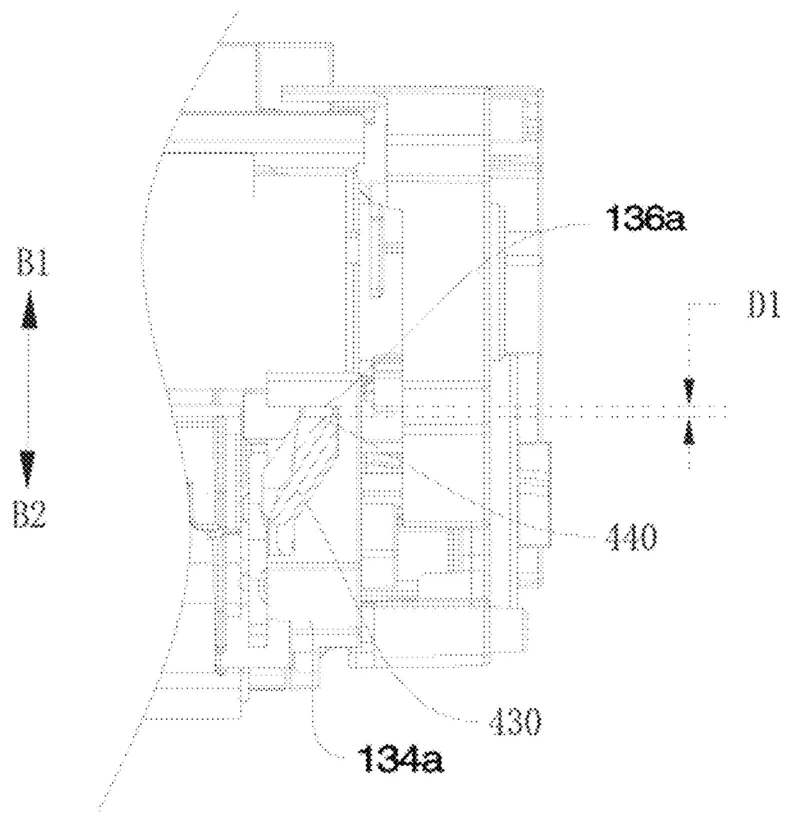
FIG. 45 illustrates a partial structural schematic of a process cartridge viewed from a third direction according to exemplary embodiment ten of the present disclosure.
Figure 47:
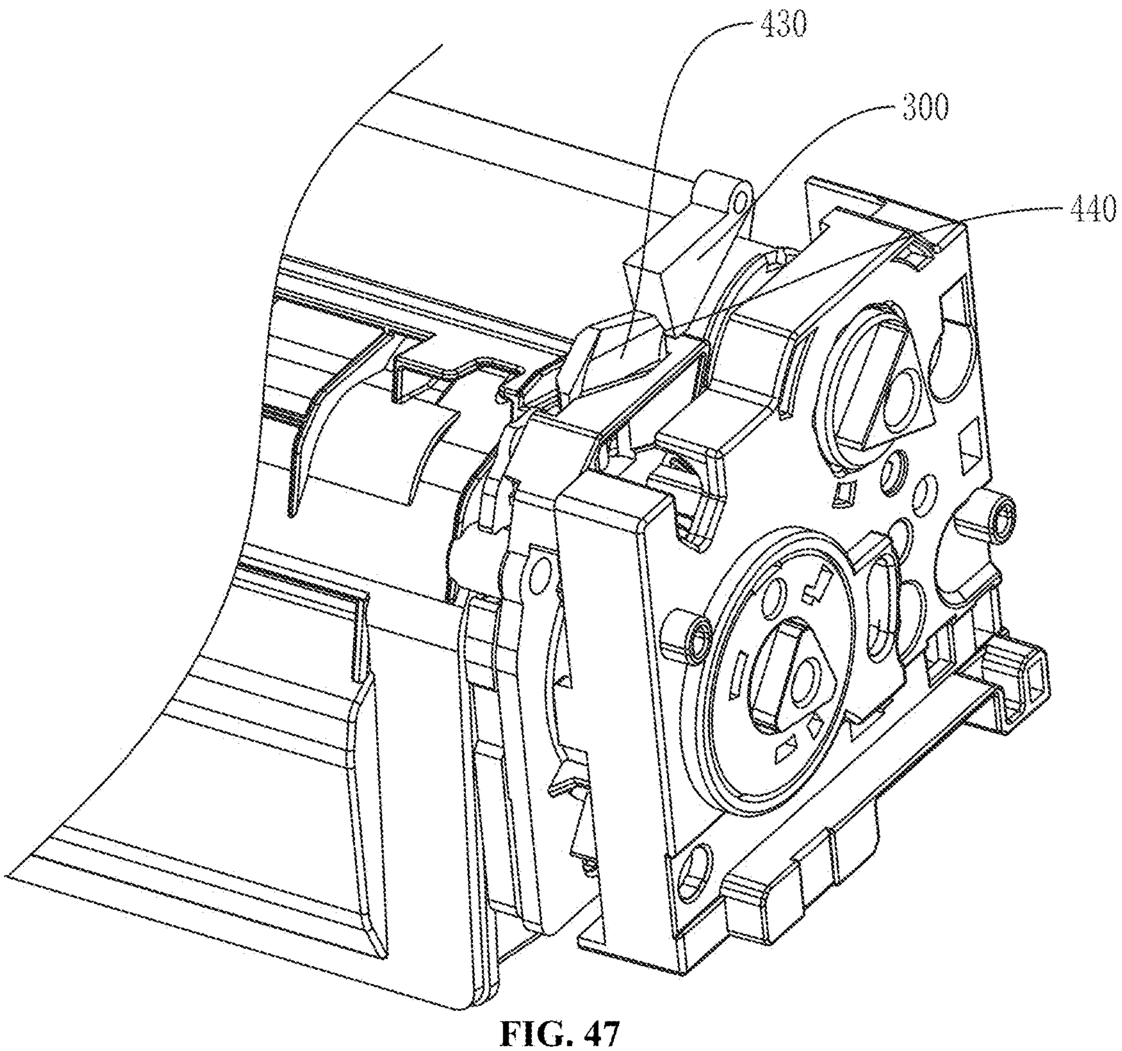
FIG. 47 illustrates a partial structural schematic of a separating part of a process cartridge in an operating position according to exemplary embodiment ten of the present disclosure.

As shown in FIGS. 43, 45 and 47, the surface of one end of the developing protection cover 130 along the C2 direction may be a lower surface 134*a*. The lower surface 134*a* may be a plane. A groove may be formed on the lower surface 134*a* for the forced pushing part 400 to rotate in the groove, and also the rotation range of the forced pushing part 400 may be limited. The shape of the projection of the groove along the third direction may be roughly same as the shape of the projection of the forced pushing part 400 along the third direction. The locking portion 420 of the forced pushing part 400 may be adjacent to one end of the groove along the B2 direction. The inner surface of the groove along the B1 direction may be the first sidewall 136*a*, and the inner surface of the groove along the A1 direction may be the second sidewall 137. When the forced pushing part 400 is in contact with the second sidewall 137, the swing along the A1 direction may be stopped. The position where the pushing part 400 is in contact with the second sidewall 137 is also called the working position of the pushing part 400. In such position, the pushing part 400 may accept the separation force of the force-applying part 300 to separate the developing roller 140 from the photosensitive drum 240. The pushing part 400 in the working position may be also in its initial state. When the end of the forced pushing part 400 away from the card rotation part 420 rotates toward the A2 direction, the forced pushing part 400 may rotate from the working position to the avoiding position.

Figure 44:
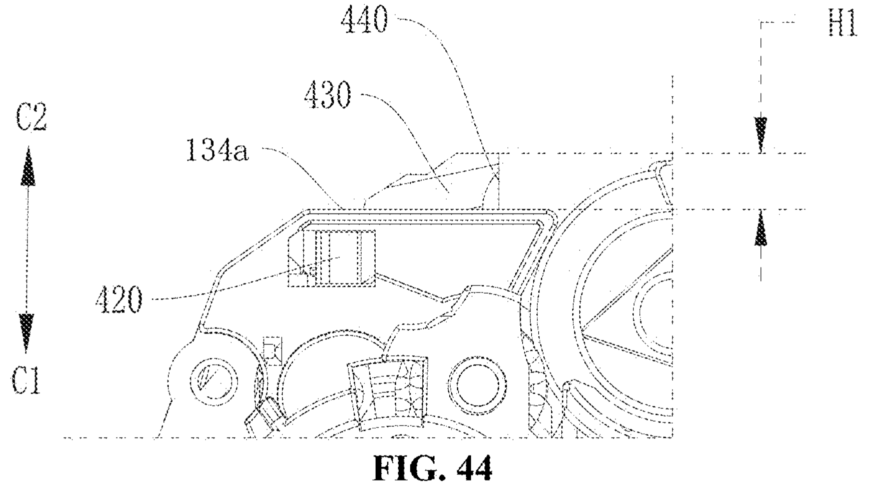
FIG. 44 illustrates a partial structural schematic of a process cartridge viewed from a first direction according to exemplary embodiment ten of the present disclosure.

As shown in FIGS. 42 and 44, at least a portion of the main body 410 of the pushing part 400 may protrude downward from the lower surface 134*a* of the developing protection cover 130; and the sliding-avoiding surface 430 may be disposed on the main body 410. All or at least a part of the sliding-avoiding surface 430 may protrude downward from the groove to the lower side of the lower surface 134*a*, so that the sliding-avoiding surface 430 may cooperate with the force-applying part 300 of the electronic image-forming apparatus.

As shown in FIG. 45, in one embodiment, when the pushing part 400 is assembled on the developing protection cover 130, the sliding-avoiding surface 430 may be toward the A1 direction. The sliding-avoiding surface 430 may be an outwardly convex arc surface, and the extension direction of the sliding-avoiding surface 430 may form a certain angle with the extension direction of the forced pushing part 400; and such angle may be an acute angle. The extension direction of the sliding-avoiding surface 430 may be roughly extended from the A2/B2 side to the A1/B1 side. Optionally, the sliding-avoiding surface 430 may also be a plane. The sliding-avoiding surface 430 may also be an irregular surface formed by splicing one or more arc surfaces and/or planes. The extension direction of the forced pushing part 400 may be perpendicular to the axis of the photosensitive drum 240.

As shown in FIGS. 42, 44 and 45, the pushing part 400 may also include an abutting surface 440; the abutting surface 440 may be at one end of the main body 410 away from the card rotating part 420; and the abutting surface 440 may be on the B1 side of the sliding-avoiding surface 430. In addition, the abutting surface 440 may be connected to one end of the sliding-avoiding surface 430 along the B1 direction, and the abutting surface 440 may be toward the B1 direction. The abutting surface 440 may be a plane. Furthermore, all or a part of the abutting surface 440 may protrude downwardly from the lower surface 134*a* of the developing protection cover 130, so that the abutting surface 440 may be in contact with the force-applying part 300 to receive the separation force. When the pushing part 400 is in the working position, along the third direction, the distance between the lowermost end (the end along the C1 direction) of the abutting surface 440 and the lower surface 134*a* of the developing protection cover 130 is H1, and optionally, 3 mm≤H1≤4.8 mm; and along the second direction, the distance between the abutting surface 440 and the first sidewall 136*a* of the groove is D1, optionally, 0<D1≤2.5 mm. When the forced pushing part 400 is within the range of H1 and D1, the forced pushing part 400 may cooperate more precisely with the force-applying part 300, thereby increasing the selectivity of the forced pushing part 400 to meet the size optimization of components.

Furthermore, as shown in FIG. 41, the process cartridge may also include a reset part 600 configured to apply the force to the pushing part 400 to reset the pushing part 400 from the avoiding position to the working position. The reset part 600 may be elastic, and when the force-applying part 300 pushes the pushing part 400 to rotate, the reset part 600 may be compressed. Optionally, the reset part 600 may be a torsion spring installed on the driving side bracket 120. For example, an installation base 121 for installing a torsion spring may be disposed near the lower end of the driving side bracket 120; and the coil of the torsion spring may be sleeved on the installation base 121. One arm of the torsion spring may be abutted against the driving side bracket 120, and another arm of the torsion spring may be abutted against the side of the main body 410 of the pushing part 400 facing the A2 direction. The torsion spring may be constructed to always apply the force along the A1 direction to the pushing part 400, so that the pushing part 400 may remain in the working position (i.e., the initial state of the pushing part 400) when no other external force is applied. Optionally, the reset part 600 may also be another elastic component, including compression springs, tension springs, elastic rubber, elastic sponges, or other reset structures that adopt non-elastic manners.

As shown in FIG. 39, the elastic part 500 may be also disposed between the drum unit 200 and the developing unit 100, which may be configured to move the developing unit 100 from the second position to the first position, thereby driving the developing roller 140 to contact the photosensitive drum 240. For example, one end of the elastic part 500 may be connected to the upper end of the photosensitive frame 210 (the end along the C1 direction), and the other end of the elastic part 500 may be connected to the upper end of the developing frame 110 (the end along the C1 direction). Optionally, the elastic part 500 may be a spring, or a part that can provide elastic force, such as elastic rubber, elastic sponge or elastic plate.

Figure 46:
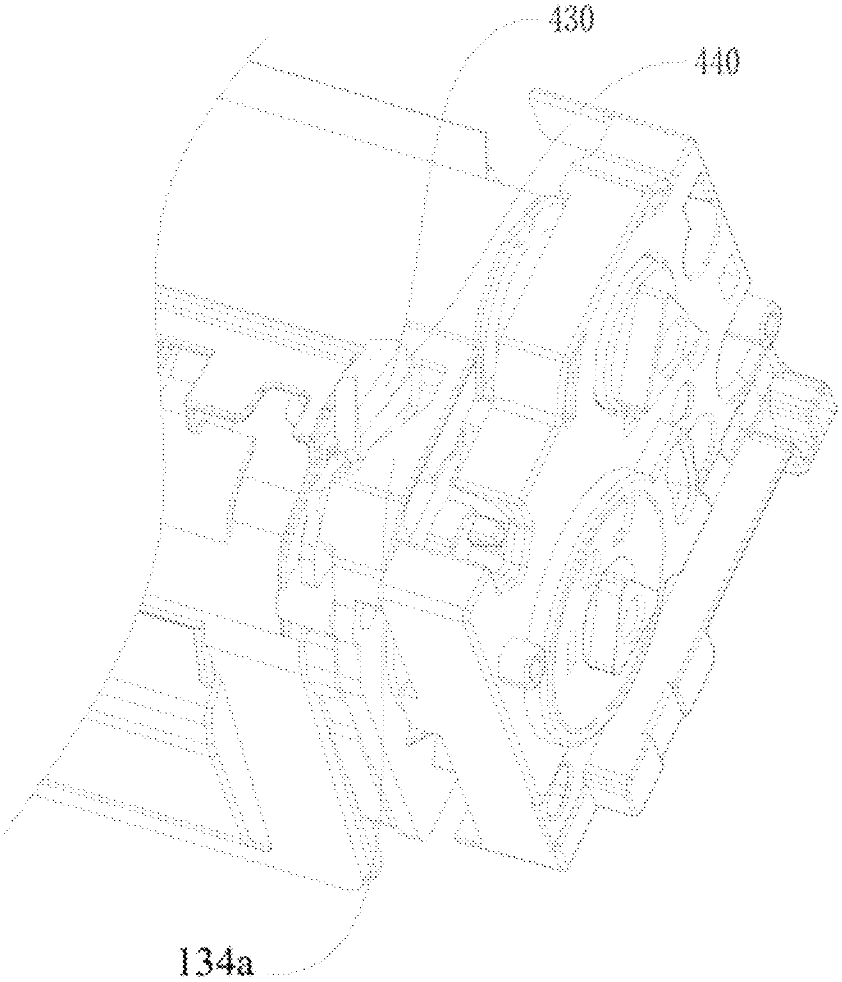
FIG. 46 illustrates a partial structural schematic of a separating part of a process cartridge in an avoiding position according to exemplary embodiment ten of the present disclosure.

As shown in FIGS. 46-47, when the process cartridge is installed in the image-forming apparatus, the pushing part 400 may be in the working position at this point; the force-applying part 300 of the electronic image-forming apparatus may start to move; when the force-applying part 300 moves along the B1 direction, the force-applying part 300 may be in contact with the sliding-avoiding surface 430; and the force-applying part 300 may slide along the sliding-avoiding surface 430 and apply a pushing force to the sliding-avoiding surface 43. The pushing force may cause the forced pushing part 400 to swing around the jointing portion 133 toward the A2 direction and swing from the working position to the avoiding position, so that the force-applying part 300 may continue to move along the B1 direction. During the swinging process of the forced pushing part 400, the reset part 600 may be compressed and deformed. When the force-applying part 300 moves to the position being separated from the sliding-avoiding surface 430, the pushing force of the force-applying part 300 on the sliding-avoiding surface 430 may disappear; and the reset part 600 may recover its elastic deformation to push the forced pushing part 400 to swing along the A1 direction. The forced pushing part 400 may swing from the avoiding position to the working position; and the abutting surface 440 of the forced pushing part 400 that reaches the working position may be opposite to the force-applying part 300, that is, the abutting surface 440 and the force-applying part 300 may be at least partially overlapped with each other. However, the force-applying part 300 may be not in contact with the abutting surface 440. At this point, the preparation state of the electronic image-forming apparatus may be completed, and the developing operation may be performed.

When the electronic image-forming apparatus is not operating, the force-applying part 300 may move along the B2 direction; the force-applying part 300 may be in contact with the abutting surface 440 to apply the force to the abutting surface 440; and the force received by the abutting surface 440 may act on entire developing unit 100 through the pushing part 400. After the developing unit 100 is subjected to force, its lower end may swing along the direction away from the drum unit 200 (roughly along the B2 direction); and the developing unit 100 may move from the first position to the second position, thereby driving the developing roller 140 to separate from the photosensitive drum 240. Meantime, the upper end of the developing roller 140 may move along the direction adjacent to the photosensitive drum 240 (roughly along the B1 direction) to compress the elastic part 500.

When the electronic image-forming apparatus needs to perform developing operation, the force of the force-applying part 300 on the abutting surface 440 may be removed; the elastic part 500 may recover its deformation and push the developing unit 100 to move from the second position to the first position; and the developing roller 140 may be in contact with the photosensitive drum 240, and the developing operation may be performed.

Exemplary Embodiment Eleven

The structure of the process cartridge in one embodiment may be substantially same as the structure of the process cartridge in exemplary embodiment ten, and the difference is that the structures of the pushing part 400 may be different.

Figure 48:
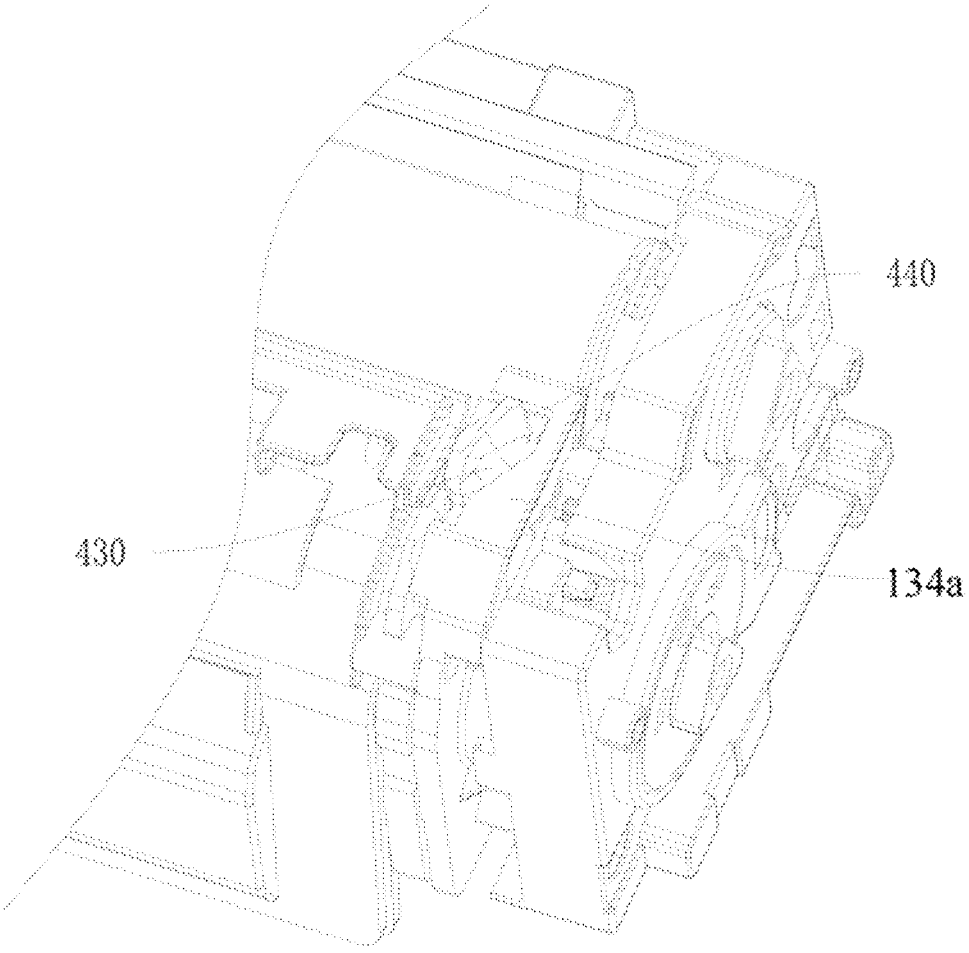
FIG. 48 illustrates a partial structural schematic of a separating part of a process cartridge in an operating position according to exemplary embodiment eleven of the present disclosure.
Figure 49:
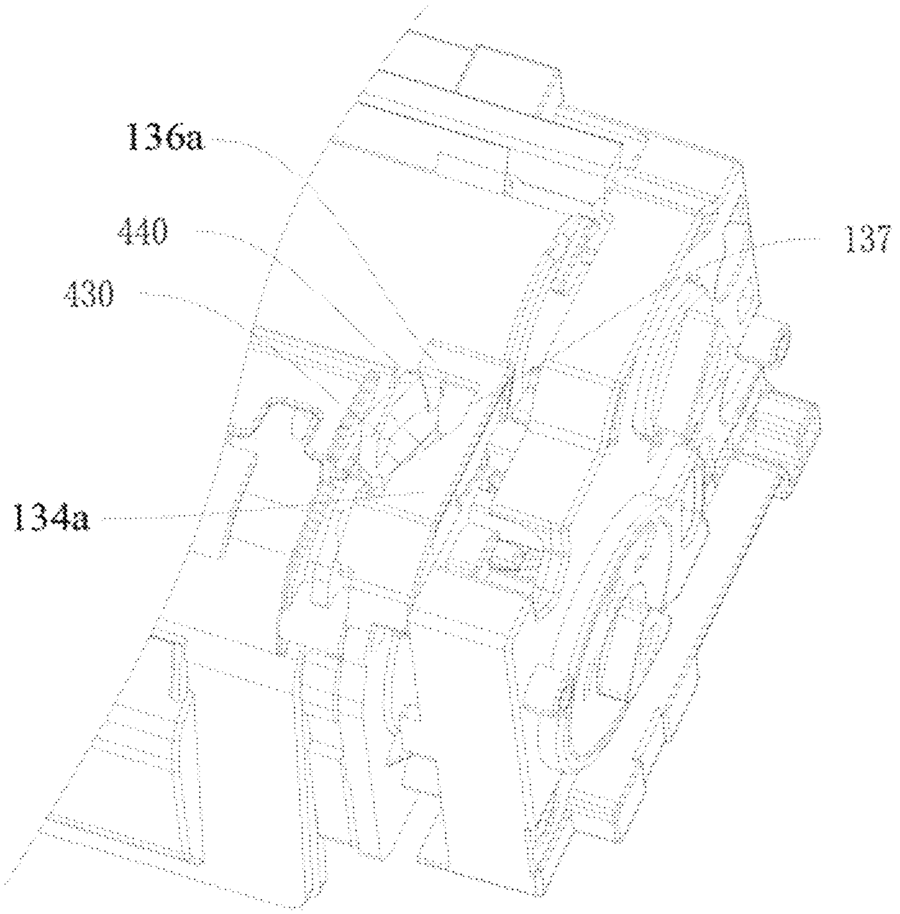
FIG. 49 illustrates a partial structural schematic of a separating part of a process cartridge in an avoiding position according to exemplary embodiment eleven of the present disclosure.
Figure 50:
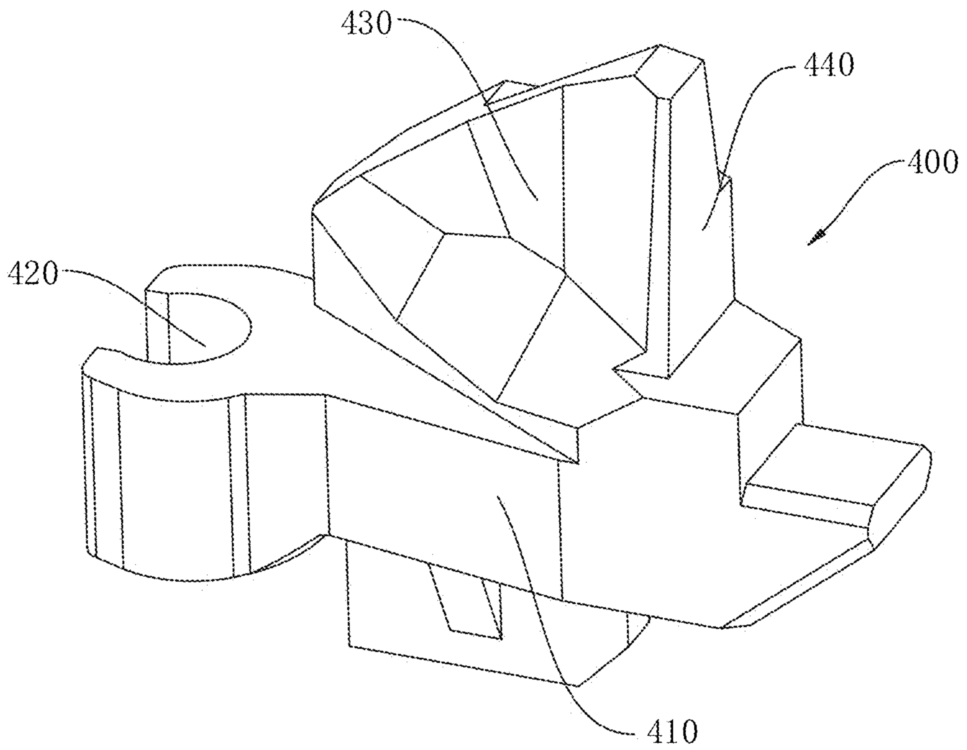
FIG. 50 illustrates a structural schematic of a separating part according to exemplary embodiment eleven of the present disclosure.

As shown in FIGS. 48-50, in one embodiment, the forced pushing part 400 may include the locking portion 420, the sliding-avoiding surface 430 and the abutting surface 440, where the structure of the locking portion 420 may be same as the structure of exemplary embodiment ten.

As shown in FIG. 50, in one embodiment, the sliding-avoiding surface 430 may be an inwardly concave arc surface. The sliding-avoiding surface 430 of different shapes may make the forced pushing part 400 adapt to the force-applying part 300 of different types of electronic image-forming apparatuses.

Figure 51:
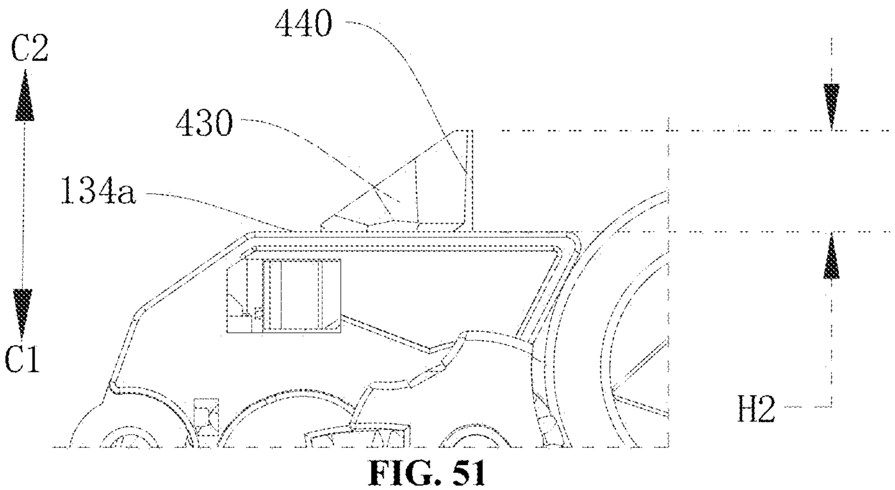
FIG. 51 illustrates a partial structural schematic of a process cartridge viewed from a first direction according to exemplary embodiment eleven of the present disclosure.
Figure 52:
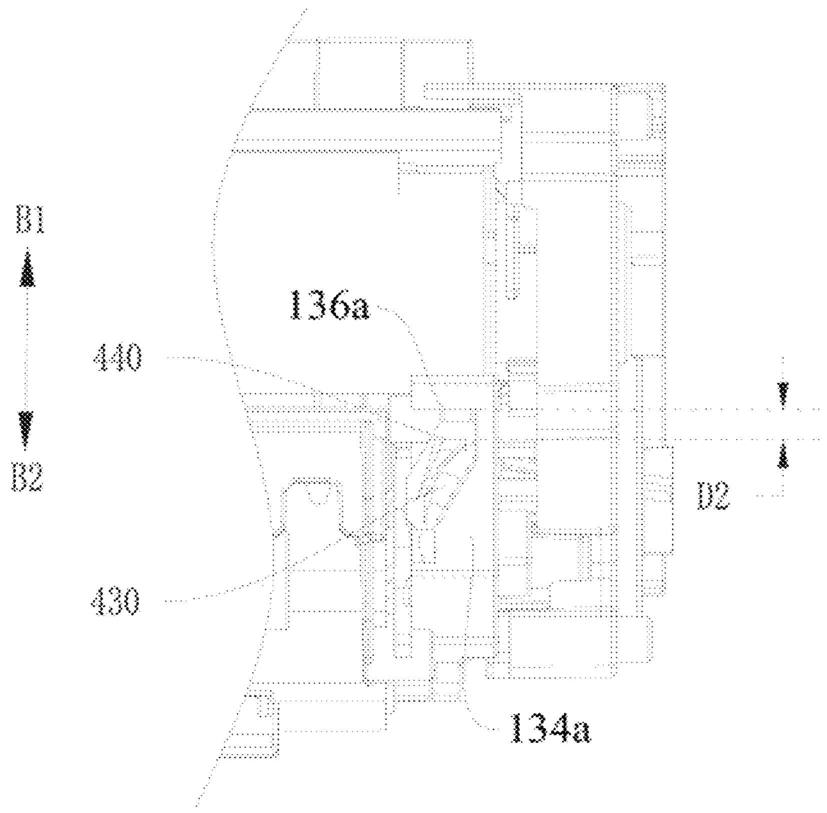
FIG. 52 illustrates a partial structural schematic of a process cartridge viewed from a third direction according to exemplary embodiment eleven of the present disclosure.
Figure 53:
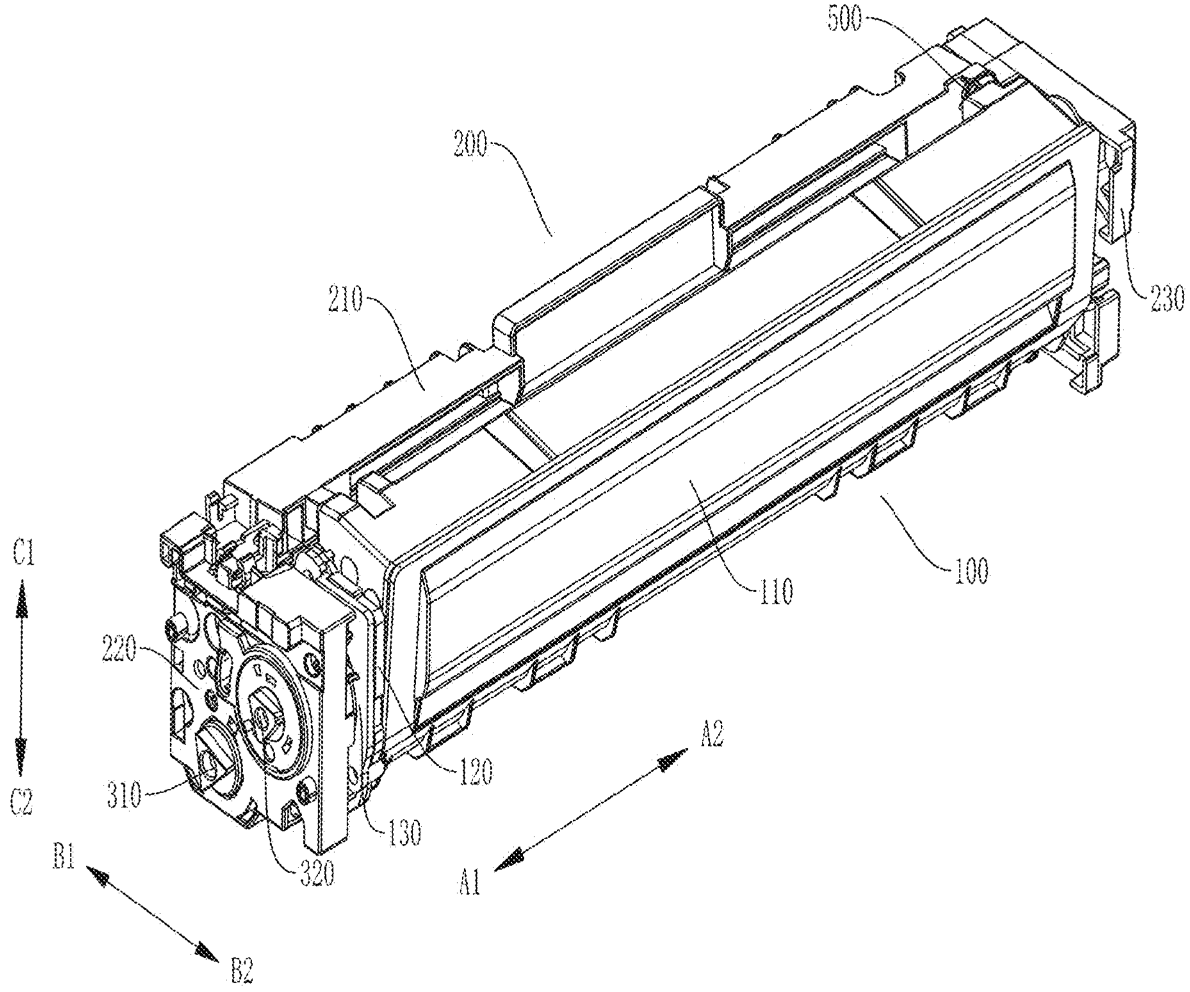
FIG. 53 illustrates an overall structural schematic of a process cartridge according to exemplary embodiment twelve of the present disclosure.

As shown in FIGS. 51-52, in one embodiment, when the pushing part 400 is in the working position, along the third direction, the distance between the lowest end (the end along the C1 direction) of the abutting surface 440 and the lower surface 134*a* of the developing cover 130 is H2, and optionally, 4.8 mm<H2≤6.5 mm; and along the second direction, the distance between the abutting surface 440 and the first sidewall 136*a* of the groove is D2, and optionally, 2.5 mm<D2≤4.7 mm. In one embodiment, H2>H1, D2>D1. That is, the distance that the abutting surface 440 of the forced pushing part 400 of one embodiment protrudes from the lower surface 134*a* may be greater than the distance that the abutting surface 440 of the forced pushing part 400 of exemplary embodiment ten protrudes from the lower surface 134*a*; and the distance from the abutting surface 440 of the forced pushing part 400 of one embodiment to the first sidewall 136*a* may be greater than the distance from the abutting surface 440 of the forced pushing part 400 of exemplary embodiment ten to the first sidewall 136*a*. That is, in one embodiment, the distance from the abutting surface 440 of the forced pushing part 400 to the rotation axis of the forced pushing part 400 may be shorter than the distance from the abutting surface 440 of the forced pushing part 400 of exemplary embodiment ten to the axis of the forced pushing part 400. By setting different distances of the abutting surface 440 protruding from the lower surface 134*a* and different distances from the abutting surface 440 to the rotation axis, the forced pushing part 400 may be adapted to the force-applying part 300 of different types of electronic image-forming apparatuses, thereby improving compatibility performance of the forced pushing part 400.

It should be noted that the shape of the sliding-avoiding surface 430, the position and height of the abutting surface 440 and other parameters may be adjusted according to specific structure of the force-applying part 300, as long as corresponding function may be achieved.

Exemplary Embodiment Twelve

The structure and operation manner of the process cartridge in one embodiment may be substantially same as the structure and operation manner of the process cartridge in exemplary embodiment ten, and the difference is that the structures and operation manners of the pushing part 400 may be different.

As shown in FIGS. 53-59, the forced pushing part 400 may be approximately a long-strip block-shaped part; and the length direction may extend along the second direction, that is, the extension direction of the length of the forced pushing part 400 may be perpendicular to the axis of the photosensitive drum 240. The forced pushing part 400 may include the main body 410. The main body 410 may be disposed with the locking portion 420, the sliding-avoiding surface 430 and the abutting surface 440.

Figure 55:
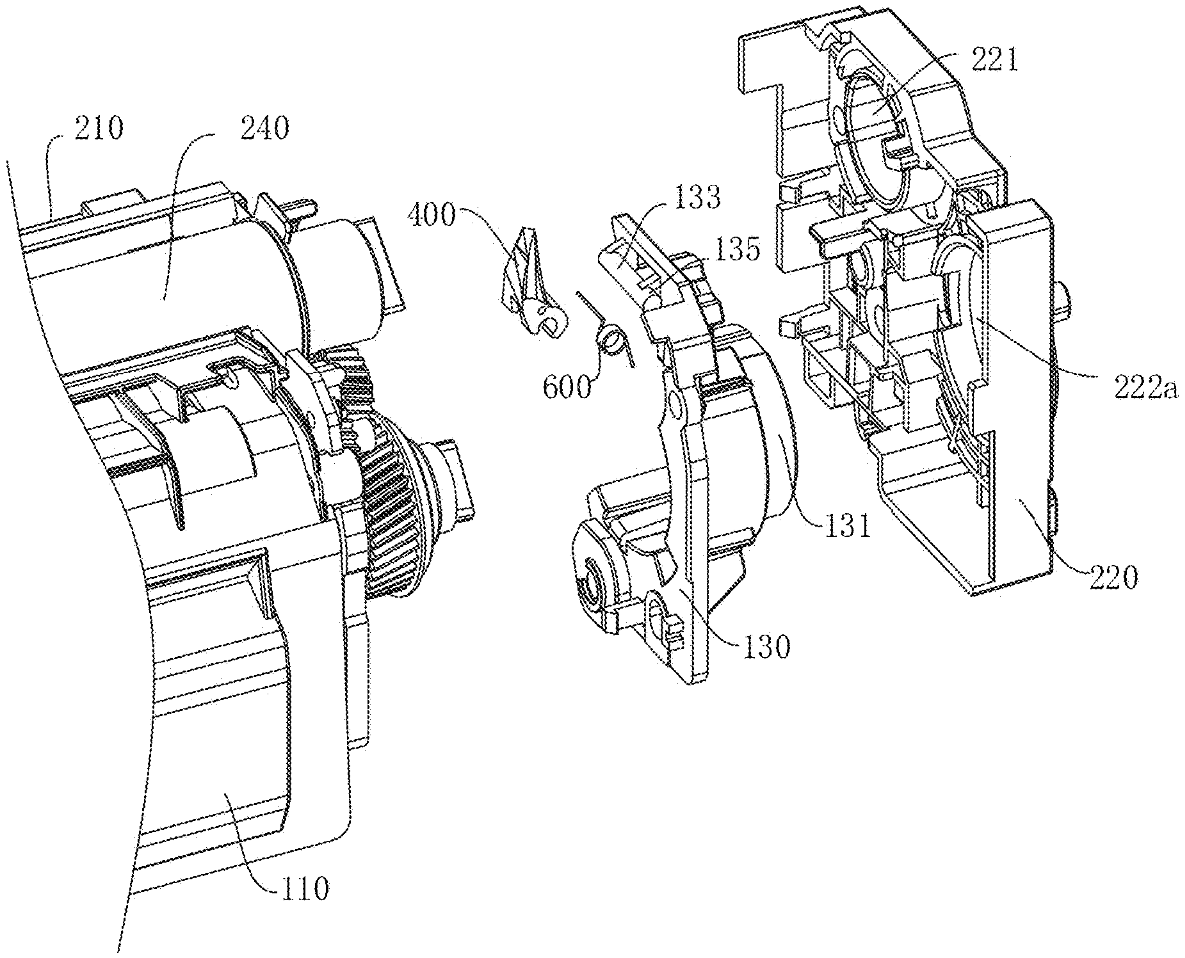
FIG. 55 illustrates a partial exploded structural schematic of a process cartridge according to exemplary embodiment twelve of the present disclosure.
Figure 56A:
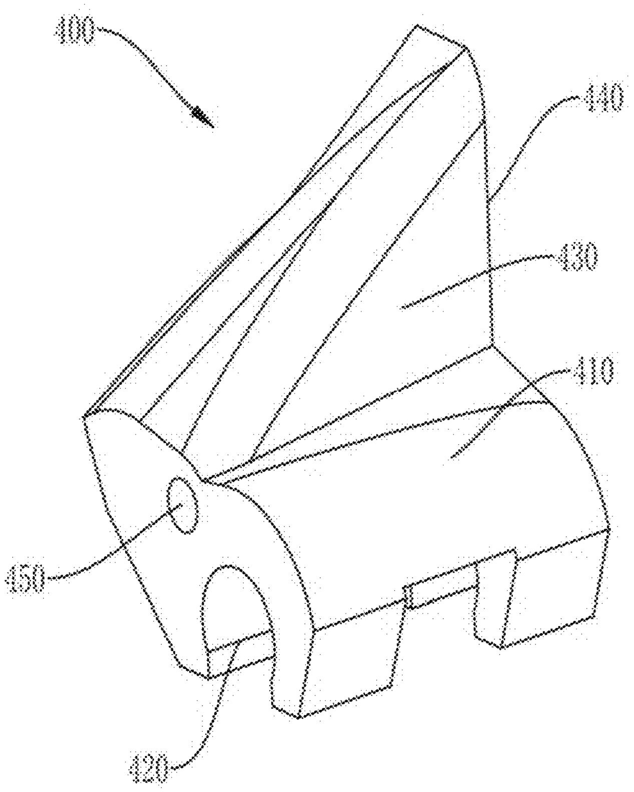
FIG. 56A illustrates a structural schematic of a separating part according to exemplary embodiment twelve of the present disclosure.
Figure 56B:
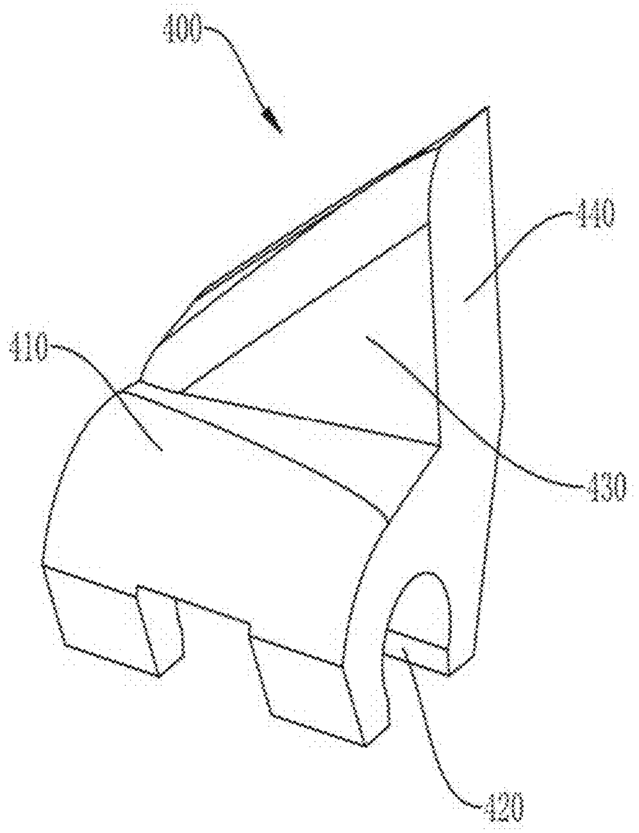
FIG. 56B illustrates another structural schematic of a separating part according to exemplary embodiment twelve of the present disclosure.
Figure 57:
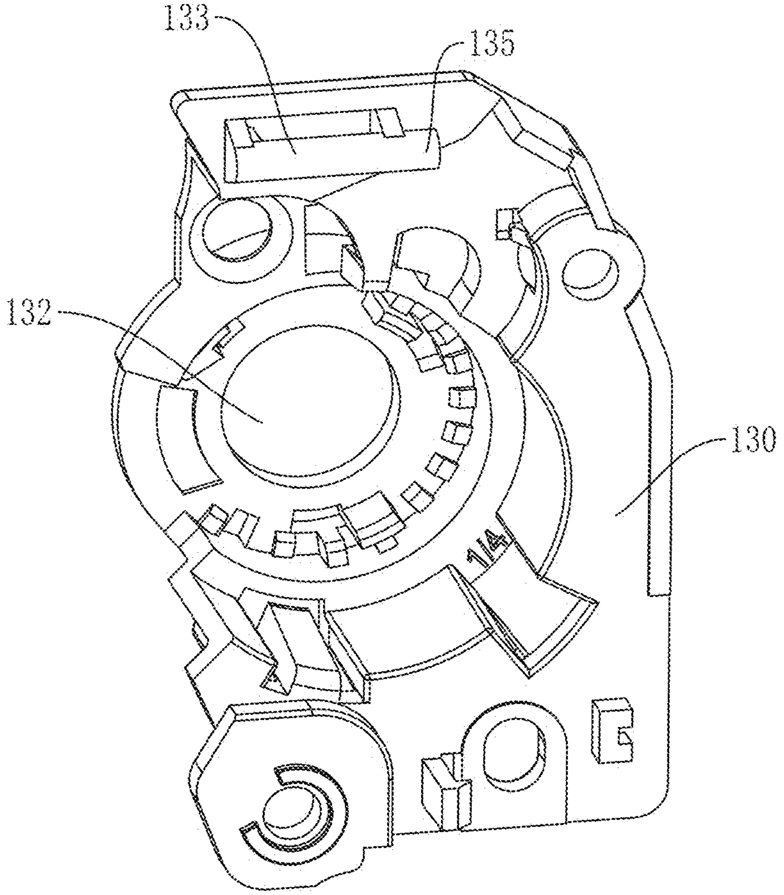
FIG. 57 illustrates a structural schematic of a developing protection cover according to exemplary embodiment twelve of the present disclosure.

As shown in FIGS. 55-57, the locking portion 420 may be disposed at one end of the main body 410 along the height direction (the C1 direction; and the developing protection cover 130 may be disposed with the jointing portion 133 cooperating with the locking portion 420. Optionally, the locking portion 420 may be a locking groove formed on the main body 410. The jointing portion 133 may be a locking column disposed near the lower end of the developer protection cover 130, and the axial direction of the locking column may extend along the second direction. After the locking portion 420 is engaged with the locking column, the forced pushing part 400 may rotate around the locking column. That is, the forced pushing part 400 may rotate around the locking column in the plane formed by the first direction and the third direction. The rotation axis of the forced pushing part 400 may be along the second direction, and the rotation axis of the separation part may be perpendicular to the axis of the photosensitive drum 240 (along the first direction). That is, with the locking column as the axis, the end of the forced pushing part 400 away from the locking portion 420 may swing along the A1 direction or the A2 direction, where the end may swing to the avoiding position along the A2 direction and swing to the working position along the A1 direction. The end of the forced pushing part 400 away from the rotating portion 420 may be closer to the axis of the developing roller 140 in the avoiding position than in the working position. Optionally, the locking portion 420 may be a locking column, and the jointing portion 133 may be a locking groove, so that the forced pushing part 400 and the developing protection cover 130 may be rotatably connected to each other. The hole and the rotating axle may also cooperate with each other.

Figure 54:
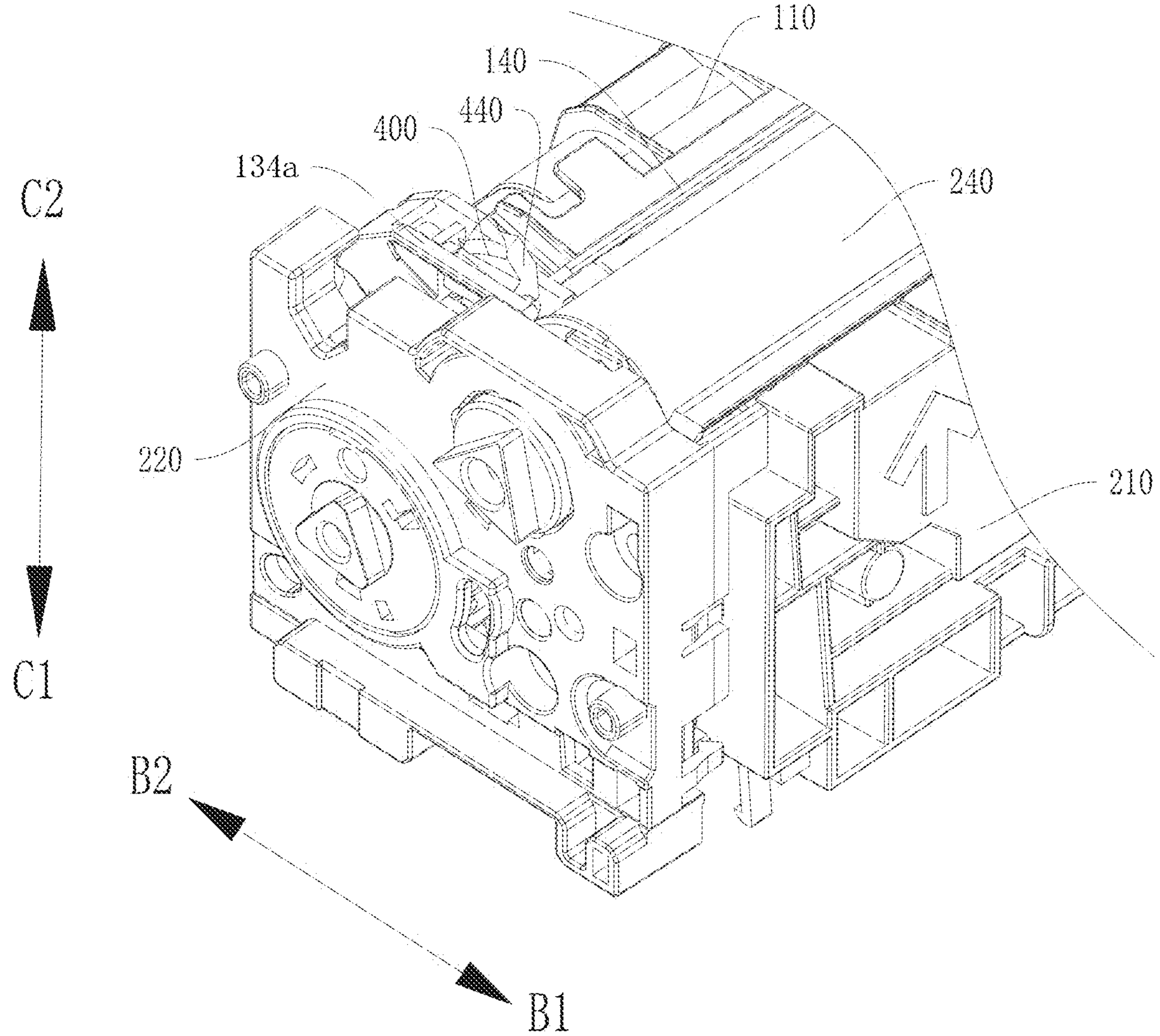
FIG. 54 illustrates a partial structural schematic of a process cartridge according to exemplary embodiment twelve of the present disclosure.

As shown in FIG. 54, at least a portion of the main body 410 of the pushing part 400 may protrude downward from the lower surface 134*a* of the developing protection cover 130; and the sliding-avoiding surface 430 may be disposed on the main body 410. All or at least a part of the sliding-avoiding surface 430 may protrude downward from the groove to the lower side of the lower surface 134*a*, so that the sliding-avoiding surface 430 may cooperate with the force-applying part 300 of the electronic image-forming apparatus.

In one embodiment, when the pushing part 400 is assembled on the developing protection cover 130, the sliding-avoiding surface 430 may be toward the A1 direction. The sliding-avoiding surface 430 may be a plane, and the sliding-avoiding surface 430 may extend in the plane formed by the second direction and the third direction. In some other embodiments, the sliding-avoiding surface 430 may be an outwardly convex arc surface or an inwardly concave arc surface, and the extension direction of the sliding-avoiding surface 430 may form a certain angle with the extension direction of the forced pushing part 400; and such angle may be an acute angle. The extension direction of the sliding-avoiding surface 430 may be roughly extended from the A2/B2 side to the A1/B1 side. The sliding-avoiding surface 430 may also be an irregular surface formed by splicing one or more arc surfaces and/or planes. The extension direction of the forced pushing part 400 may be perpendicular to the axis of the photosensitive drum 240.

Figure 58:
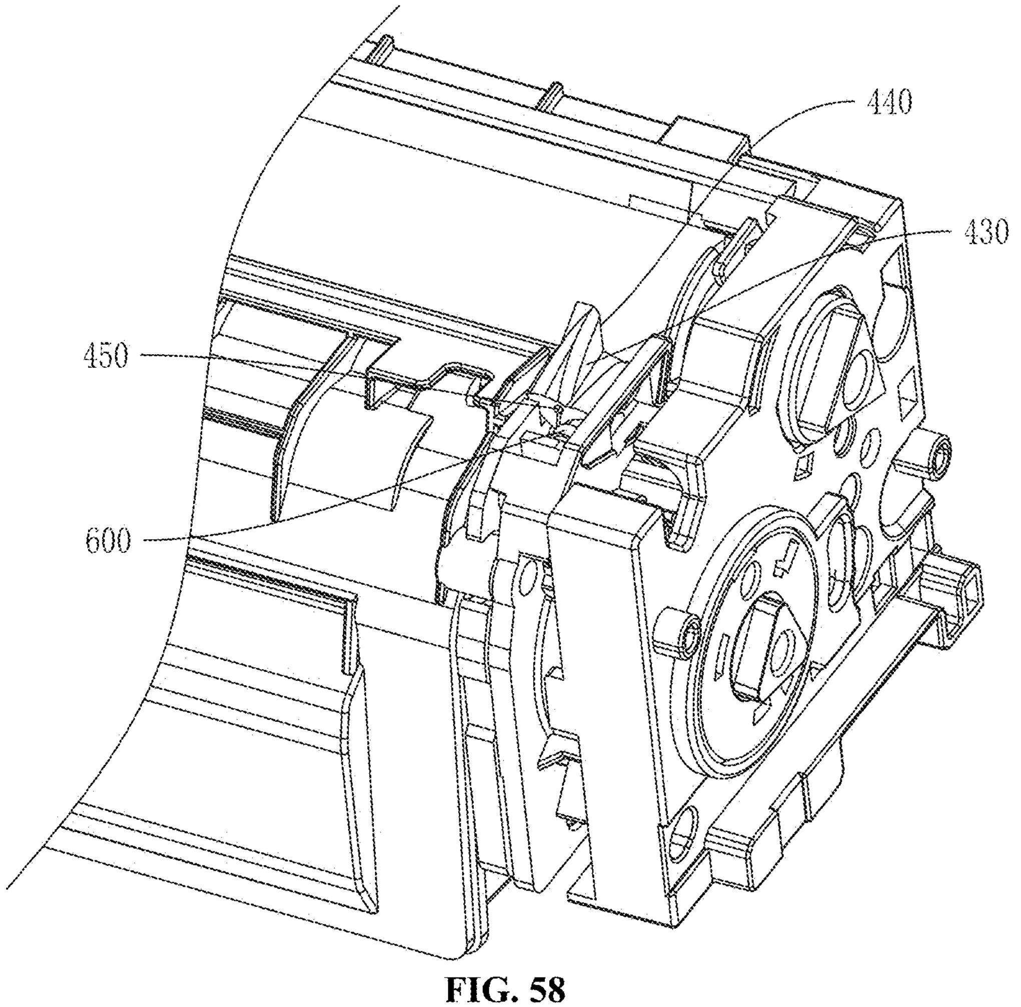
FIG. 58 illustrates a partial structural schematic of a separating part of a process cartridge in an avoiding position according to exemplary embodiment twelve of the present disclosure.

As shown in FIGS. 54, 56 and 58, the forced pushing part 400 may also include the abutting surface 440; the abutting surface 440 may be at one end of the main body 410 along the length direction; the abutting surface 440 may be on the B1 side of the sliding-avoiding surface 430; and the abutting surface 440 may be connected to one end of the sliding-avoiding surface 430 along the B1 direction. The abutting surface 440 may be toward the B1 direction, and the abutting surface 440 may be a straight surface. The abutting surface may extend in the plane formed by the first direction and the third direction; that is, the abutting surface 440 may be perpendicular to the rotation axis (along the second direction) of the pushing part 400, and the abutting surface 440 may be also perpendicular to the axis (along the first direction) of the photosensitive drum 240.

Figure 59:
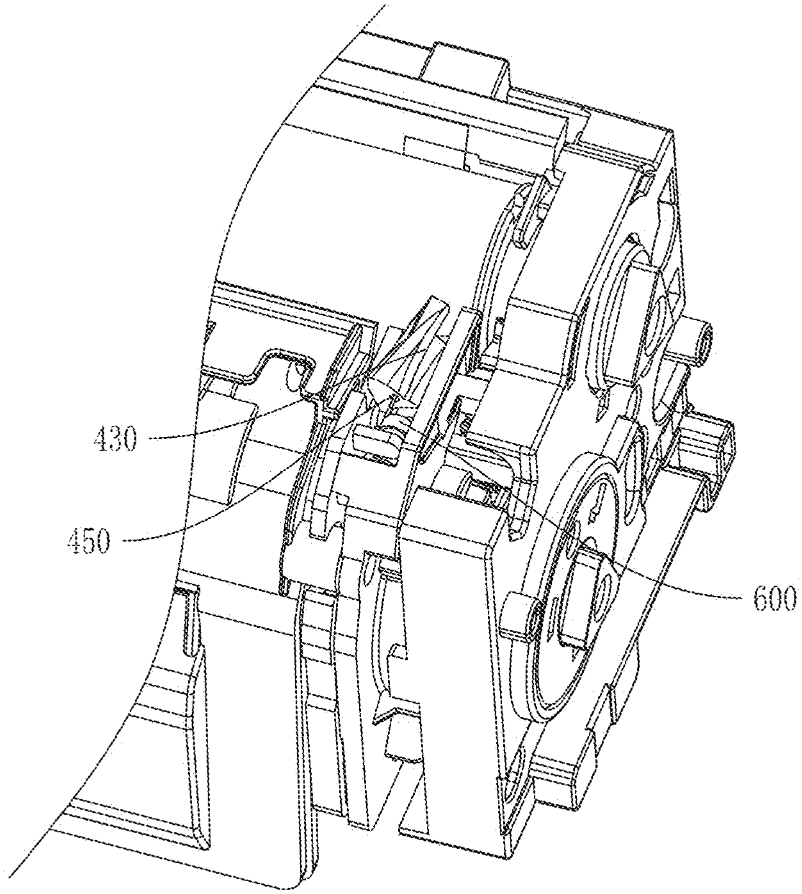
FIG. 59 illustrates a partial structural schematic of a separating part of a process cartridge in an operating position according to exemplary embodiment twelve of the present disclosure.

As shown in FIGS. 55, 58 and 59, the process cartridge may also include the reset part 600 configured to apply the force to the pushing part 400 to reset the pushing part 400 from the avoiding position to the working position. The reset part 600 may be elastic, and when the force-applying part 300 pushes the pushing part 400 to rotate, the reset part 600 may be compressed. Optionally, the reset part 600 may be a torsion spring installed on the developing protection cover 130. For example, an installation base 135 for installing a torsion spring may be disposed near the lower end of the developing protection cover 130; and the coil of the torsion spring may be sleeved on the installation base 135. One arm of the torsion spring may be abutted against the developing protection cover 130, and another arm of the torsion spring may be abutted against the side of the main body 410 of the pushing part 400. The torsion spring may be constructed to always apply the force along the A1 direction to the pushing part 400, so that the pushing part 400 may remain in the working position (i.e., the initial state of the pushing part 400) when no other external force is applied. In one embodiment, the installation base 135 may also be a part of the end of the jointing portion 133 (locking column); and the installation base 135 and the jointing portion 133 may be configured as a single piece to simplify the structure of the developing protection cover 130.

Furthermore, the pushing part 400 may also include the locking portion 450 connected to the reset part 600. The locking portion 450 may be disposed at another end of the main body 410 opposite to the abutting surface 440 along the length direction. The locking portion 450 may be a hole or a groove, which may be recessed or penetrated inward from the end surface of the main body 410 along the B2 direction. Another arm of the reset part 600 (torsion spring) may extend into the locking portion 450 and be abutted against the inner wall of the locking portion 450. The connection between the locking portion 450 and the reset part 600 may prevent the reset part 600 from being dislocated.

In some other embodiments, the reset part 600 may also be another elastic component, including compression springs, tension springs, elastic rubber, elastic sponges, or other reset structures that adopt non-elastic manners.

As shown in FIGS. 58-59, when the process cartridge is installed in the image-forming apparatus, the pushing part 400 may be in the working position at this point; the force-applying part 300 of the electronic image-forming apparatus may start to move; when the force-applying part 300 moves along the B1 direction, the force-applying part 300 may be in contact with the sliding-avoiding surface 430; and the force-applying part 300 may slide along the sliding-avoiding surface 430 and apply a pushing force to the sliding-avoiding surface 43. The pushing force may cause the forced pushing part 400 to swing around the jointing portion 133 toward the A2 direction and swing from the working position to the avoiding position, so that the force-applying part 300 may continue to move along the B1 direction. During the swinging process of the forced pushing part 400, the reset part 600 may be compressed and deformed. When the force-applying part 300 moves to the position being separated from the sliding-avoiding surface 430, the pushing force of the force-applying part 300 on the sliding-avoiding surface 430 may disappear; and the reset part 600 may recover its elastic deformation to push the forced pushing part 400 to swing along the A1 direction. The forced pushing part 400 may swing from the avoiding position to the working position; and the abutting surface 440 of the forced pushing part 400 that reaches the working position may be opposite to the force-applying part 300, that is, the abutting surface 440 and the force-applying part 300 may be at least partially overlapped with each other. However, the force-applying part 300 may be not in contact with the abutting surface 440. At this point, the preparation state of the electronic image-forming apparatus may be completed, and the developing operation may be performed.

When the electronic image-forming apparatus is not operating, the force-applying part 300 may move along the B2 direction; the force-applying part 300 may be in contact with the abutting surface 440 to apply the separation force to the abutting surface 440; and the separation force received by the abutting surface 440 may act on entire developing unit

100 through the pushing part 400. After the developing unit 100 is subjected to force, the lower end of the developing unit 100 may swing along the direction away from the drum unit 200 (roughly along the B2 direction); and the developing unit 100 may move from the first position to the second position, thereby driving the developing roller 140 to separate from the photosensitive drum 240. Meantime, the upper end of the developing unit 100 may move along the direction adjacent to the photosensitive drum 240 (roughly along the B1 direction) to compress the elastic part 500.

When the electronic image-forming apparatus needs to perform developing operation, the force of the force-applying part 300 on the abutting surface 440 may be removed; the elastic part 500 may recover its deformation and push the developing unit 100 to move from the second position to the first position; and the developing roller 140 may be in contact with the photosensitive drum 240, and the developing operation may be performed.

Exemplary Embodiment Thirteen

Figure 60:
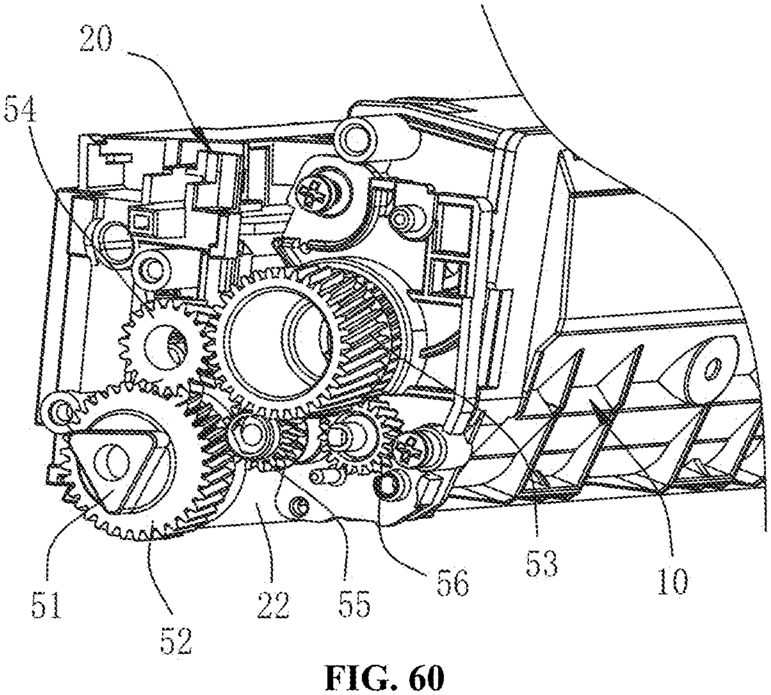
FIG. 60 illustrates a structural schematic of a process cartridge according to exemplary embodiment thirteen of the present disclosure.

Embodiments of the present disclosure further provide a process cartridge. The process cartridge may be detachably installed in the electronic image-forming apparatus; and the electronic image-forming apparatus may include the driving head. When the process cartridge is installed in the electronic image-forming apparatus, the process cartridge may cooperate with the driving head of the electronic image-forming apparatus to drive the rotating parts in the process cartridge to rotate through the driving head. Referring to FIG. 60, the process cartridge may include the drum unit 20, the developing unit 10 and the driving assembly. The frames of the drum unit 20 and the developing unit 10 may form the cartridge body. In addition, the drum unit 20 may include the photosensitive drum 22, and the developing unit 10 may include the developing roller and the toner feeding roller. The photosensitive drum 22, the developing roller and the toner feeding roller may be rotatably arranged on the cartridge body, respectively. The driving assembly, disposed at the end of the cartridge body, may be configured to drive and connect with the driving head to receive the driving force outputted by the driving head and transmit the driving force to rotating parts such as the photosensitive drum 22, the developing roller and the toner feeding roller, thereby making each rotating part to rotate.

For example, the driving assembly may include the first force-receiving part, the first transmission part 52, the second transmission part 53, the third transmission part 54, the toner feeding roller gear 56 and the developing roller gear 55. The first force-receiving part may be configured as the first coupling 51, and the first coupling 51 may be connected to the photosensitive drum 22. The first transmission part 52 may be configured as the first gear which maybe sleeved on the first coupling 51. The second transmission part 53 may be configured as the second gear, the toner feeding roller gear 56 may be connected to one end of the toner feeding roller, the developing roller gear 55 may be connected to one end of the developing roller, and the toner feeding roller gear 56 and the developing wheel gear 55 may be respectively meshed with the second gear. The third transmission part 54 may be configured as an intermediate gear which may be meshed with the first gear and the second gear respectively.

When the process cartridge is installed in the electronic image-forming apparatus, the first coupling 51 may be connected to the driving head, thereby driving the first coupling 51 to rotate through the driving head. Then the first gear and the photosensitive drum 22 may be driven to rotate through the first coupling 51. The rotation of the first gear may drive the second gear to rotate through the intermediate gear, and the rotation of the second gear may drive the toner feeding roller gear 56 and the developing wheel gear 55 to rotate, thereby driving the toner feeding roller and the developing roller to rotate.

Furthermore, the process cartridge may also include the developing protection cover 130 and the drive side end cover. The developing protection cover 130 may be disposed on the outer side of the end surface of the cartridge body and at the end of the developer roller. The drive side end cover may be disposed on the outer side of the developing protection cover 130. In addition, the first installation column and a second installation column may be disposed on the inner side of the end cover on the driving side, the second gear may be sleeved on the first installation column, and the intermediate gear may be sleeved on the second installation column.

Figure 61:
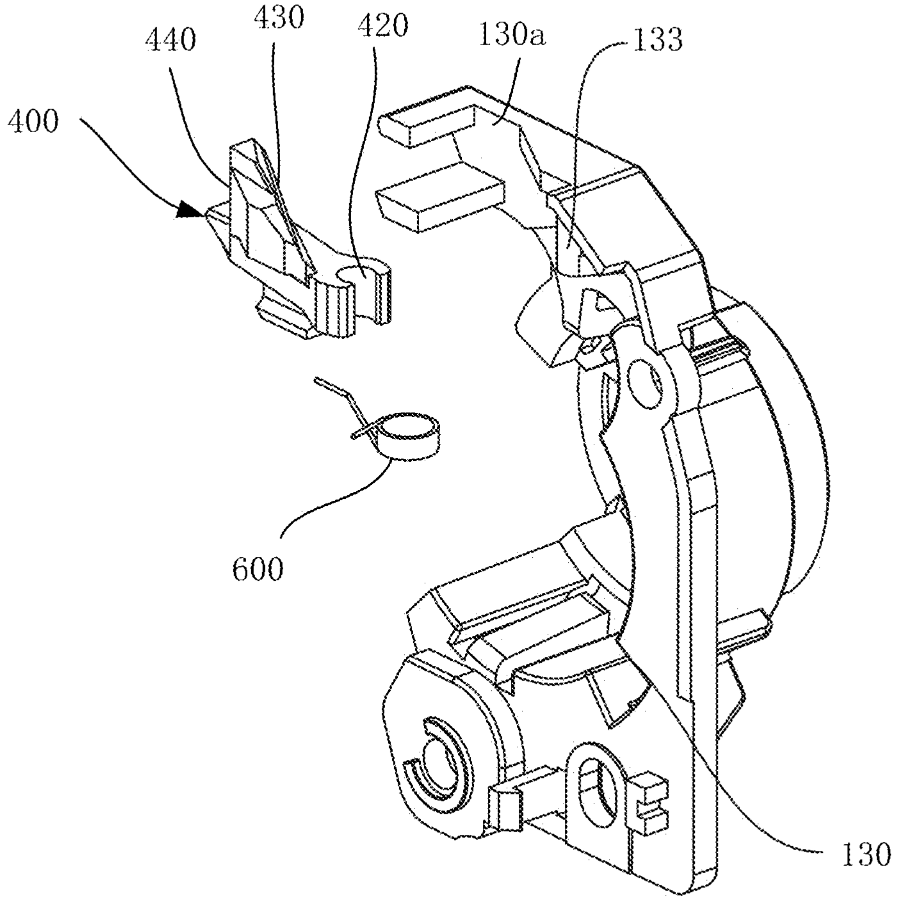
FIG. 61 illustrates a structural schematic of a developing protection cover, a pushing part, and a resetting part of a process cartridge according to exemplary embodiment thirteen of the present disclosure.

As shown in FIG. 61, the developing protection cover 130 may be configured with a groove 130*a*, and the process cartridge may also include the pushing part 400. The forced pushing part 400 may be movably disposed on the developing protection cover 130 and at least partially penetrate the groove 130*a*. The forced pushing part 400 may rotate in the groove 130*a* to have the working position and the avoiding position.

For example, the process cartridge may also include the reset part 600, the developing protection cover 130 may include the jointing portion 133, and the forced pushing part 400 may include the locking portion 420, the sliding-avoiding surface 430 and the abutting surface 440. The locking portion 420 may be rotatably connected to the jointing portion 133, so that the forced pushing part 400 may rotate around the jointing portion 133. The reset part 600 may be configured as a torsion spring, and the coil of the torsion spring may be sleeved on the installation base of the driving side bracket. One arm of the torsion spring may be abutted against the driving side bracket, and another arm of the torsion spring may be abutted against the forced pushing part 400, so that the forced pushing part 400 may be reset from the avoiding position to the working position through the torsion spring.

When the process cartridge is installed in the image-forming apparatus, the pushing part 400 may be in the working position; the force-applying part of the electronic image-forming apparatus may start to move. During the movement of the force-applying part, the sliding-avoiding surface 430 may be pushed, so that the forced pushing part 400 may swing around the jointing portion 133 from the working position to the avoiding position. During the swinging process of the forced pushing part 400, the reset part 600 may be compressed and deformed. When the force-applying part moves to the position separated from the sliding-avoiding surface 430, the pushing force of the force-applying part on the sliding-avoiding surface 430 may disappear. The reset part 600 may recover its elastic deformation and push the pushing part 400 to swing from the avoiding position to the working position. The abutting surface 440 of the forced pushing part 400 that reaches the working position may be opposite to the force-applying part, that is, the pushing part and the force-applying part may be at least partially overlapped with each other along the second direction. However, the force-applying part may not contact the abutting surface 440. At this point, the electronic image-forming apparatus may be ready to perform the developing operation.

When the electronic image-forming apparatus does not perform the developing operation, the force-applying part may move to contact the abutting surface 440 and apply the force to the abutting surface 440.

The force received by the abutting surface 440 may act on entire developing unit 100 through the pushing part 400. After the developing unit 100 is subjected to force, the lower end of the developing unit 100 may swing along the direction away from the drum unit 200; and the developing unit 100 may move from the first position to the second position, thereby driving the developing roller to separate from the photosensitive drum 22. Meantime, the upper end of the developing roller may move along the direction adjacent to the photosensitive drum 22 to compress the elastic part between the drum unit and the developing unit.

When the electronic image-forming apparatus needs to perform the developing operation, the force exerted by the force-applying part on the abutting surface 440 may be removed. The elastic part may be deformed and restored to push the developing unit 10 to move from the second position to the first position, and the developing roller may be in contact with the photosensitive drum 22 to perform the developing operation.

Other structures of the process cartridge in one embodiment may be substantially same as other structures of the process cartridge in exemplary embodiment ten or eleven, which may not be described in detail herein.

Exemplary Embodiment Fourteen

Figure 62:
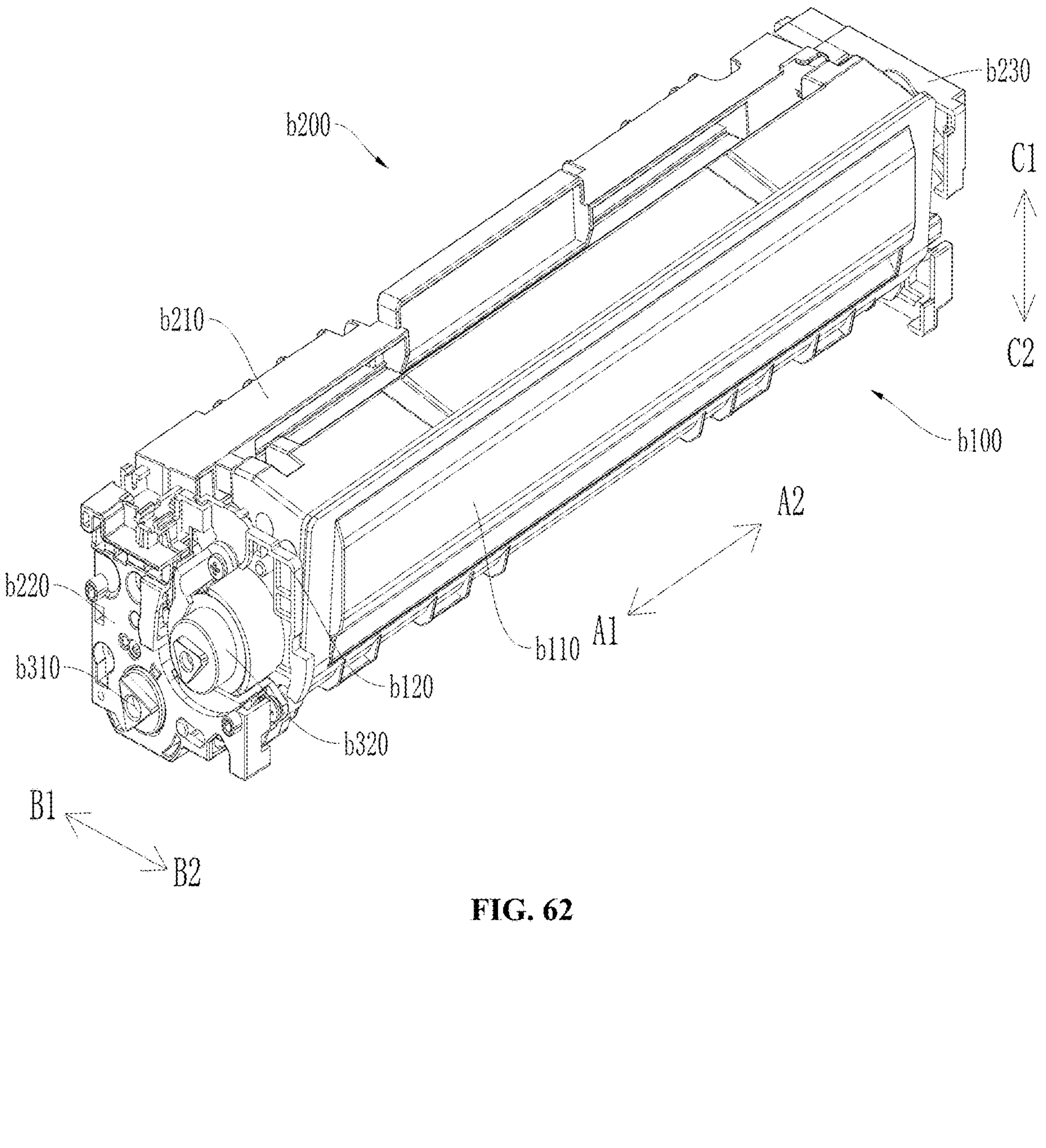
FIG. 62 illustrates an overall structural schematic of a process cartridge from a viewing angle according to exemplary embodiment fourteen of the present disclosure.
Figure 63:
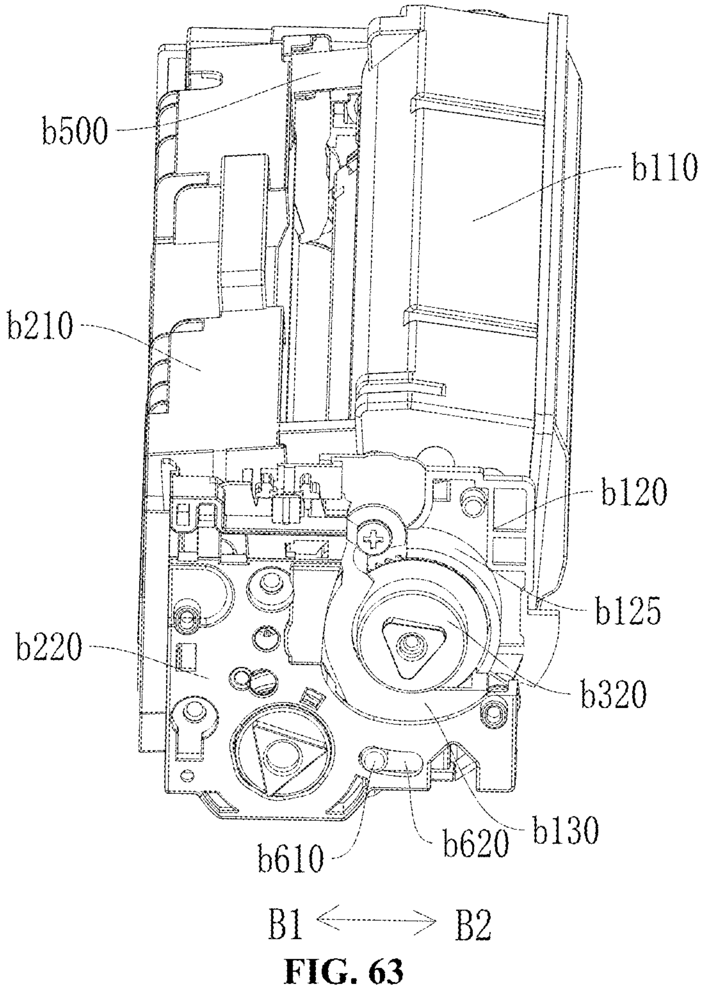
FIG. 63 illustrates an overall structural schematic of a process cartridge from another viewing angle according to exemplary embodiment fourteen of the present disclosure.

As shown in FIGS. 62-63, a process cartridge is provided in one embodiment. The process cartridge may include a developing unit b100, a drum unit b200, and a driving assembly. The developing unit b100 may include a developing frame b110, a developing roller, a toner feeding roller and a toner discharging knife. The drum unit b200 may include a photosensitive frame b210, a photosensitive drum, a charging roller, and a cleaning blade. The process cartridge may be approximately in the shape of a rectangular box, which has length along the first direction (directions A1 and A2), width along the second direction (directions B1 and B2), and height along the third direction (directions C1 and C2). One end of the process cartridge along the A1 direction may be a driving end, and another end of the process cartridge along the A2 direction may be a conductive end. The developing unit b100 and the drum unit b200 may be arranged to be opposite to each other along the second direction. The direction from the developing unit b100 toward the drum unit b200 is the B1 direction, one end of the process cartridge along the B1 direction may be a front end; the direction from the drum unit b200 toward the developing unit b100 is the B2 direction, and another end of the process cartridge along the B2 direction may be a rear end; and one end of the process cartridge along the C1 direction may be an upper end, and another end of the process cartridge along the C2 direction may be a lower end.

Figure 67:
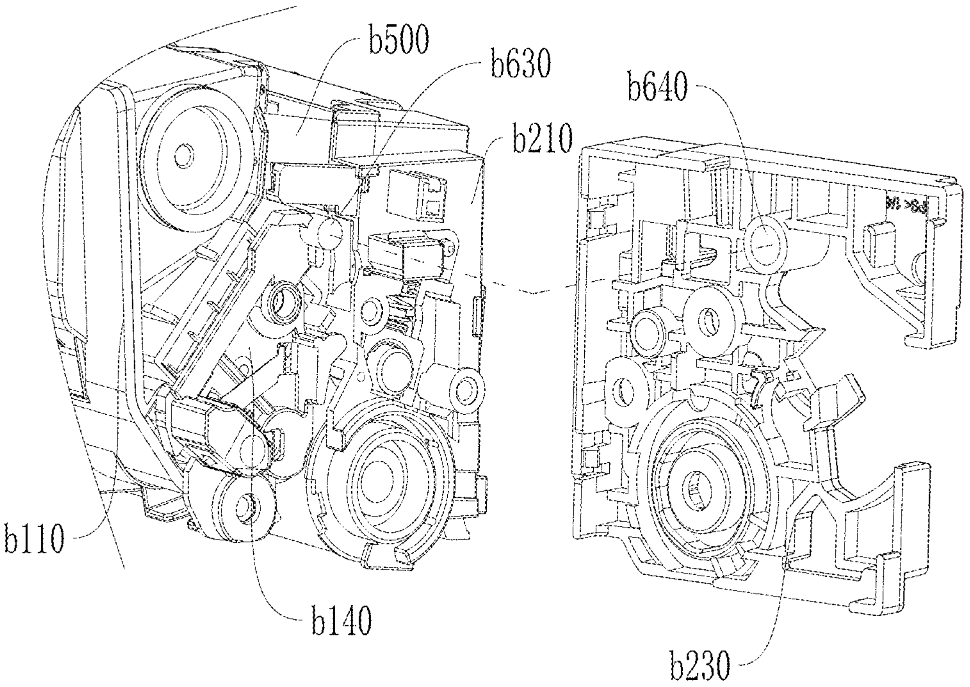
FIG. 67 illustrates a partial exploded structural schematic of a conductive end of a process cartridge according to exemplary embodiment fourteen of the present disclosure.

As shown in FIGS. 62, 63 and 67, the developing frame b110 may surround a toner bin for storing toner. The developing frame b110 may be approximately in the shape of a rectangular box. The length direction of the developing frame b110 may extend along the first direction (A1 and A2 directions). The developing frame b110 may be respectively disposed with a developing bearing b120 and a conductive-side bracket b140 at two ends along the length direction (A1 and A2 directions). The toner feeding roller and the developing roller may be rotatably supported on the developing bearings b120 and the conductive-side brackets b140 at two ends of the developing frame b110 along the length direction. The toner feeding roller and the developing roller may rotate under the action of the driving assembly, and the axial directions of the toner feeding roller and the developing roller may be both configured to be along the length direction (the first direction) of the developing frame b110. The toner feeding roller may be in contact with the developing roller and transport the toner in the toner bin to the developing roller to be adsorbed by the charged developing roller.

As shown in FIGS. 62 and 67, the photosensitive frame b210 may surround a waste toner bin for collecting waste toner; the photosensitive frame b210 may also have a length direction which is consistent with the length direction of the developing frame b110 (both along the A1 and A2 directions); and the photosensitive frame b210 may be disposed with end covers at two ends along the first direction, which are a driving-side end cover b220 fixedly disposed on one end of the photosensitive frame b210 along the A1 direction and a conductive-side end cover b230 fixedly disposed on another end of the photosensitive frame b210 along the A2 direction. The photosensitive drum is rotatably supported on the driving-side end cover b220 and the conductive-side end cover b230. For example, the photosensitive drum may be disposed on the lower end side (the C2 direction side) of the photosensitive frame b210 along the height direction. The toner adsorbed by the developing roller may be transferred to the photosensitive drum through the potential difference between the developing roller and the photosensitive drum. The toner on the photosensitive drum may be transferred through a transferring belt of the electronic image-forming apparatus to form an image on the recording material (such as paper). After transferring, the cleaning blade may make linear contact with the photosensitive drum to clean the toner that has not been completely transferred on the surface of the photosensitive drum, that is, waste toner. The waste toner after cleaning may be stored in the waste toner bin. The charging roller may be configured to uniformly charge the surface of the photosensitive drum, such that the photosensitive drum may absorb toner.

Figure 64:
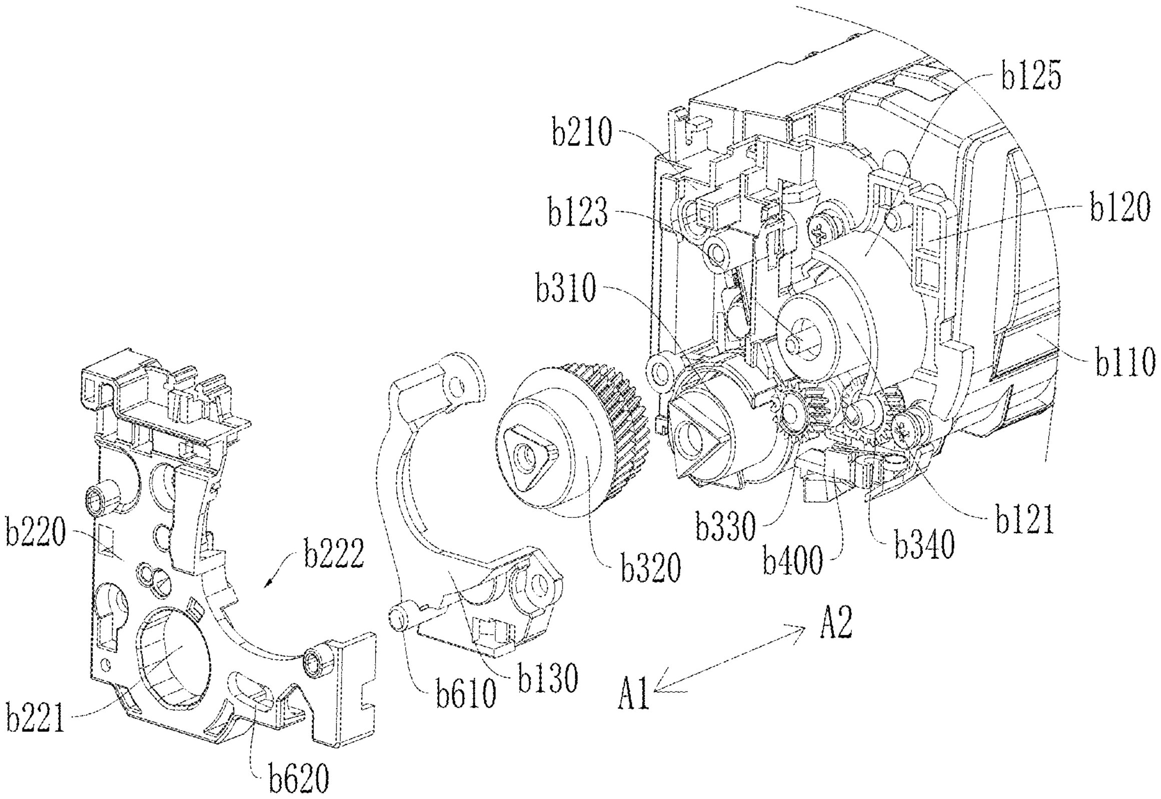
FIG. 64 illustrates a partial exploded structural schematic of a driving end of a process cartridge according to exemplary embodiment fourteen of the present disclosure.

As shown in FIGS. 62-64, the driving assembly may include a photosensitive drum coupling b310, a developing roller coupling b320, a developing roller gear b330 and a toner feeding roller gear b340. The driving assembly may be disposed at one or two ends of the process cartridge along the first direction (the length direction). In one embodiment, the driving assembly may be disposed at a same end of the developing unit b100 along the length direction, that is, the driving end (the end along the A1 direction). The photosensitive drum coupling b310 may be disposed at one end of the photosensitive drum along the A1 direction and configured to be meshed with the photosensitive driving head of the electronic image-forming apparatus to receive the driving force and drive the photosensitive drum to rotate. The developing roller coupling b320, the developing roller gear b330, and the toner feeding roller gear b340 may be disposed at the outer side of the developing bearing b120. For example, the developing bearing b120 may be provided with a support hole for supporting the developing roller coupling b320; the developing roller coupling b320 may be configured to be meshed with the development driving head of the electronic image-forming apparatus and receive the driving force; and the developing roller coupling b320 may be located at a substantially middle position of the development unit b100 along the third direction. The developing roller gear b330 may be sleeved on one end of the axle of the developing roller extending from the developing bearing b120; and the toner feeding roller gear b340 may be sleeved on the axle of the toner feeding roller extending from one end of the developing bearing b120. The developing roller gear b330 and the toner feeding roller gear b340 may be directly or indirectly meshed with the developing roller coupling b320, such that the developing roller coupling b320 may transmit received driving force to drive the developing roller and the toner feeding roller to rotate. Along the third direction, the developing roller coupling b320 may be located at the upper side of the photosensitive drum coupling b310 (the side of the C1 direction).

Figure 65A:
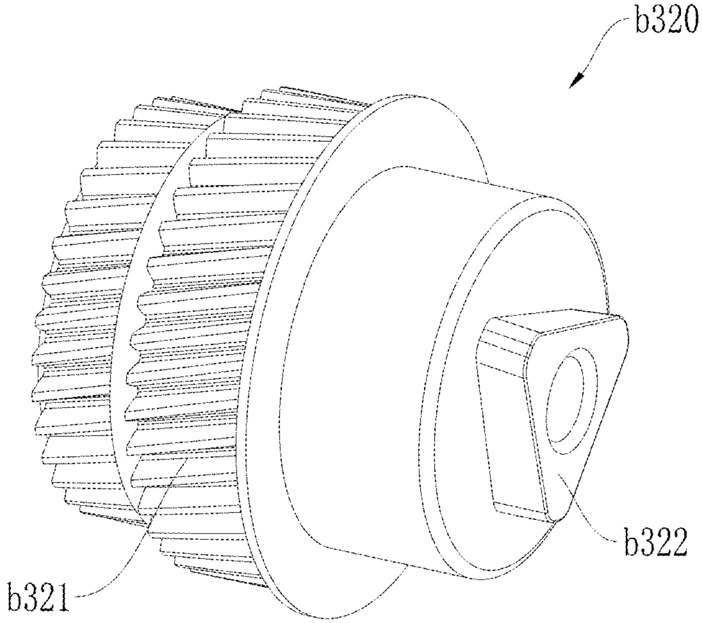
FIG. 65A illustrates a structural schematic of a developing roller coupling of a process cartridge according to exemplary embodiment fourteen of the present disclosure.
Figure 65B:
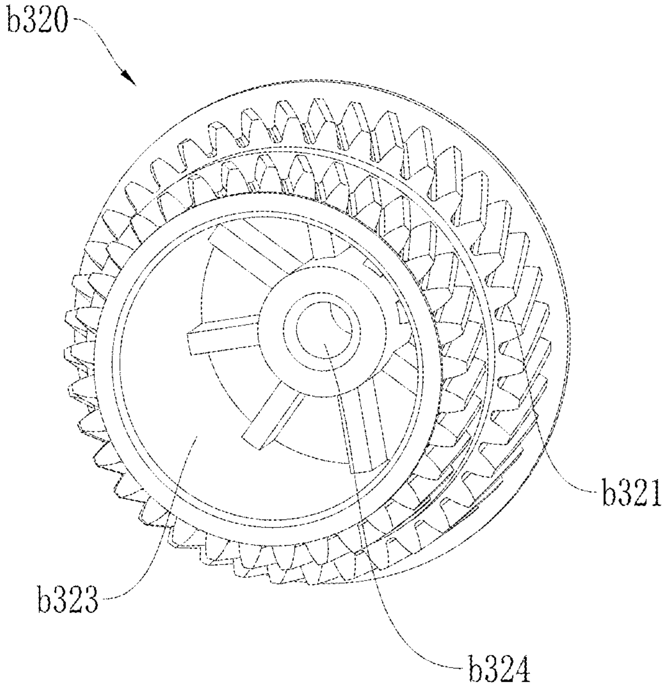
FIG. 65B illustrates another structural schematic of a developing roller coupling of a process cartridge according to exemplary embodiment fourteen of the present disclosure.
Figure 66:
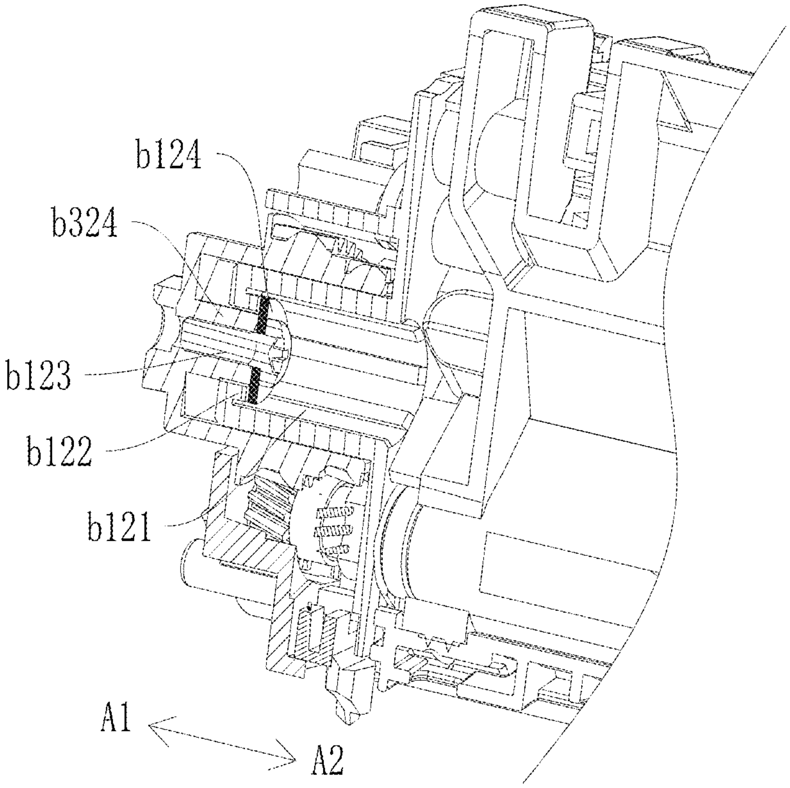
FIG. 66 illustrates a partial cross-sectional view of a driving end of a process cartridge according to exemplary embodiment fourteen of the present disclosure.

As shown in FIGS. 64-66, for example, a positioning portion b121 may be disposed on the outer side of the developing bearing b120 (away from the developing frame b110); and the developing roller coupling may be sleeved on the positioning portion b121 and fixedly installed on the positioning portion b121 through a connecting assembly. The positioning portion b121 may be a cylindrical structure protruding along the A1 direction and disposed on the developing bearing b120. The positioning portion b121 may be hollow inside. An end of the positioning portion b121 away from the developing frame b110 may be disposed with an annular protruding edge b122 which protrudes along the axial direction. A hole may be formed in the middle of the annular protruding edge b122, and the inner diameter of the hole may be less than the inner diameter of the positioning portion b121. The developing roller coupling b320 may include a gear portion b321, a force-receiving portion b322, a hollow portion b323, and an installation portion b324. The inner diameter of the hollow portion b323 may be matched with the outer diameter of the positioning portion b121. The developing roller coupling may be sleeved on the outer side of the positioning portion b121 (the cylindrical structure) through the hollow portion b323, and the force-receiving portion b322 may be disposed at one end of the hollow portion b323 away from the developing frame b110. The force-receiving portion b322 may be a triangular protrusion for being meshed with the development driving head of the electronic image-forming apparatus to receive the driving force. The gear portion b321 may be disposed on the outer circumferential surface of the hollow portion b323. The gear portion b321 may be a two-level gear, where one-level gear may be meshed with the developing roller gear b330 and another-level gear may be meshed with the toner feeding roller gear b340. The installation portion b324 may be disposed in the hollow portion b323. The installation portion b324 may be a cylindrical protrusion and protrude outward from an inner end surface of the hollow portion b323 along the A2 direction. The outer diameter of the installation portion b324 may be matched with the inner diameter of the hole formed at the annular protruding edge b122 on the positioning portion b121. When the developing roller coupling is sleeved on the positioning portion b121, at least a part of the installation portion b324 may be inserted into the positioning portion b121 from the hole. The connecting assembly may be located in the positioning portion b121. The connecting assembly may include a connecting part b123 and a gasket b124. The gasket b124 may be abutted against the end of a part of the installation portion b324 that extends into the positioning portion b121. The connecting part b123 may pass through the gasket b124 to be fixedly connected to the installation portion b324. The connecting part b123 may be a pin, a screw, a bolt or the like. The gasket b124 may be a circular metal sheet (optionally, a steel sheet), and the outer diameter of the gasket b124 may be greater than the inner diameter of the annular protruding edge b122 of the positioning portion b121, which may prevent the developing roller coupling from being separated from the positioning portion b121. When the developing roller coupling receives the driving force of the electronic image-forming apparatus to rotate, the developing roller coupling may drive the gasket b124 and the connecting part b123 to rotate together. Lubricating oil may be added to the gasket b124 to reduce the friction between the gasket b124 and the inside of the positioning portion b121, such that the developing roller coupling may rotate more smoothly.

As shown in FIGS. 62-64, a developing protection cover b130 may be further disposed at the outer side of the developing bearing b120. The developing protection cover b130 may cover the developing roller gear b330, the toner feeding roller gear b340 and a part of the developing roller coupling b320, which may protect the driving assembly. For example, the developing protection cover b130 may cover the lower side or the front lower side of the gear portion b321 of the developing roller coupling b320. However, the upper rear side of the developing protection cover b130 may be a notch which may not cover the upper rear side of the gear portion b321 of the developing roller coupling b320. Therefore, the side of the developing bearing b120 facing away from the developing frame b110 may be also disposed with a tooth protection portion b125. The tooth protection portion b125 may be an arc-shaped protrusion or an L-shaped protrusion protruding along the A1 direction. The tooth protection portion b125 may be located on the rear upper side of the gear portion b321 and cover the portion of the gear portion b321 that the developing protection cover b130 cannot cover, thereby desirably protecting the gear portion b321. It should be noted that the developing protection cover b130 may be only configured to cover and protect the developing roller coupling b320; and there is no abutting part between the developing protection cover b130 and the developing roller coupling b320. Therefore, the developing protection cover b130 may not have the function of supporting the developing roller coupling b320.

As shown in FIGS. 62, 64 and 67, the conductive-side end cover b230 and the driving-side end cover b220 may be fixedly connected to two ends of the photosensitive frame b210, respectively; and the conductive-side end cover b230 may be at least partially disposed at the outer side of the conductive-side bracket b140, and the driving-side end cover b220 may be at least partially disposed at the outside of the developing protection cover b130. Viewed along the length direction of the process cartridge, a part of the developing protection cover b130 may be overlapped with a part of the developing roller coupling b320, and another part of the developing protection cover b130 may be overlapped with a part of the driving-side end cover b220. The driving-side end cover b220 and the conductive-side end cover b230 may respectively cover at least a part of the end portion of the photosensitive frame b210 and a part of the end portion of the developing frame b110.

As shown in FIGS. 62-64, a first hole b221 and a notch portion b222 may be formed at the driving-side end cover b220. When the driving-side end cover b220 is installed on the end portions of the developing frame b110 and the photosensitive frame b210, a part of the photosensitive drum coupling b310 may be exposed through the first hole b221, and a part of the developing roller coupling b320 may be exposed through the notch portion b222, such that the coupling component may be meshed with the driving head of the electronic image-forming apparatus to receive the driving force. The notch portion b222 may extend upward and backward from a position corresponding to the developing roller coupling b320 to the upper end and/or rear end of the driving-side end cover b220. That is, a hollow part may be formed on the driving-side end cover b220, and the most portion of the developing protection cover b130 may be exposed through the notch portion b222. The internal structure of the process cartridge (especially the internal structure of the developing roller coupling b320) may be observed to a certain extent through the notch portion b222. When local maintenance is required, maintenance may be performed without removing the driving-side end cover b220, such that maintenance may be more convenient.

During the electronic image-forming apparatus is operating, the developing roller and the photosensitive drum may need to be in tight contact. When the image-forming apparatus is not operating, the developing roller and photosensitive drum may need to be separated by a certain distance, which may avoid problems including the photosensitive drum's contamination by excess developer attached to the developing roller caused by long-term contact between the developing roller and the photosensitive drum, deformation of the developing roller, wear and tear of the photosensitive drum, and the like.

Therefore, the drum unit b200 and the developing unit b100 in one embodiment may be configured to move relative to each other, such that the developing roller and the photosensitive drum may be in contact with each other when the electronic image-forming apparatus is operating and may be separated from each other when the electronic image-forming apparatus is not operating. When the process cartridge is installed in the electronic image-forming apparatus, the drum unit b200 may be in contact with components in the electronic image-forming apparatus, and the drum unit b200 may be not movable. The developing unit b100 may be configured to be movable relative to the drum unit b200 between the first position and the second position. When the developing unit b100 is in the first position, the developing roller may be in contact with the photosensitive drum; and when the developing unit b100 is in the second position, the developing roller may be separated from the photosensitive drum.

As shown in FIGS. 62-64 and 67, in one embodiment, the process cartridge may further include a connecting portion, a separating part b400 and an elastic part b500, which are configured to realize movement of the developing unit b100 between the first position and the second position relative to the drum unit b200. In the first position, the developing roller may be in contact with the photosensitive drum; and in the second position, the developing roller may be separated from the photosensitive drum. Viewed along the axial direction (the first direction) of the developing roller, the connecting portion may be not overlapped with the developing roller coupling b320.

As shown in FIGS. 62-64 and 67, in one embodiment, the connecting portion may be configured to be connected to the developing unit and the drum unit in a swing manner. The connecting portion may include the first supporting portion b610 and the first guiding portion b620 disposed at the driving end of the developing unit b100 and include the second supporting portion b630 and the second guiding portion b640 disposed at the conductive end of the developing unit b100. Optionally, the first supporting portion b610 may be disposed near one end of the developing protection cover b130 along the third direction, for example, a position on the end surface of the developing protection cover b130 adjacent to its lower end. The driving-side end cover b220 may be disposed with the first guiding portion b620 that matches the first supporting portion b610. The first supporting portion b610 may move within the range of the first guiding portion b620. The first guiding portion b620 may be located on the lower side of the notch portion b222 along the third direction, and the first supporting portion b610 may correspond to the position of the first guiding portion b620 and may be also located on the lower side of the notch portion b222. That is, when viewed along the axial direction of the developing roller, the first supporting portion b610 and the first guiding portion b620 may be always located on the lower side of the notch portion b222 and may be not overlapped with the notch portion b222; and the developing roller coupling b320 may be within the range of the notch portion b222. Therefore, when viewed along the axial direction of the developing roller, the first supporting portion b610 and the first guiding portion b620 may be not overlapped with the developing roller coupling b320.

As shown in FIGS. 62-64, the first supporting portion b610 may be a cylindrical member formed on the end surface of the developing protection cover b130 (that is, the first supporting portion b610 may be a supporting column). Optionally, the first supporting portion b610 may be a cylindrical structure or another multi-faceted prism structure. The first guiding portion b620 may be a hole or a through groove formed on the driving-side end cover b220. The hole or through groove may be an arc-shaped hole or an arc-shaped groove. The first guiding portion b620 may approximately extend along the second direction. During assembly, the first supporting portion b610 may be inserted into the first guiding portion b620. The range of the first guiding portion b620 may limit the movement range of the first supporting portion b610, that is, limit the swinging range of the developing unit b100 relative to the drum unit b200.

In some other embodiments, the first supporting part b610 may be disposed on the driving-side end cover b220, and the first guiding portion b620 may be disposed on the developing protection cover b130.

As shown in FIG. 67, the second supporting portion b630 may be a cylindrical member formed on the end surface of the conductive-side bracket b140. Optionally, the second supporting portion b630 may be a cylindrical structure or another multi-faceted prism structure. The second supporting portion b630 may be configured to be adjacent to the upper end of the developing unit b100 along the third direction. The conductive-side end cover b230 may be disposed with the second guiding portion b640 that matches the first supporting portion b610. The position of the second guiding portion b640 may correspond to the second supporting portion b630 and may also be configured to be adjacent to the upper end of the developing unit b100. The second guiding portion b640 may be a circular hole or a circular groove. During assembly, the second supporting portion b630 may be inserted in the second guiding portion b640, and the positions of the second supporting portion b630 and the second guiding portion b640 may form the rotation center of the developing unit swinging relative to the drum unit. Viewed along the axial direction of the developing roller, the second supporting part b630 and the second guiding portion b640 may be not overlapped with the developing roller coupling b320.

In some other embodiments, the second supporting portion b630 may be also disposed on the conductive-side end cover b230, and the second guiding portion b640 may be also disposed on the conductive-side bracket b140.

As shown in FIG. 64, the movement of the developing unit b100 from the first position to the second position may be realized by cooperation of the separating part b400 and the force-applying part in the electronic image-forming apparatus. For example, the developing unit b100 may be disposed with the separating part b400 at one or two ends along the length direction. The separating part b400 may be disposed below the developing frame b110 or below the end cover. Optionally, the separating part b400 may be movably disposed on the end surface of the developing unit b100. The separating part b400 may be a bar-shaped arm or a block-shaped part. One end of the separating part b400 may be hinged with the developing unit b100, and another end of the separating part b400 may drive the developing unit b100 to move from the first position to the second position along the direction away from the drum unit b200 when receiving the force (the separation force) of the force-applying part, thereby separating the developing roller from the photosensitive drum.

In one embodiment, the separating part b400 may be hinged on the lower end of the developing protection cover b130. The separating part b400 may not need to be disposed on the developing protection cover b130. A supporting axle may be disposed on the end face of the developing unit b100, and one end of the separating part b400 may be sleeved on the supporting axle, such that the installation of the separating part b400 may also be completed. A portion of the free end of the separating part b400 may be exposed outside the developing frame b110 from below, such that the force-applying part may be in contact with the separating part b400 from below and exert force on the separating part b400.

As shown in FIG. 63, the elastic part b500 may be disposed between the drum unit b200 and the developing unit b100 and configured to move the developing unit b100 from the second position to the first position and drive the developing roller to be in contact with the photosensitive drum. For example, one end of the elastic part b500 may be connected to the upper end of the photosensitive frame b210, and the other end of the elastic part b500 may be connected to the upper end of the developing frame b110. The elastic part b500 may be, optionally, a spring, and may also be an elastic rubber, an elastic sponge, an elastic part, or other components capable of providing elastic force.

When the electronic image-forming apparatus is not operating, the force-applying part may be in contact with the separating part b400 from below and apply force to the separating part b400; after the developing unit b100 receives the force, the lower end of the developing unit b100 may swing along the direction away from the drum unit b200 (approximately along the B2 direction) to drive the developing roller to be separated from the photosensitive drum; and the upper end of the developing unit b100 may move along the direction adjacent to the photosensitive drum (approximately along the B1 direction) to compress the elastic part b500. Meanwhile, the first supporting portion b610 may move from one end along the B1 direction to an end along the B2 direction within the first guiding portion b620, and the second supporting portion b630 may rotate within the second guiding portion b640; and the connecting portion may play a supporting and positioning role during the movement of the developing unit b100.

When the electronic image-forming apparatus needs to operate, the force of the force-applying part on the separating part b400 may be removed, and the elastic part b500 may recover from elastic deformation and push the developing unit b100 to move from the second position to the first position; and the developing roller may come into contact with the photosensitive drum. Meanwhile, the first supporting portion b610 may move from one end along the B2 direction to another end along the B1 direction in the first guiding portion b620, the second supporting portion b630 may rotate along the opposite direction in the second guiding portion b640, the developing unit b100 may remain in the first position under the force applied by the elastic part b500, and the developing roller may be always in close contact with the photosensitive drum.

In one embodiment, the developing roller coupling b320 of the process cartridge may be rotatably fixedly installed on the development bearing b120, and the developing roller coupling b320 may be not supported by the development protection cover b130, which may solve the technical problems in the existing technology that the developing roller coupling b320 is positioned inaccurately and the driving force cannot be stably transmitted due to structural defects of the developing bearing b120 or the developing protection cover b130 itself.

Exemplary Embodiment Fifteen

Another process cartridge is provided in one embodiment. Compared with exemplary embodiment fourteen, the difference is that the structures of the connecting portions may be different, the positions of the tooth protection portions may be different, and the process cartridge may further include a limiting portion and a limited portion.

As shown in FIGS. 68-71, in one embodiment, the connecting portion may include the third supporting portion b650 and the third guiding portion b660 disposed at the driving end of the process cartridge and include the fourth supporting portion b670 and the fourth guiding portion b680 disposed at the conductive end of the process cartridge. Viewed along the axial direction (the first direction) of the developing roller, the connecting portion may be not overlapped with the developing roller coupling b320.

Figure 70:
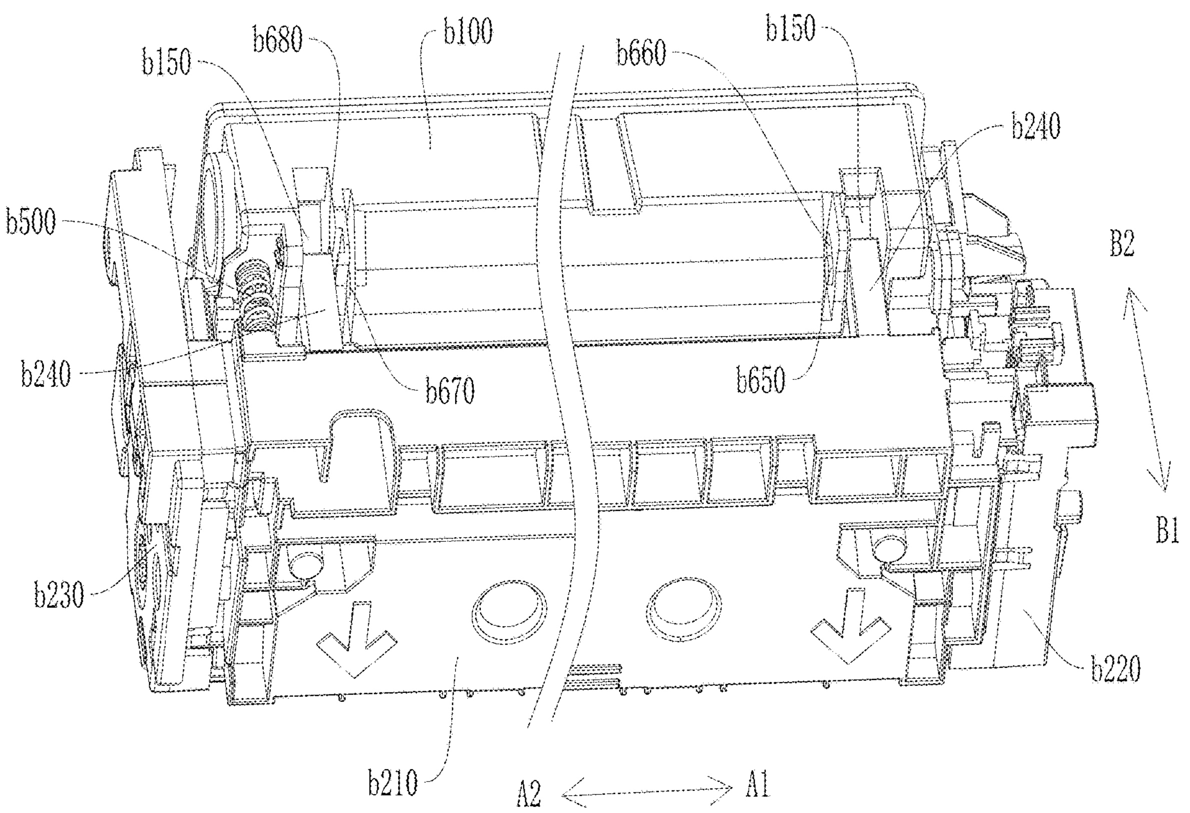
FIG. 70 illustrates a structural schematic of a process cartridge from another viewing angle according to exemplary embodiment fifteen of the present disclosure.
Figure 71:
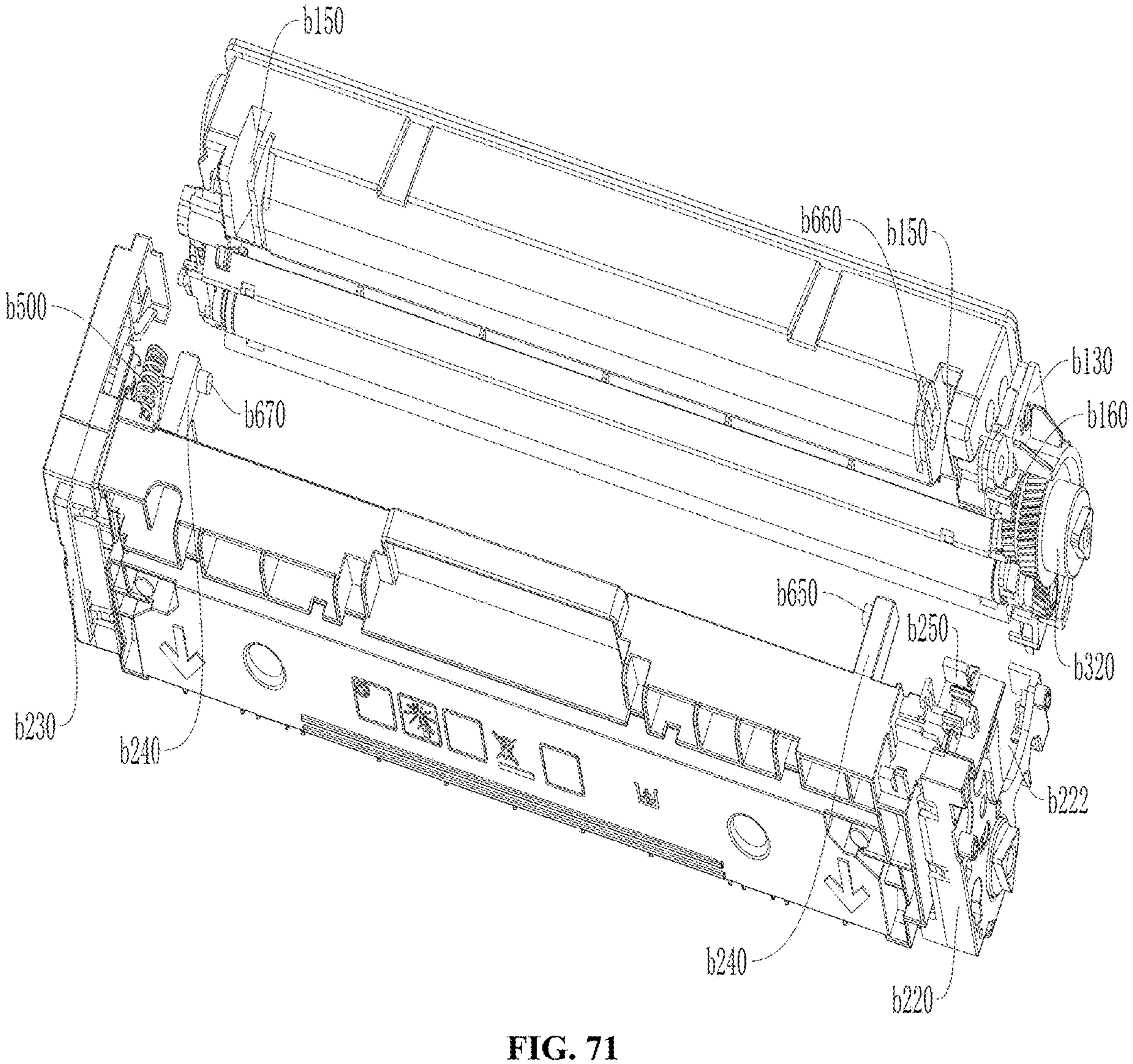
FIG. 71 illustrates a partial exploded schematic of a process cartridge according to exemplary embodiment fifteen of the present disclosure.
Figure 72:
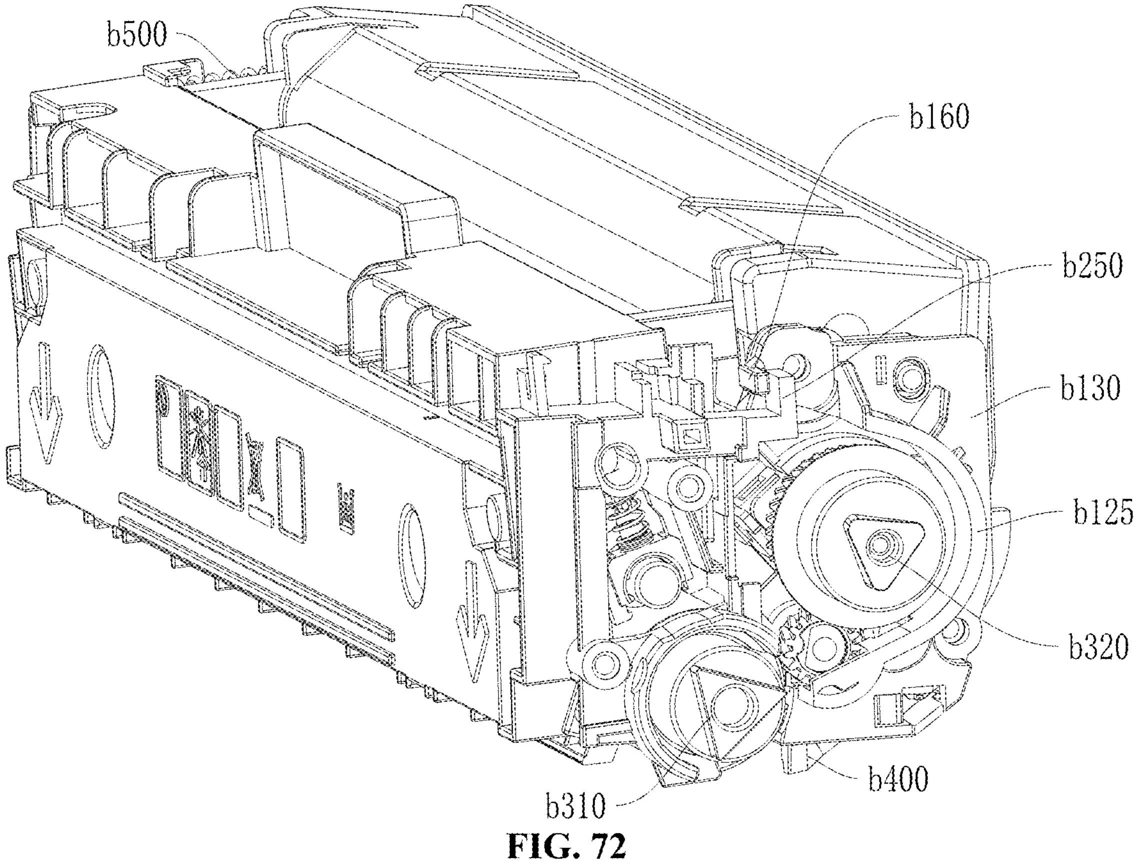
FIG. 72 illustrates a structural schematic of a driving end of a process cartridge according to exemplary embodiment fifteen of the present disclosure (a driving-side end cover is omitted).
Figure 73:
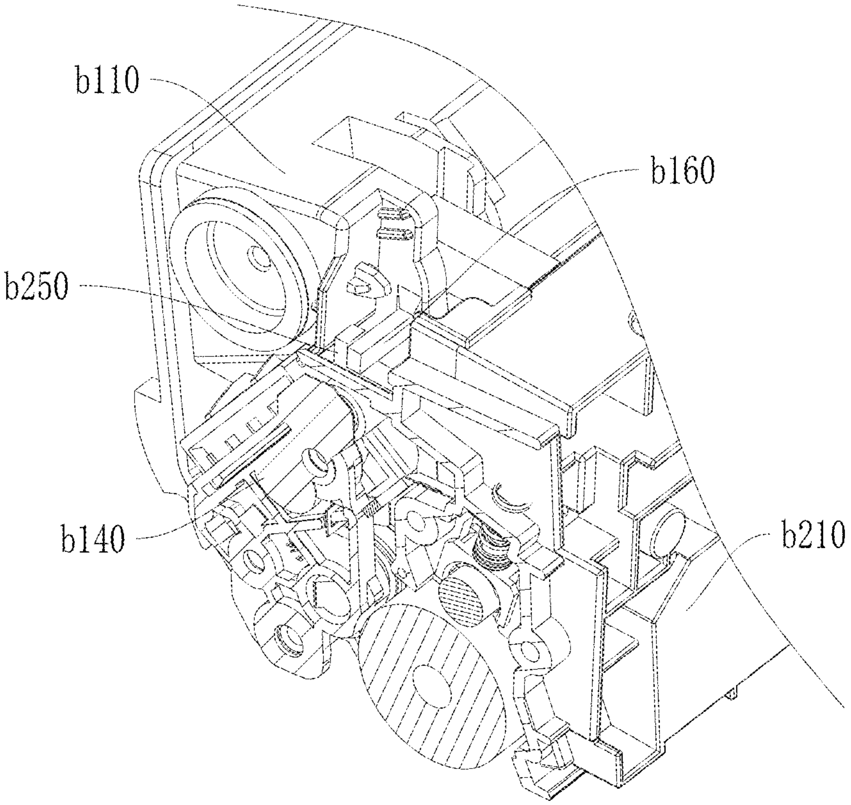
FIG. 73 illustrates a partial cross-sectional view of a conductive end of a process cartridge according to exemplary embodiment fifteen of the present disclosure.

For example, as shown in FIGS. 70-71, the third supporting portion b650 may be disposed on the photosensitive frame b210; the photosensitive frame b210 may be disposed with an extension portion b240 on the side facing the developing unit b100; the extension portion b240 may be approximately a strip-shaped member; the extension portion b240 may extend along the second direction; the extension portion b240 may extend to the position of the developing frame b110; the developing frame b110 may be disposed with an avoiding groove b150 for avoiding the extension portion b240, that is, one end of the extension portion b240 may be inserted into the avoiding groove b150; the extension portion b240 may be disposed adjacent to the upper end of the photosensitive frame b210; and the avoiding groove b150 may be also adjacent to the upper end of the developing frame b110. When the developing unit b100 moves between the first position and the second position relative to the drum unit b200, one end of the extending portion b240 may also slide relative to the avoiding groove b150.

As shown in FIGS. 70-71, the third supporting portion b650 may be disposed on the surface of the portion of the extension portion b240 inserted into the avoiding groove b150. The third supporting portion b650 may be a cylindrical member formed on the surface of the extension portion b240 along the first direction. Optionally, the third supporting portion b65 may be cylindrical shape and may also be another multi-faceted prism structure. The third guiding portion b660 may be a hole or a through groove formed on the groove wall of the avoiding groove b150 along the first direction. The third guiding portion b660 may be an arc-shaped groove or an arc-shaped hole. The third guiding portion b660 may approximately extend along the second direction. During assembly, one end of the extension portion b240 may be inserted into the avoiding groove b150, and the third supporting portion b650 may be inserted into the third guiding portion b660. The range of the third guiding portion b660 may limit the movement range of the third supporting portion b650, that is, limit the swinging range of the developing unit b100 relative to the drum unit b200.

As shown in FIGS. 70-71, in one embodiment, the structures and movement manners of the fourth supporting portion b670 and the fourth guiding portion b680 at the conductive end may be same as the structures and movement manners of the third supporting portion b650 and the third guiding portion b660, which may not be described in detail herein.

In one embodiment, the tooth protection portion b125 may be disposed on the developing protection cover b130 instead of the developing bearing b120. The tooth protection portion b125 may be disposed on the side of the developing protection cover b130 facing away from the developing frame b110. The tooth protection portion b125 may be a half-ring protruding edge protruding along the A1 direction. The tooth protection portion b125 may be on the side of the gear portion b321 of the developing roller coupling b320 away from the photosensitive drum and may protect the gear portion b321. It should be noted that the developing protection cover b130 of one embodiment may be only configured to cover and protect the developing roller coupling b320, and there may be no contact therebetween, such that the development protection cover b130 may not have the function of supporting the developing roller coupling b320.

Furthermore, as shown in FIGS. 68-69 and 71-73, the process cartridge may further include the limiting portion b250 and the limited portion b160. The drum unit b200 may be disposed with the limiting portion b250, and the developing unit b100 may be disposed with the limited portion b160 that matches the limiting portion b250. The limiting portion b250 may be in contact with the limited portion b160 when the developing unit b100 moves from the second position to the first position. In one embodiment, there are two sets of the limiting portions b250 and the limited portions b160, which are respectively disposed at the driving end and the conductive end of the process cartridge. At the driving end, the photosensitive frame b210 may be disposed with the limiting portion b250 at the upper edge along the third direction; the limiting portion b250 may be a protruding structure; the developing protection cover b130 may be disposed with the limited portion b160 that matches the limiting portion b250; the limited portion b160 may be a protrusion formed on the outer wall of the developing protection cover b130; the limited portion b160 may extend along the A1 direction; and along the second direction, the limiting portion b250 may be located on the rear side (the side along the B2 direction) of the limited portion b160. At the conductive end, the limiting portion b250 may be disposed at the upper edge of the photosensitive frame b210 along the third direction; the limited portion b160 may be disposed at the upper edge of the developing frame b110 along the third direction; the limited portion b160 may be a protrusion extending along the A2 direction; and along the second direction, the limiting portion b250 may be located on the rear side (the side along the B2 direction) of the limited portion b160. The limited portion b160 may be in contact with the limiting portion b250 when the developing unit b100 moves from the second position to the first position or from the first position to the second position; and the movement of the developing unit b100 may stop when the limited portion b160 is in contact with the limiting portion b250. That is, the contact between the limiting portion b250 and the limited portion b160 may play a limiting role to prevent the developing unit b100 from deviating from the first position or the second position during movement.

Figure 68:
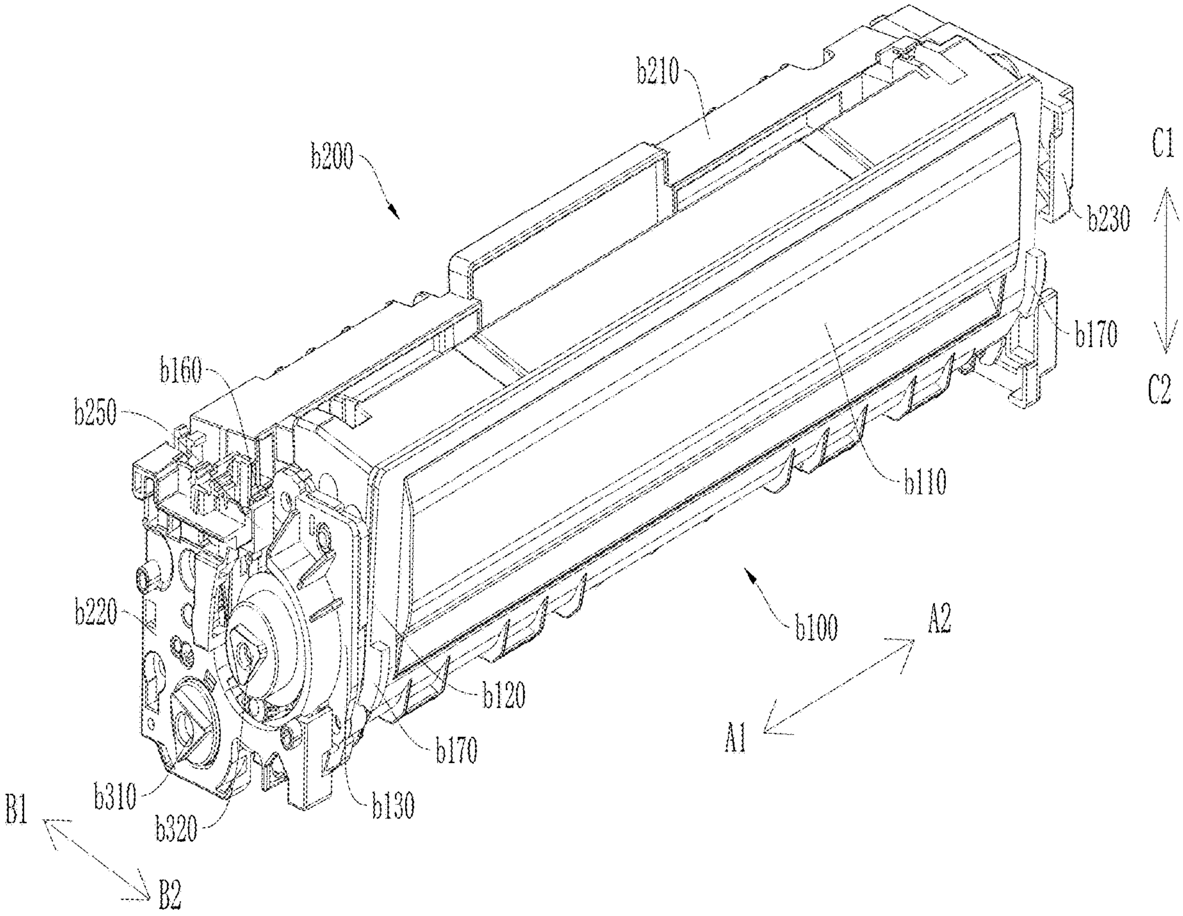
FIG. 68 illustrates an overall structural schematic of a process cartridge according to exemplary embodiment fifteen of the present disclosure.
Figure 69:
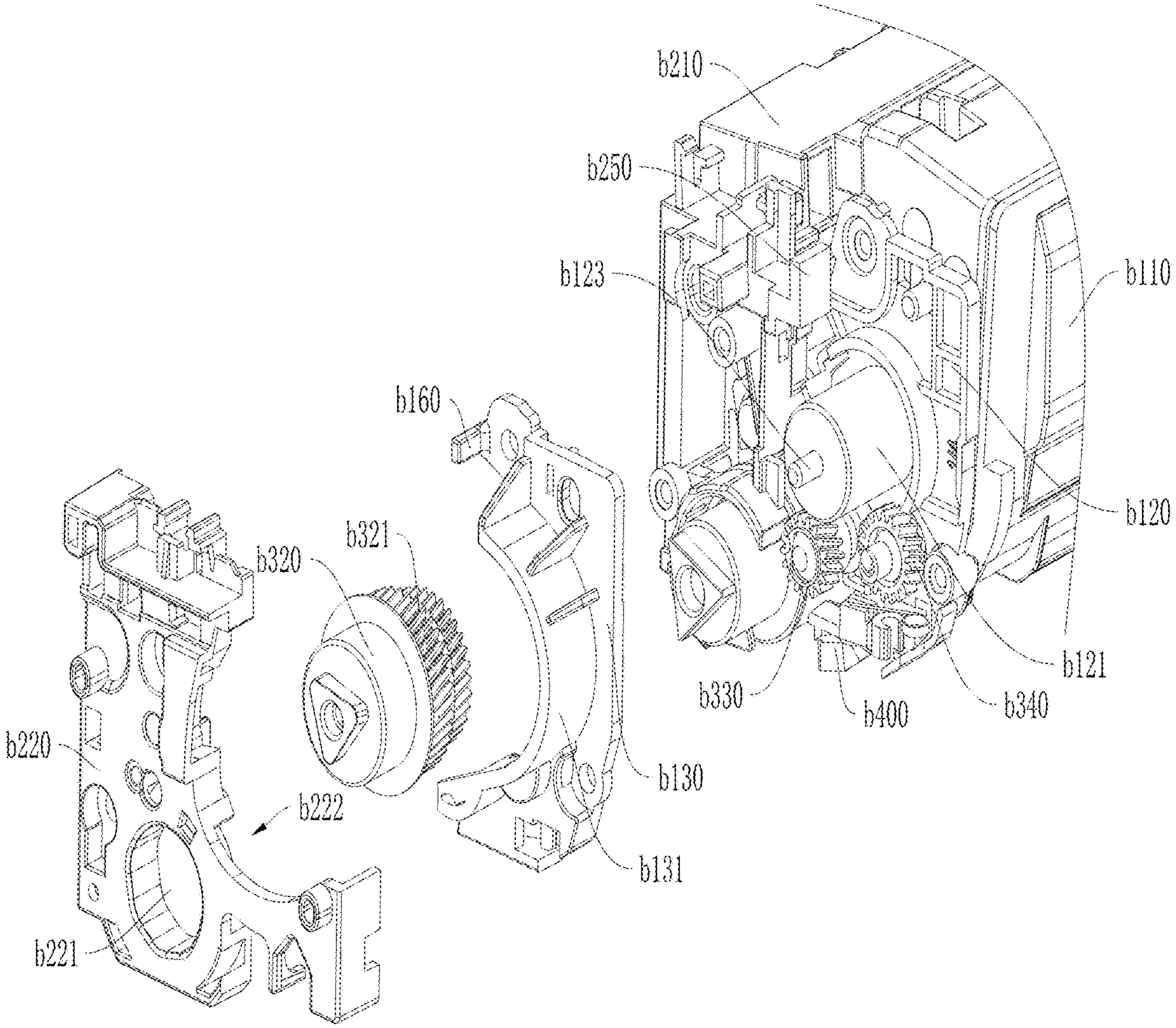
FIG. 69 illustrates a partial exploded structural schematic of a driving end of a process cartridge according to exemplary embodiment fifteen of the present disclosure.

Furthermore, as shown in FIG. 68, the side of the developing unit b100 away from the drum unit b200 may be disposed with an arc-shaped protrusion b170. That is, the arc-shaped protrusions b170 may be disposed on the side of the developing frame b110 away from the drum unit b200 and respectively disposed on two ends of the developing frame b110 along the length direction. The surface of the arc-shaped protrusion b170 away from the developing frame b110 may be an arc surface. When the process cartridge is installed on a tray of the electronic image-forming apparatus, the arc surface of the arc-shaped protrusion b170 may be abutted against a separation plate on the tray. When the developing unit b100 moves relative to the drum unit b200, the arc surface of the arc-shaped protrusion b170 may move relative to the separation plate of the tray. The arc-shaped protrusion b170 may be configured to be abutted against the separation plate of the tray to assist and cooperate with the swinging motion of the developing unit b100 relative to the drum unit b200. In such way, when the developing unit b100 receives the separation force of the electronic image-forming apparatus, the developing unit b100 may swing around the connecting portion instead of being driven by the separation force to translate along the direction away from the drum unit b200, thereby achieving desirable drum roller separation effect.

As shown in FIGS. 68-73, when the electronic image-forming apparatus is not operating, the force-applying part may be in contact with the separating part b400 from below and apply force to the separating part b400; after the developing unit b100 is applied by the force, the lower end of the developing unit b100 may swing along the direction away from the drum unit b200 (approximately along the B2 direction) to drive the developing roller to be separated from the photosensitive drum; the upper end of the developing unit b100 may move along the direction adjacent to the photosensitive drum (approximately along the B1 direction) to compress the elastic part b500; and the limited portion b160 may move along the B1 direction with the movement of the developing unit b100 to be separated from the limiting portion b250. Meanwhile, the third supporting portion b650 may move from one end along the B1 direction to another end along the B2 direction in the third guiding portion b660; the fourth supporting portion b670 may move from one end along the B1 direction to another end along the B2 direction within the fourth guiding portion b680; and the connecting portion may play a supporting and positioning role during the movement of the developing unit b100.

As shown in FIGS. 68-73, when the electronic image-forming apparatus needs to operate, the force exerted by the force-applying part on the separating part b400 may be removed; the elastic part b500 may recover from elastic deformation and push the developing unit b100 to move from the second position to the first position; and the developing roller may come into contact with the photosensitive drum. Meanwhile, the third supporting portion b650 may move from one end along the B2 direction to another end along the B1 direction in the third guiding portion b660; the fourth supporting portion b670 may move from one end along the B2 direction to another end along the B1 direction within the fourth guiding portion b680; the limited portion b160 may move with the developing unit until being in contact with the limiting portion b250, such that the developing unit b100 may not continue to move after reaching the first position, and remain in the first position under the force of the elastic part b500; and the developing roller may be always in close contact with the photosensitive drum.

Exemplary Embodiment Sixteen

Another process cartridge is provided in one embodiment. Compared with exemplary embodiment fourteen, the difference is that the connecting assemblies and the structures matched with the connecting assemblies may be different.

Figure 74:
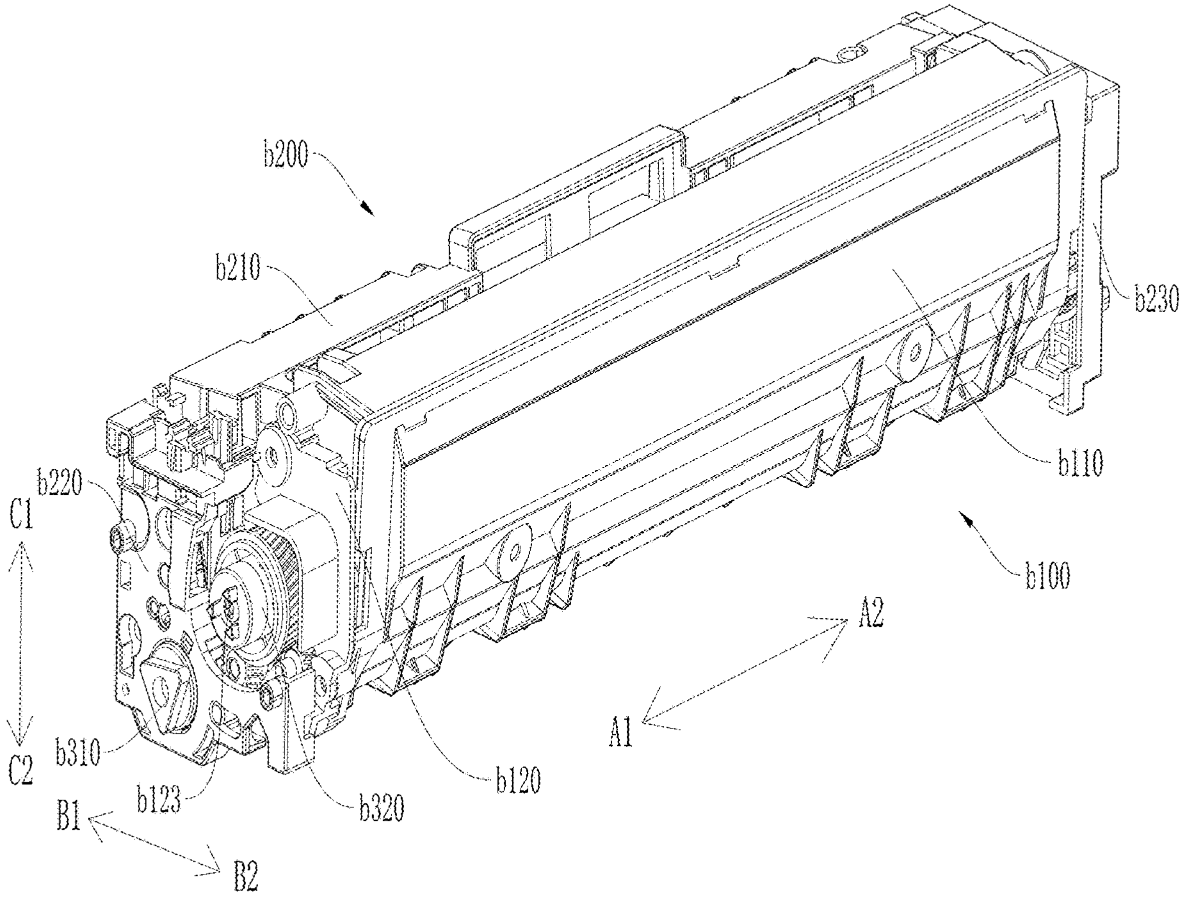
FIG. 74 illustrates an overall structural schematic of a process cartridge according to exemplary embodiment sixteen of the present disclosure.
Figure 75:
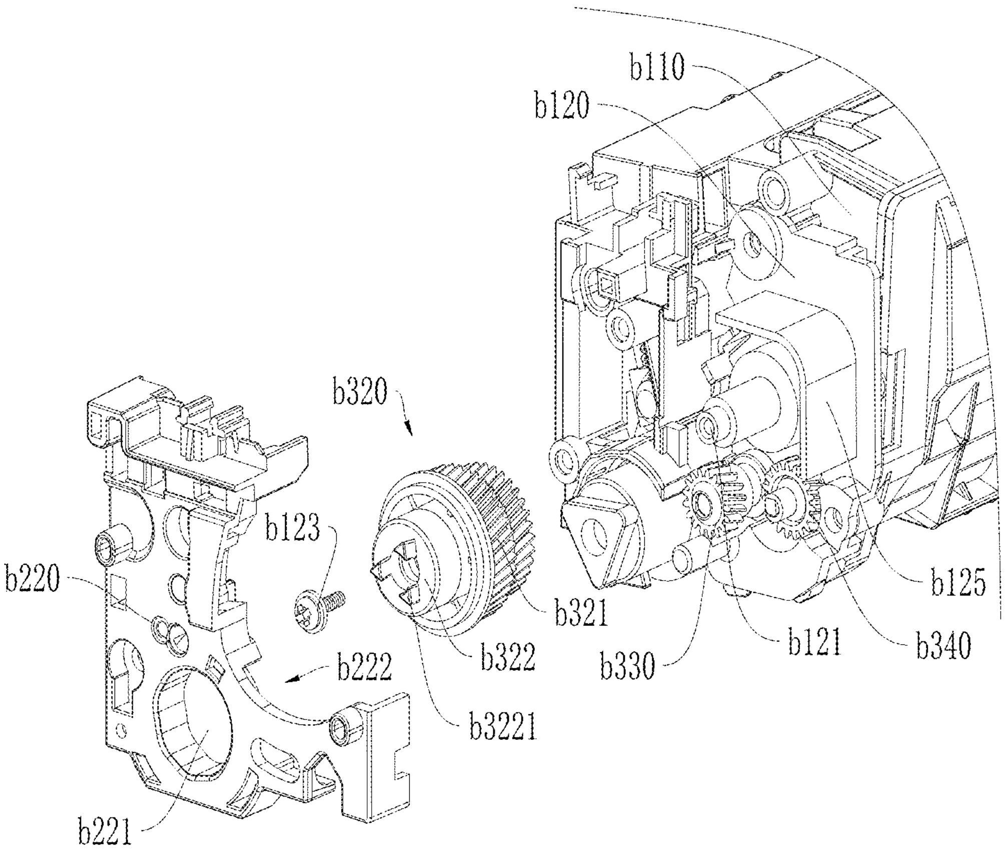
FIG. 75 illustrates a partial exploded schematic of a process cartridge according to exemplary embodiment sixteen of the present disclosure.
Figure 76:
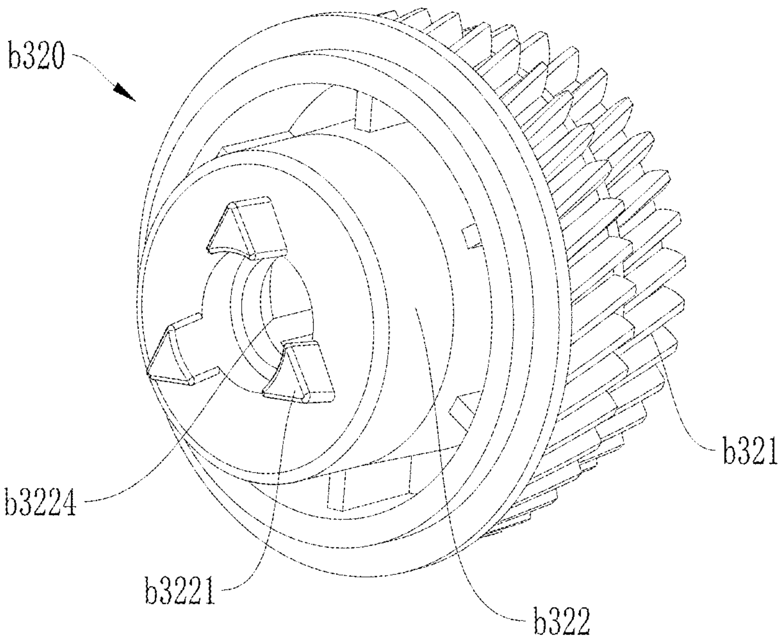
FIG. 76 illustrates a structural schematic of a developing roller coupling of a process cartridge according to exemplary embodiment sixteen of the present disclosure.

In one embodiment, as shown in FIGS. 74-76, the developing roller coupling b320 may include the force-receiving portion b322 and the gear portion b321. The force-receiving portion b322 may be located at an end of the gear portion b321 away from the developing bearing b120. The force-receiving portion b322 may be disposed with a meshing protrusion b3221. The meshing protrusion b3221 may be a triangular protrusion for being meshed with the developing driving head of the electronic image-forming apparatus to receive the driving force for rotation. The gear portion b321 and the force-receiving portion b322 may be formed into a single structure. The teeth of the gear portion b321 may be disposed on the outer circumferential surface of the gear portion b321. The gear portion b321 may be two-level gears, and the two-level gears may be meshed with the developing roller gear b330 and the toner feeding roller gear b340 respectively. When the force-receiving portion b322 rotates, the gear portion b321 may rotate synchronously and drive the developing roller gear b330 and the toner feeding roller gear b340 to rotate. The gear portion b321 may be hollow inside, and a hole b3224 extending along the axial direction and passing through the force-receiving portion b322 may be formed in the center of the force-receiving portion b322. The hole b3224 may be configured for the connecting assembly to pass through and installing the developing roller coupling b320, and the connecting assembly may be overlapped with the rotation axis of the developing roller coupling. In one embodiment, the connecting assembly may be the connecting part b123, and the connecting part b123 may be a pin, a screw, a bolt, or the like.

Figure 77:
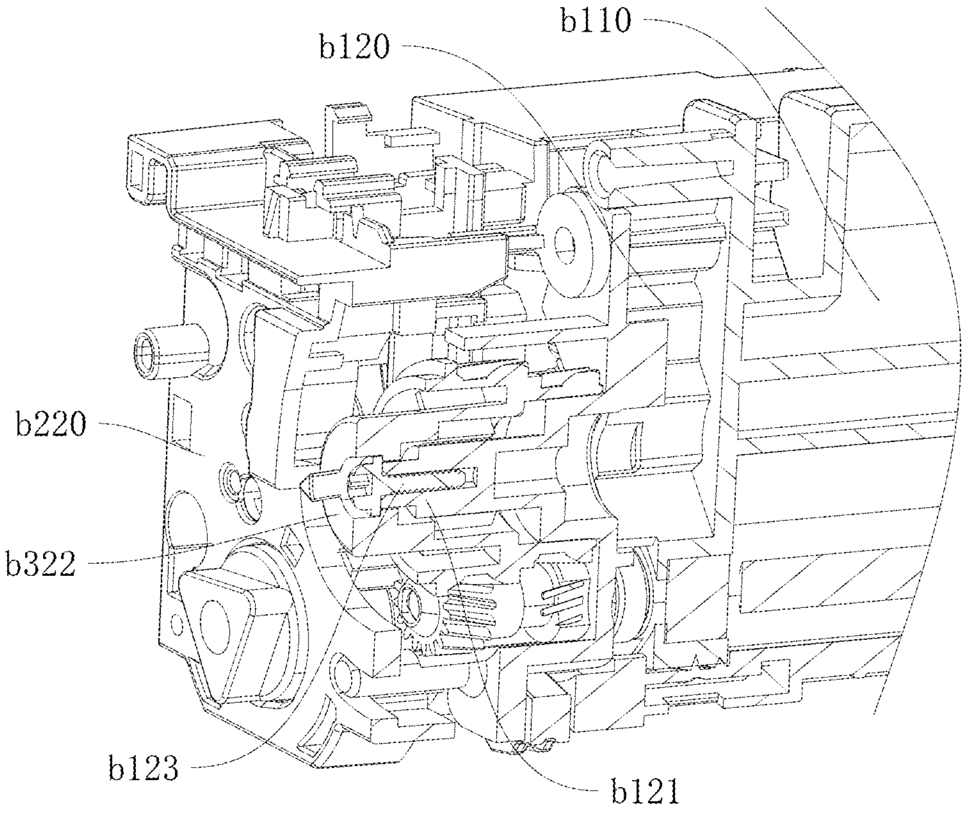
FIG. 77 illustrates a partial cross-sectional view of a process cartridge according to exemplary embodiment sixteen of the present disclosure.

As shown in FIGS. 75 and 77, the developing frame may be disposed with the positioning portion b121 that matches the connecting assembly. In one embodiment, the positioning portion b121 may be disposed on the outer side of the developing bearing b120 (the side facing away from the developing frame b110). The developing roller coupling b320 may be sleeved on the positioning portion b121 and installed on the positioning portion b121 through the connecting assembly. The positioning portion b121 may be a cylindrical connecting column protruding along the A1 direction and on the developing bearing b120. When the developing roller coupling is sleeved on the positioning portion b121, the hole b3224 of the force-receiving portion b322 may be aligned with the positioning portion b121, and the connecting part b123 may pass through the hole b3224 from the outer side (the side of the A1 direction) and then be connected to the positioning portion b121, thereby installing the developing roller coupling b320 on the development bearing b120.

The process cartridge of one embodiment may fasten the developing roller coupling b320 to the developing frame through the connecting assembly, such that the positioning of the developing roller coupling b320 may be more stable. In addition, the connecting assembly may be adjacent to the rotation axis center of the developing roller coupling b320, such that the rotation speed may be relatively slow, and the wear between the connecting assembly and the developing roller coupling b320 may be relatively small.

Exemplary Embodiment Seventeen

Another process cartridge is provided in one embodiment. Compared with exemplary embodiment fourteen, the difference is that the structures of the developing roller couplings and the connection positions of the connecting assemblies may be different.

As shown in FIGS. 78-81, in one embodiment, the developing roller coupling b320 may include the force-receiving portion b322 and the gear portion b321. The force-receiving portion b322 and the gear portion b321 may be disposed separately, and the gear portion b321 may be sleeved on the positioning portion b121 of the developing bearing b320. The connecting assembly (the connecting part b123) may pass through the gear portion b321 from inside the gear portion b321 to fixedly connect the gear portion b321 with the positioning portion b121 of the developing bearing b120.

Figure 78:
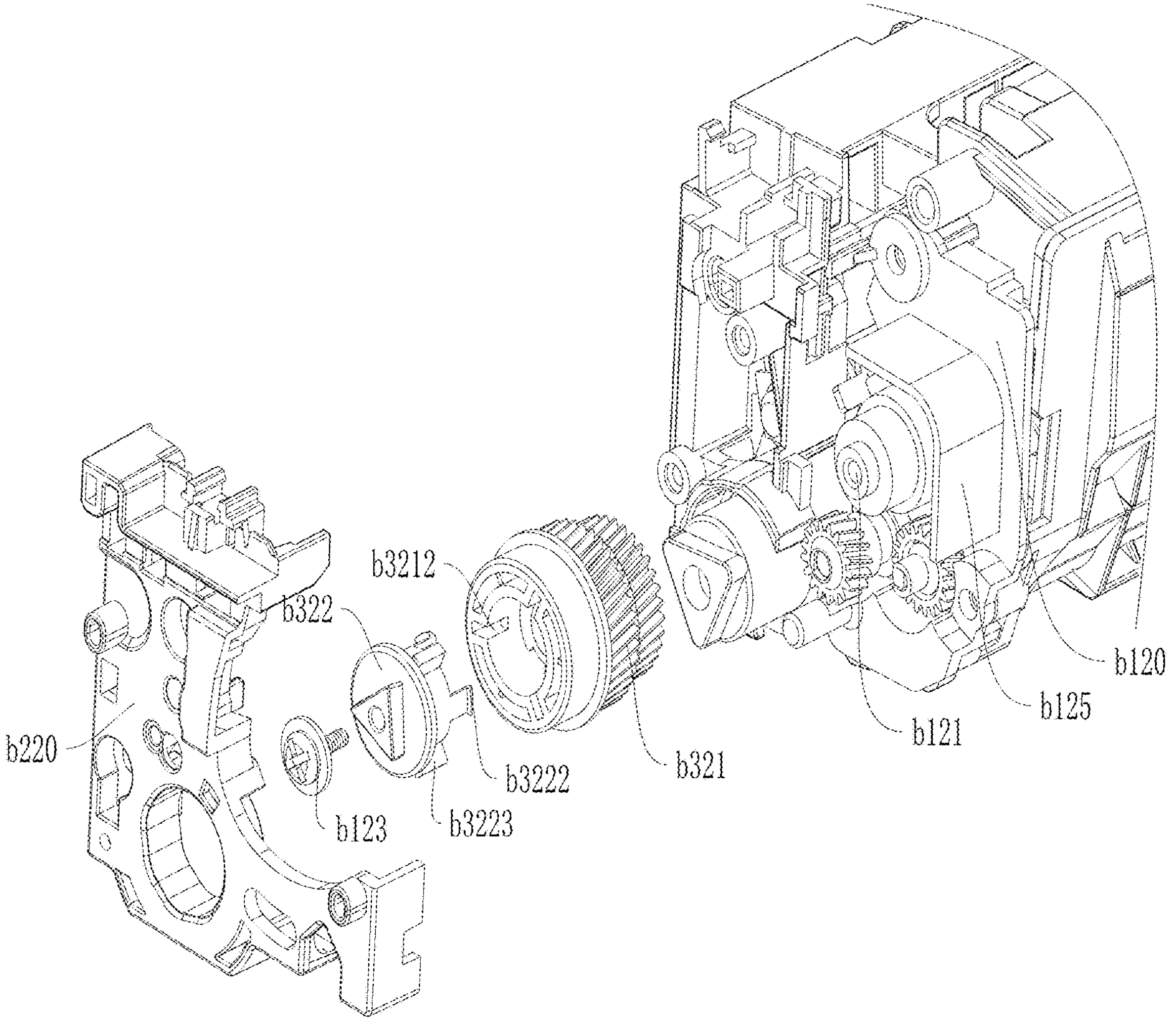
FIG. 78 illustrates a partial exploded schematic of a process cartridge according to exemplary embodiment seventeen of the present disclosure.
Figure 79A:
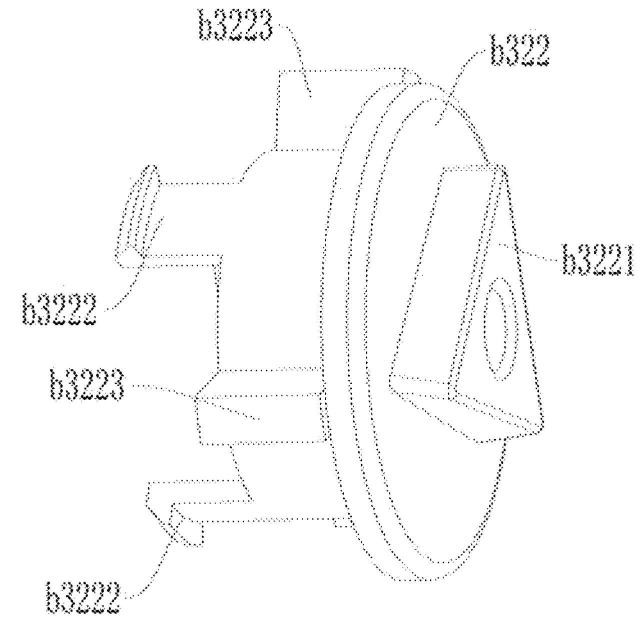
FIG. 79A illustrates a structural schematic of a force-receiving portion of a developing roller coupling according to exemplary embodiment seventeen of the present disclosure.
Figure 79B:
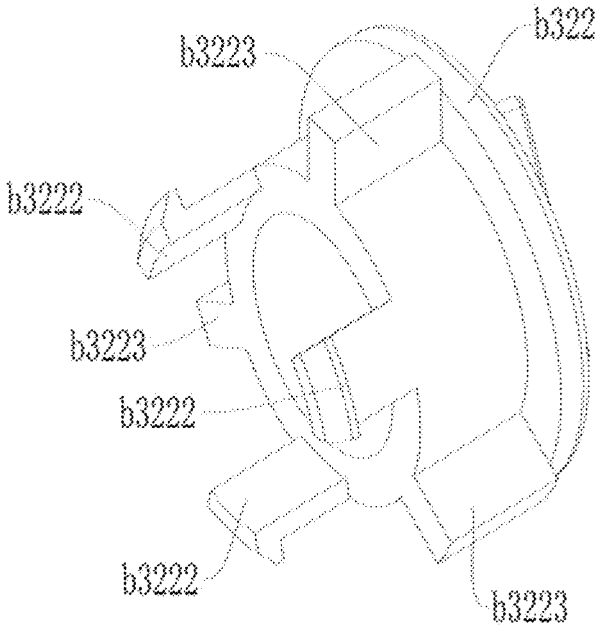
FIG. 79B illustrates another structural schematic of a force-receiving portion of a developing roller coupling according to exemplary embodiment seventeen of the present disclosure.
Figure 80A:
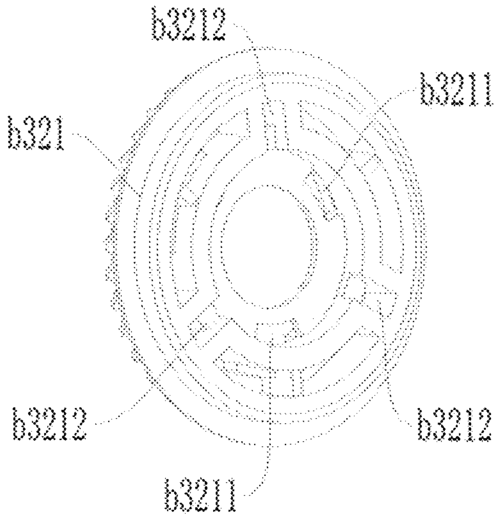
FIG. 80A illustrates a structural schematic of a gear portion of a developing roller coupling according to exemplary embodiment seventeen of the present disclosure.
Figure 80B:
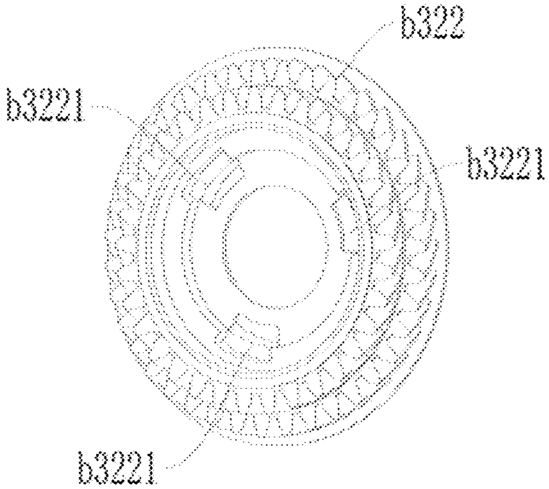
FIG. 80B illustrates another structural schematic of a gear portion of a developing roller coupling according to exemplary embodiment seventeen of the present disclosure.
Figure 81:
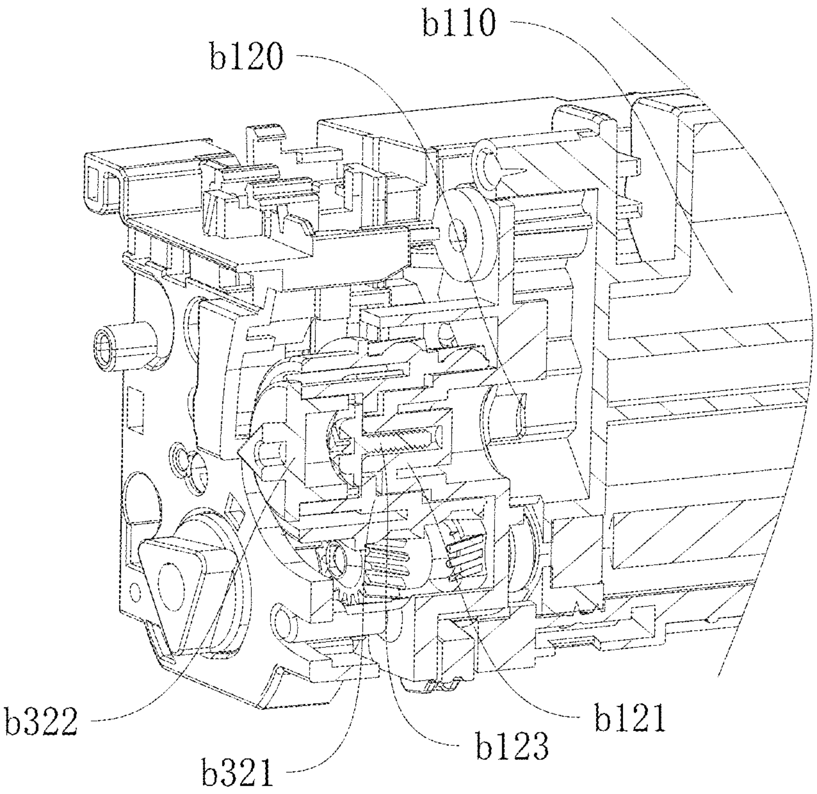
FIG. 81 illustrates a partial cross-sectional view of a process cartridge according to exemplary embodiment seventeen of the present disclosure.

As shown in FIGS. 78-80, the force-receiving portion b322 may be locked and connected to the end of the gear portion b321 away from the developing bearing b120, and the force-receiving portion b322 may be at the outer side of the connecting assembly (the side along the A1 direction and away from the developing bearing b120). The gear portion b321 may be disposed with at least one combining portion b3211, and the force-receiving portion b322 may be disposed with at least one locking portion b3222 that is locked with the combining portion b3211. The combining portion b3211 may be a locking slot or a locking groove formed on the inner wall of the gear portion b321, and the locking portion b3222 may be a buckle or lock formed on the force-receiving portion b322. The buckle or lock may be disposed on the side of the force-receiving portion b322 facing the developing bearing b120. When the force-receiving portion b322 is inserted from the outer side of the gear portion b321 (inserted along the A2 direction) into the gear portion b321, the buckle or lock may be inserted into the locking slot or groove, thereby installing the force-receiving portion b322 on the gear portion b321. The number of locking portions b3222 may be multiple. A plurality of locking portions b3222 may be arranged at intervals along the circumferential direction of the force-receiving portion b322. A matching number of combining portions b3211 may be also disposed at corresponding positions on the inner wall of the gear portion b321. In one embodiment, the number of the locking portions b3222 and the combining portions b3211 may be three.

Furthermore, as shown in FIGS. 78-80, the inner wall of the gear portion b321 may be disposed with at least one limiting portion b3212, and the force-receiving portion b322 may be disposed with at least one limited portion b3223 that matches the limiting portion b3212. Therefore, the gear portion b321 may be driven by the force-receiving portion b322 to rotate synchronously. The limiting portion b3212 may be an inserting groove disposed on the inner wall of the gear portion b321. The inserting groove may extend along the first direction, and the limited portion b3223 may be a protrusion that matches the inserting groove. The protrusion may be disposed on the circumferential surface on the side of the force-receiving portion b322 facing the developing bearing b120. Along the first direction, the limited portion b3223 may be closer to the meshing protrusion b3221 than the locking portion b3222. The limiting portion b3212 may be further away from the developing bearing b120 than the combining portion b3211 along the first direction. One end of the limiting portion b3212 along the A1 direction may be coplanar with one end of the gear portion b321 along the A1 direction. The number of limiting portions b3212 and limited portions b3223 may be multiple (optionally three). The limiting portions b3212 and the limited portions b3223 may be arranged at intervals along the circumferential direction of the gear portion b321 and the force-receiving portion b322. The limiting portions b3212 and the combining portions b3211 may not be overlapped along the circumferential direction; and the limited portions b3223 and the locking portions b3222 may not be overlapped along the circumferential direction. The cooperation between the limiting portions b3212 and the limited portions b3223 may guide the installation of the force-receiving portion b322. During the installation process, the limited portion b3223 may be aligned with and inserted into the limiting portion b3212. The force-receiving portion b322 may move along the limited portion b3223 in the A2 direction until the locking portion b3222 is locked with the combining portion b3211, and the force-receiving portion b322 may be installed in place.

After the force-receiving portion b322 and the gear portion b321 are locked and connected to each other, the limiting portion b3212 and the limited portion b3223 may be locked to prevent the force-receiving portion b322 and the gear portion b321 from relative movement along the circumferential direction, which may play the driving role. That is, the force-receiving portion b322 may drive the gear portion b321 to rotate through the cooperation of the limiting portion b3212 and the limited portion b3223, such that the driving force received by the force-receiving portion b322 may be transferred through the gear portion b321.

Other structures of the process cartridge in one embodiment may be same as corresponding structures in exemplary embodiment fourteen, which may not be described in detail herein.

Exemplary Embodiment Eighteen

Another process cartridge is provided in one embodiment. Compared with exemplary embodiment four, the difference is that the developing roller coupling may be installed on the development frame b110.

Figure 82:
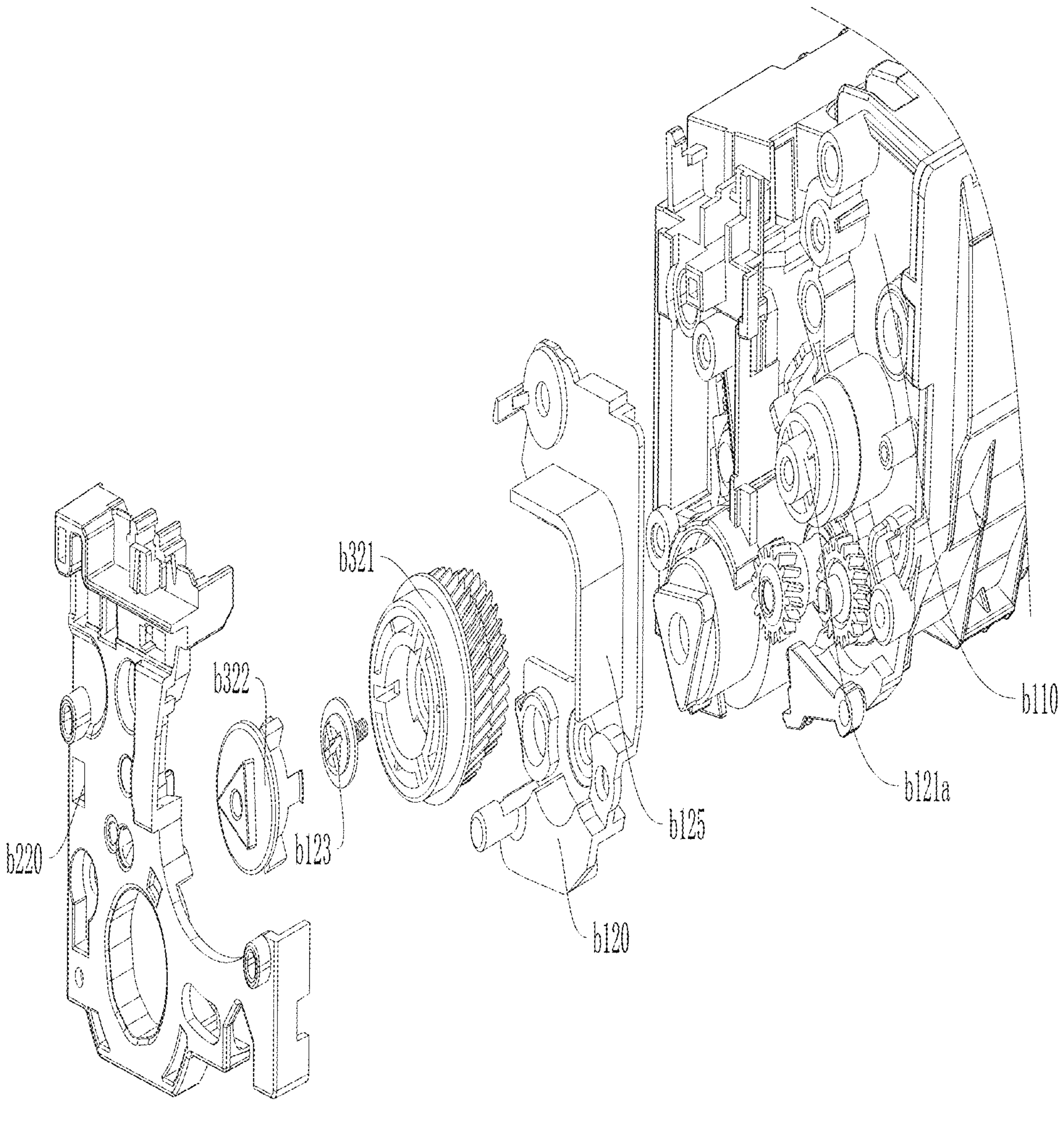
FIG. 82 illustrates a partial exploded schematic of a process cartridge according to exemplary embodiment eighteen of the present disclosure.
Figure 83:
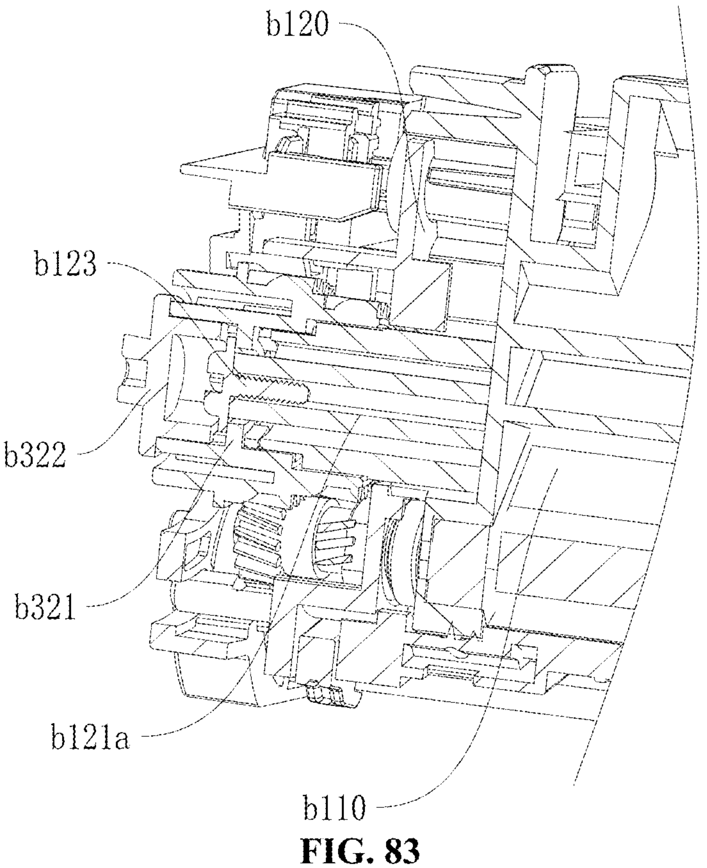
FIG. 83 illustrates a partial cross-sectional view of a process cartridge according to exemplary embodiment eighteen of the present disclosure.

As shown in FIGS. 82-83, in one embodiment, the developing frame b110 may include a positioning portion b121*a* that matches the connecting assembly, and the positioning portion bl21*a* may be disposed on the developing frame b110. The positioning portion bl21*a* may be a cylindrical connecting column formed on the side surface of the developing frame b110 along the A1 direction. The positioning portion b121*a* may protrude along the A1 direction. The developing bearing b120 may be disposed with a hole at the position corresponding to the positioning portion b121*a* and configured for the positioning portion b121*a* to protrude outward. The positioning portion b121*a* may at least partially protrude to the outer side of the developing bearing b120.

The gear portion b321 may be sleeved on the part of the positioning portion b121*a* that protrudes to the outer side of the developing bearing b120. Next, the connecting assembly (the connecting part b123) may pass through the gear portion b321 from the inside and then be fixed on the positioning portion b121*a*, and the force-receiving portion b322 may be locked and connected to the gear portion b321.

Other structures of the process cartridge in one embodiment may be same as corresponding structures in exemplary embodiment fourteen, which may not be described in detail herein.

Exemplary Embodiment Nineteen

Another process cartridge is provided in one embodiment. Compared with exemplary embodiment four, the difference is that the connecting positions of the connecting assemblies may be different.

Figure 84:
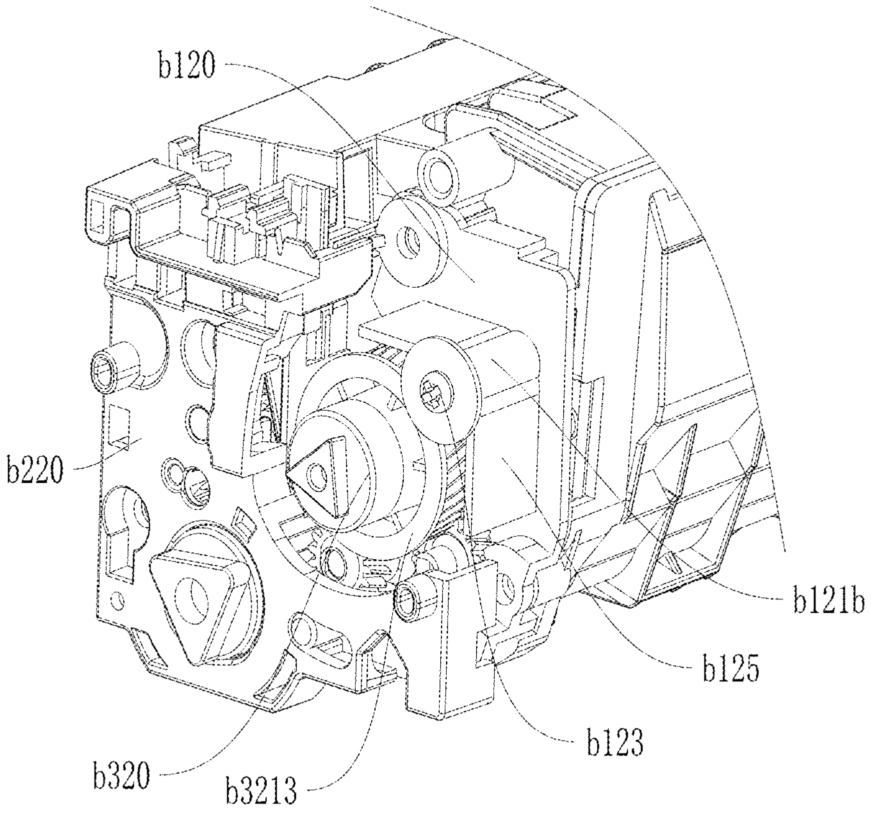
FIG. 84 illustrates a partial structural schematic of a process cartridge from a viewing angle according to exemplary embodiment nineteen of the present disclosure.
Figure 85:
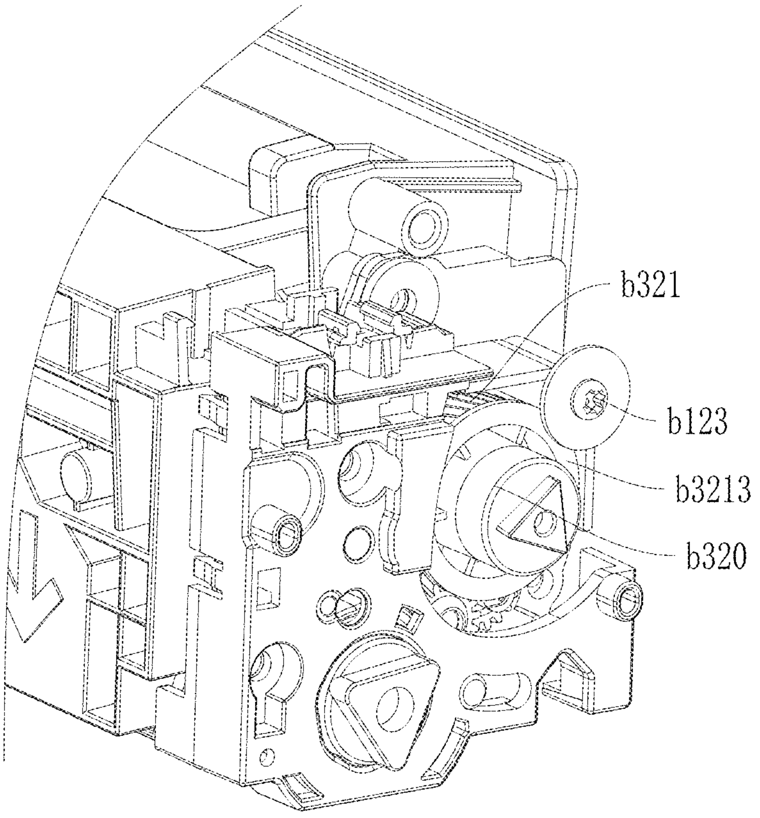
FIG. 85 illustrates a partial structural schematic of a process cartridge from another viewing angle according to exemplary embodiment nineteen of the present disclosure.
Figure 86:
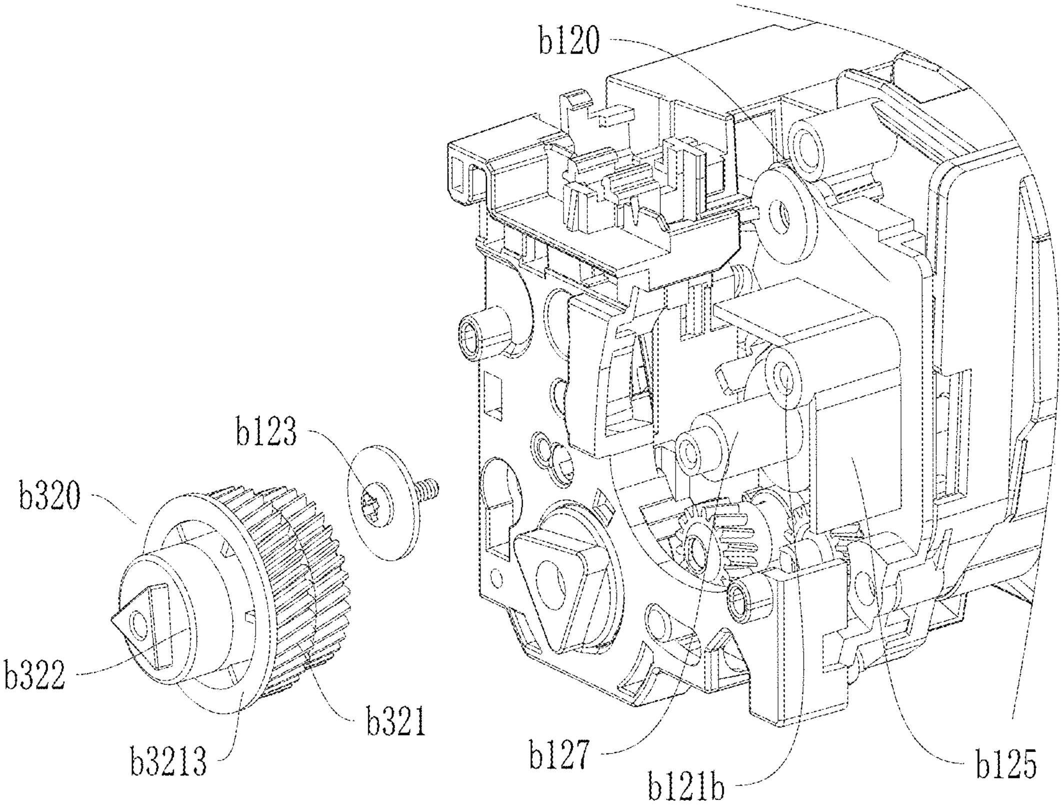
FIG. 86 illustrates a partial exploded schematic of a process cartridge according to exemplary embodiment nineteen of the present disclosure.

As shown in FIGS. 84 to 86, in one embodiment, the developing bearing b120 may be disposed with a supporting portion b127 for supporting the developing roller coupling b320. The supporting portion b127 may be a column protruding from the developing roller coupling b320. The developing roller coupling b320 may be sleeved on the supporting portion b127. The developing bearing b120 may be also disposed with a positioning portion b121*b* that matches the connecting assembly. The positioning portion b121*b* may be on one side (for example, on the rear upper side) of the supporting portion b127. When the developing roller coupling b320 is supported on the supporting portion b127, the positioning portion b121*b* may be also on the rear upper side of the developing roller coupling b320. Optionally, the positioning portion b121*b* may be at the bending position of the L-shaped tooth protection portion b125.

As shown in FIGS. 84-86, when the connecting assembly (the connecting part b123) is connected to the positioning portion b121*b*, the connecting part b123 may be at least partially overlapped with and abutted against the developing roller coupling b320 along the first direction. For example, a protruding edge b3213 may be on the end of the gear portion b321 of the developing roller coupling b320 away from the developing bearing b120. At least a portion of the connecting part b123 may be on the side of the A1 direction of the protruding edge b3213 and abutted against the protruding edge b3213, thereby preventing the developing roller coupling b320 from being separated from the supporting portion b127.

The connecting part b123 may be a bolt with a gasket, or a bolt with a larger nut diameter. During assembly, a part of the gasket or nut may be overlapped with and abutted against the developing roller coupling.

In one embodiment, the connecting part b123 may be not overlapped with the rotation axis of the developing roller coupling b320 but adjacent to the rotation axis of the developing roller coupling b320, such that the rotation speed may be relatively slow, and the wear of the connecting part b123 and the developing roller coupling b320 may be relatively small.

Other structures of the process cartridge in one embodiment may be same as corresponding structures in exemplary embodiment fourteen, which may not be described in detail herein.

Exemplary Embodiment Twenty

Another process cartridge is provided in one embodiment. Compared with exemplary embodiment nineteen, the difference is that the structures of the connecting assemblies may be different.

Figure 87:
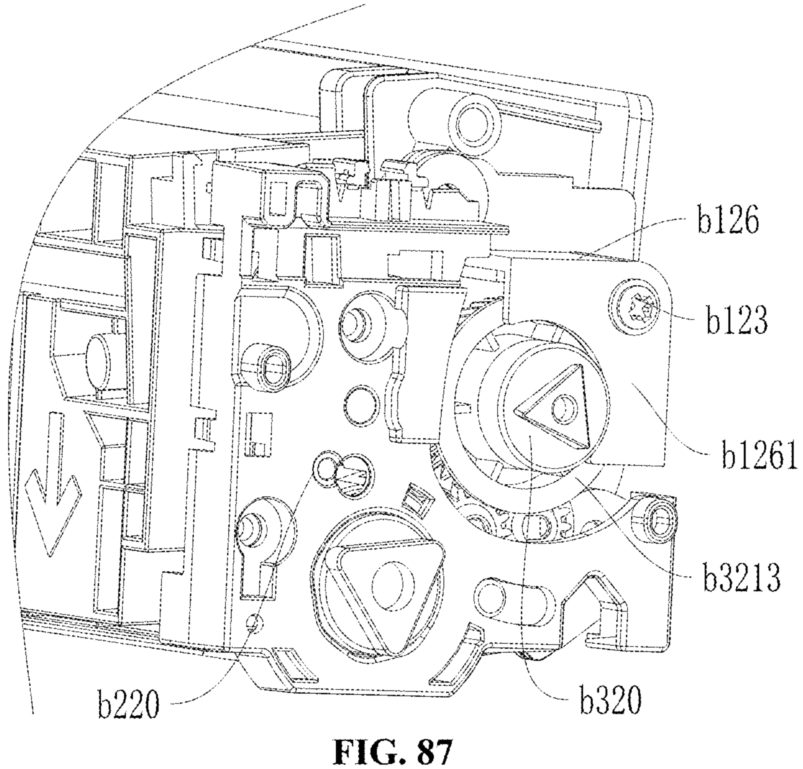
FIG. 87 illustrates a partial structural schematic of a process cartridge according to exemplary embodiment twenty of the present disclosure.
Figure 88:
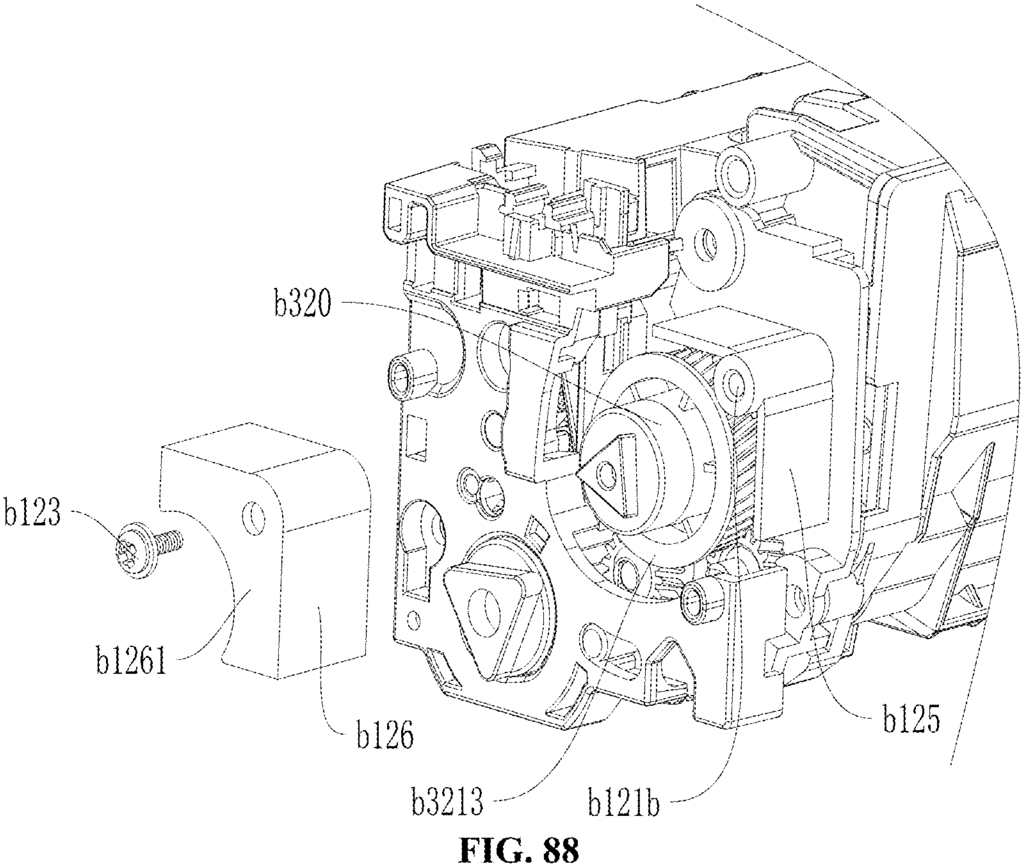
FIG. 88 illustrates a partial exploded schematic of a process cartridge according to exemplary embodiment twenty of the present disclosure.
Figure 89:
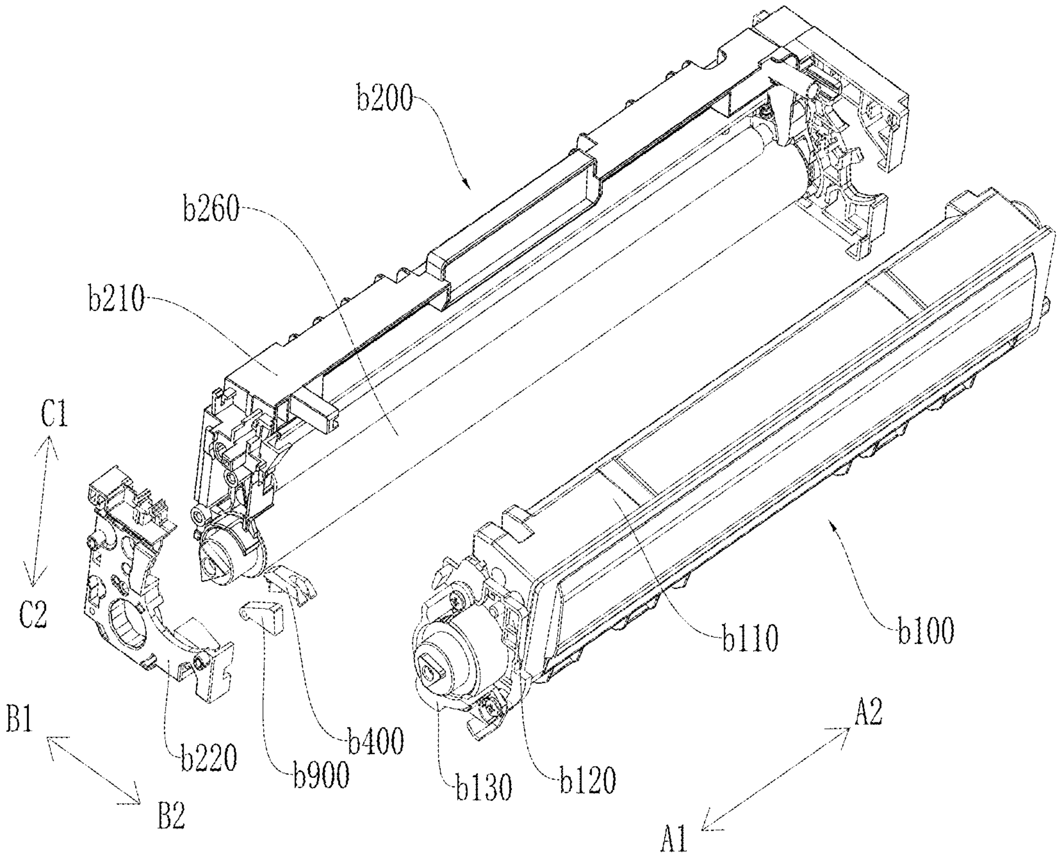
FIG. 89 illustrates an exploded structural schematic of a process cartridge according to exemplary embodiment twenty-one of the present disclosure.
Figure 90:
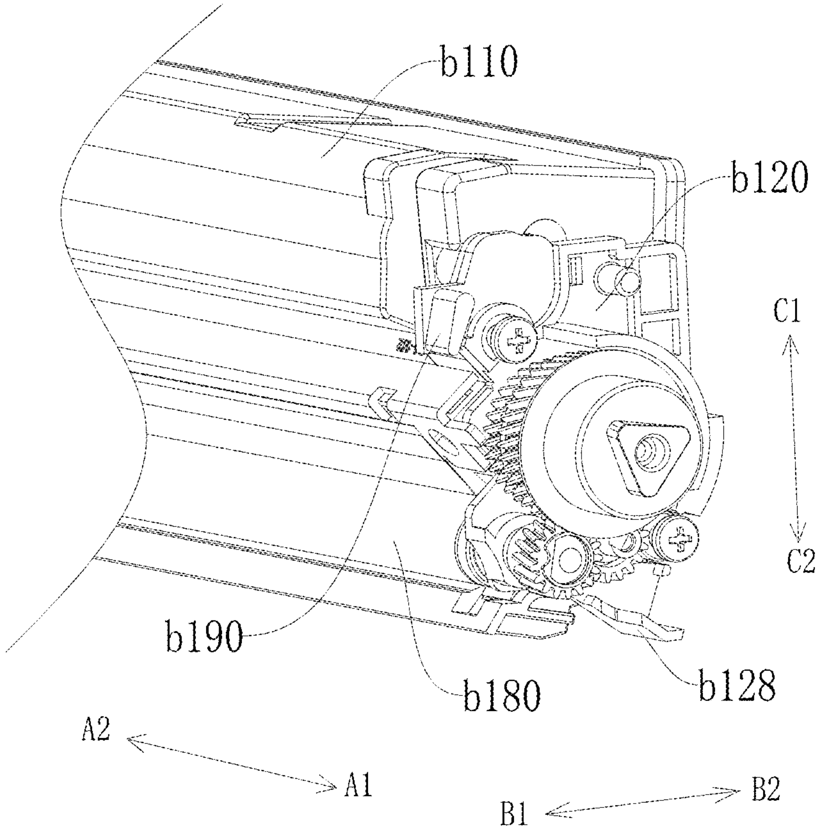
FIG. 90 illustrates a schematic of a driving end of a developing unit according to exemplary embodiment twenty-one of the present disclosure.
Figure 91:
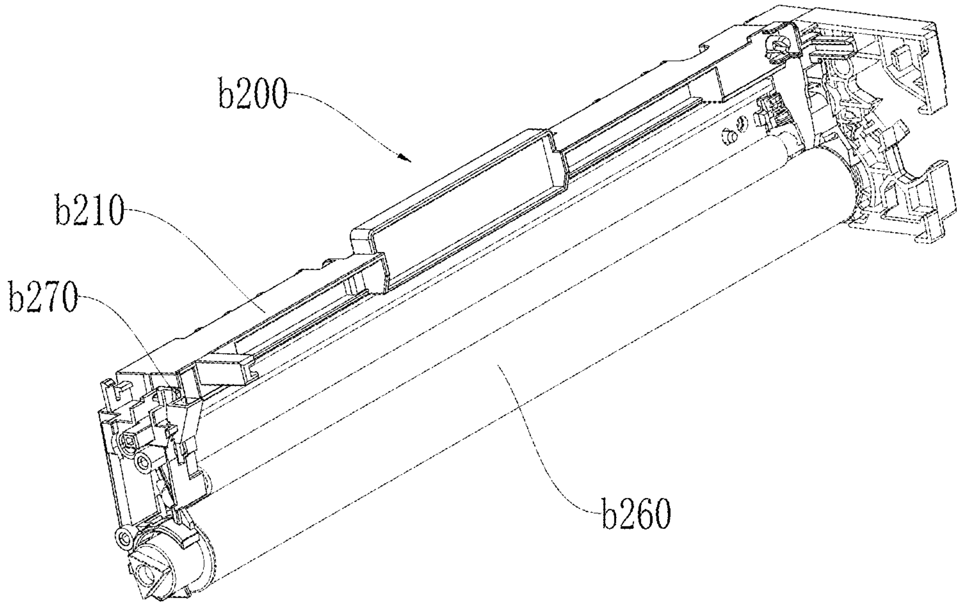
FIG. 91 illustrates a structural schematic of a drum unit according to exemplary embodiment twenty-one of the present disclosure.
Figure 92:
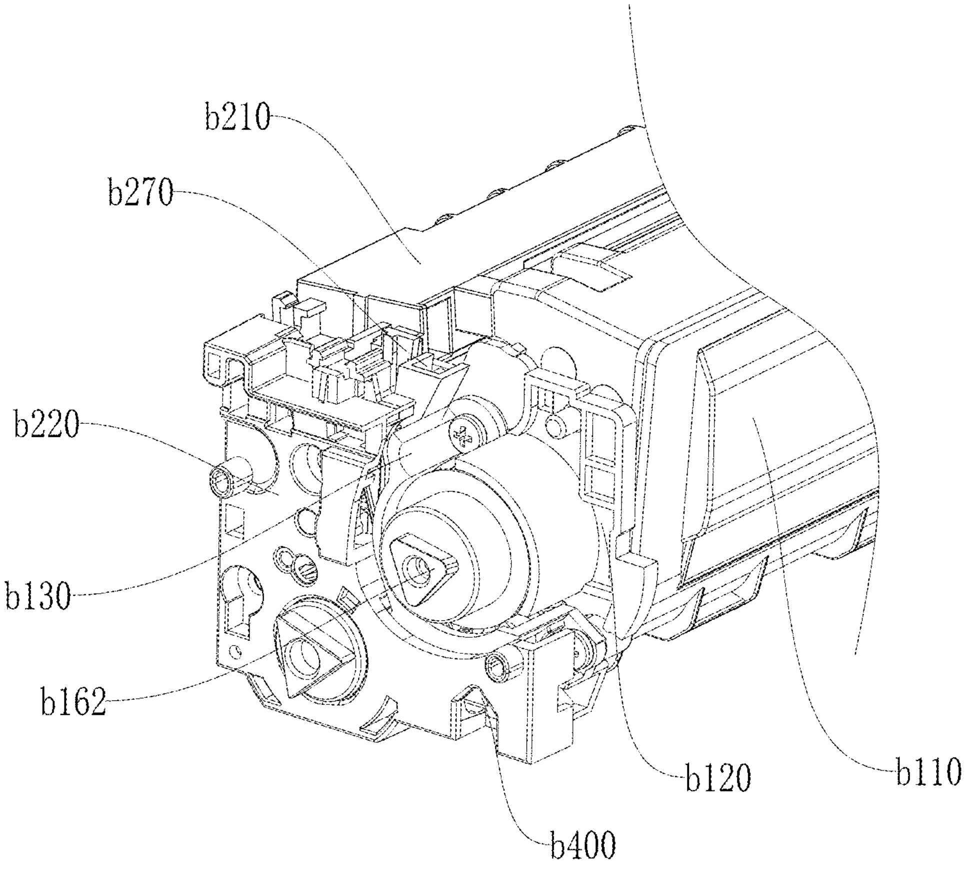
FIG. 92 illustrates a schematic of a driving end of a process cartridge according to exemplary embodiment twenty-one of the present disclosure.

As shown in FIGS. 87-88, in one embodiment, the connecting assembly may include the connecting part b123 and an abutting part b126. The connecting part b123 may fix the abutting part b126 on the developing bearing b120, and the abutting part b126 may be disposed with a hole portion.

During installation, the hole portion may be aligned with the positioning portion b121*b*; and the connecting part b123 may pass through the hole portion and the positioning portion b121*b* from the outer side and fix the abutting part b126 on the positioning portion b121*b*.

As shown in FIGS. 87-88, the shape of the abutting part b126 may be matched with the tooth protection portion b125 and cover the tooth protection portion b125. In addition, the end of the abutting part b126 away from the development bearing b120 may be also disposed with an abutting surface b1261. At least a portion of the abutting surface b1261 may extend to a position overlapping the developing roller coupling b320. The edge of the abutting surface b1261 adjacent to the developing roller coupling b320 may be an arc-shaped edge matched with the developing roller coupling. The central angle corresponding to the arc edge may be approximately 90°; that is, the central angle corresponding to the portion where the contact surface b1261 is abutted against the protruding edge b3213 of the gear portion b321 of the developing roller coupling b320 may be approximately 90°. Compared with exemplary embodiment nineteen, the overlapping and abutting area between the connecting assembly and the developing roller coupling b320 may be increased, which may make the developing roller coupling b320 to be installed more firmly on the developing bearing b120.

Other structures of the process cartridge in one embodiment may be same as corresponding structures in exemplary embodiment fourteen, which may not be described in detail herein.

Exemplary Embodiment Twenty-One

The process cartridge in above-mentioned embodiments uses the elastic part to realize the contact between the developing roller and the photosensitive drum and reset the separating part, which may cause problems such as relatively high cost, relatively short lifetime of the elastic part and the like. Long-term of the elastic part may affect apparatus stability. Based on above, a process cartridge, which does not rely on the elastic part to realize contact between the developing roller and the photosensitive drum, is provided in one embodiment.

As shown in FIGS. 89-100, a process cartridge is provided in one embodiment. Compared with exemplary embodiment fourteen, the difference is that the connecting parts, the separating parts, and corresponding matching structures may be different.

In one embodiment, the developing unit b100 may be configured to translate between the first position and the second position relative to the drum unit b200; the translation of the developing unit b100 relative to the drum unit b200 may have a component along the direction of gravity, that is, the translation direction may have the third directional component. The developing unit b100 may move downward from the second position to the first position under the action of its own gravity and remain in the first position; and the developing roller b180 may remain to be in contact with the photosensitive drum b260. The developing unit b100 may move upward from the second position to the first position under the separation force received by the separating part b400, and the developing roller b180 may be separated from the photosensitive drum b260.

Figure 93:
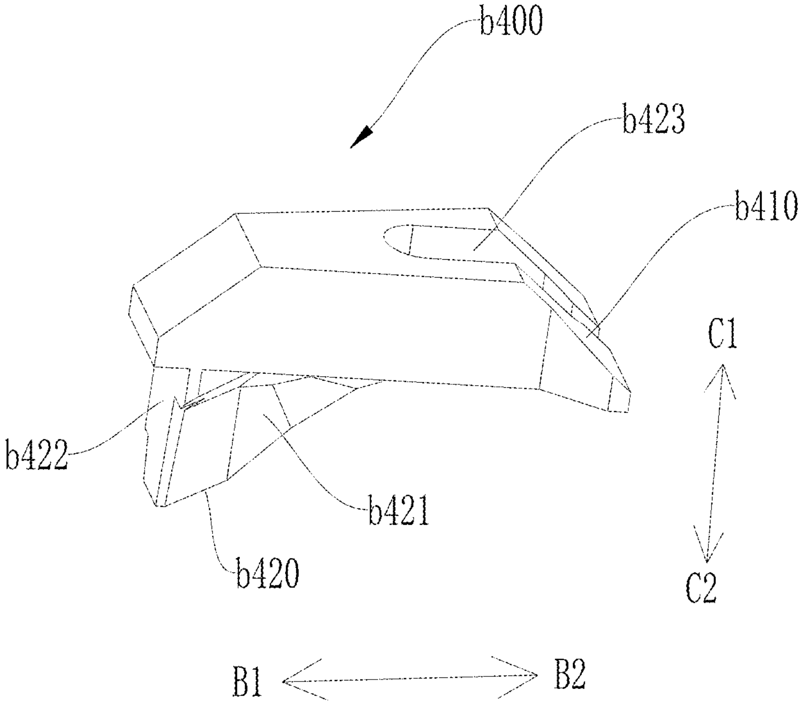
FIG. 93 illustrates a structural schematic of a separating part according to exemplary embodiment twenty-one of the present disclosure.

As shown in FIG. 93, the separating part b400 may be a sliding-block structure, which may be divided into upper and lower parts; and the upper part may be a sliding structure including the first abutting inclined surface b410. The first abutting inclined surface b410 may be on the side of the B2 direction (the rear side) of the separating part b400. The inclination direction of the first abutting inclined surface b410 may be from the side of the B1 and C1 directions to the side of the B2 and C2 directions. The first abutting inclined surface b410 may be configured to be abutted against the developing unit b100 to lift the developing unit b100. A chamfer structure may be also disposed on the side of the B1 direction of the separating part b400 to avoid interference, such that the upper part of the separating part b400 may form an approximately trapezoidal structure, that is, a shape that is narrow at the top and wide at the bottom. The lower part of the separating part b400 include an abutting portion b420. The abutting portion b420 may be configured to be abutted against the force-applying part b900 of the electronic image-forming apparatus and receive the separation force from the force-applying part b900. The abutting portion b420 may include an avoiding surface b421 and a force-receiving surface b422. The avoiding surface b421 may be on the side of the A1 direction of the abutting portion b420 (configured to be facing away from the developing frame b110), and the avoiding surface b421 may be an inclined surface. Optionally, the avoiding surface b421 may be constructed as a curved surface. The force-applying part b900 may move along the avoiding surface b421. When the force-applying part b900 moves along the B1 direction, that is, moves along the forward direction, the abutting portion b420 may swing slightly to facilitate the force-applying part b900 to pass through the separating part b400 along the avoiding surface b421. It can also be understood that the force-applying part b900 may avoid through the slight swing of the avoiding surface b421. When the separating part b400 swings slightly, the separating part b400 may be in contact with the developing unit b100 through the first abutting inclined surface b410; and the pushing force may be between the developing unit b100 and the first abutting inclined surface b410. However, the pushing force of the developing unit b100 on the separating part b400 (the force exerted by the self-weight of the developing unit b100) may be less than the pushing force of the force-applying part b900 on the avoiding surface b421. Therefore, the separating part b400 may be pushed for avoidance, and after the force-applying part b900 moves to be separated from the avoiding surface b421, the separating part b400 may return to the initial position under the gravity of the developing unit b100 (generating a pushing effect on the separating part b400). At this point, the separating part b400 may be in the position where the force-receiving surface b422 can be in contact with the force-applying part b900. The force-receiving surface b422 may be on the side of the B1 direction of the abutting portion b420. The force-receiving surface b422 may be connected to the avoiding surface b421 and adopt a planar structure. When the force-applying part b900 moves along the reverse direction (moves along the B2 direction), the force-applying part b900 may be abutted against the force-receiving surface b422 and exert the separation force, such that the separating part b400 may have tendency to move, thereby having the components moving along the B2 direction and the C1 direction. When the force-applying part b900 stops applying force, the separating part b400 may no longer receive the separation force. Due to the abutting effect of the first abutting inclined surface b410 on the developing unit b100, the first abutting inclined surface b410 may have a gravity component returning along the B1 direction after receiving the gravity of the developing unit b100 and may gradually reset. It can be seen that the separating part b400 may move along a certain direction on the driving-side end cover b220. That is, the separating part b400 may slide on the driving-side end cover b220 and be abutted against the developing unit b100 through the first abutting inclined surface b410. During the movement along the B2 direction, the inclination angle of the first abutting inclined surface b410 may be used, such that the developing unit b100 may have the pushing forces to move along the B2 direction and the C1 direction, thereby lifting the developing unit b100 upward.

Figure 94:
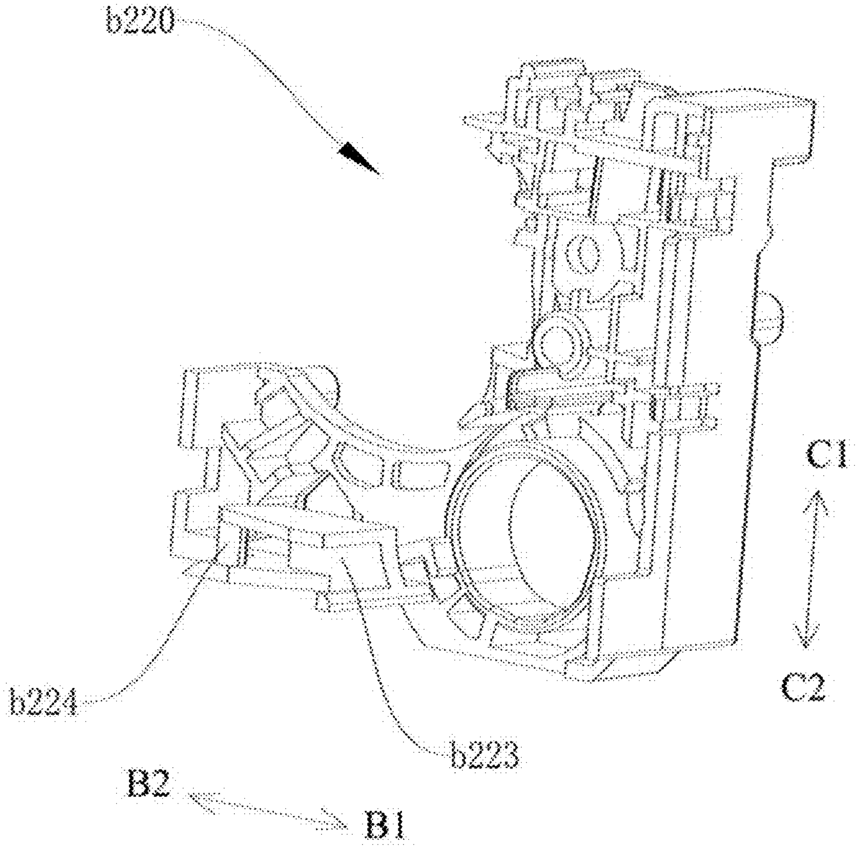
FIG. 94 illustrates a structural schematic of a driving-side end cover according to exemplary embodiment twenty-one of the present disclosure.
Figure 95:
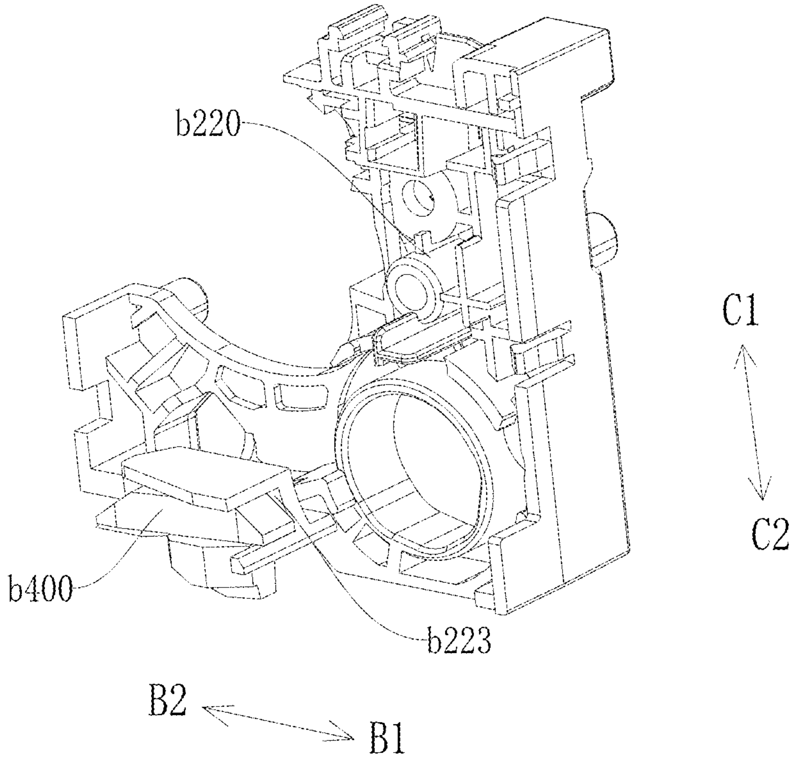
FIG. 95 illustrates a schematic of matching a separating part and a driving-side end cover according to exemplary embodiment twenty-one of the present disclosure.
Figure 96:
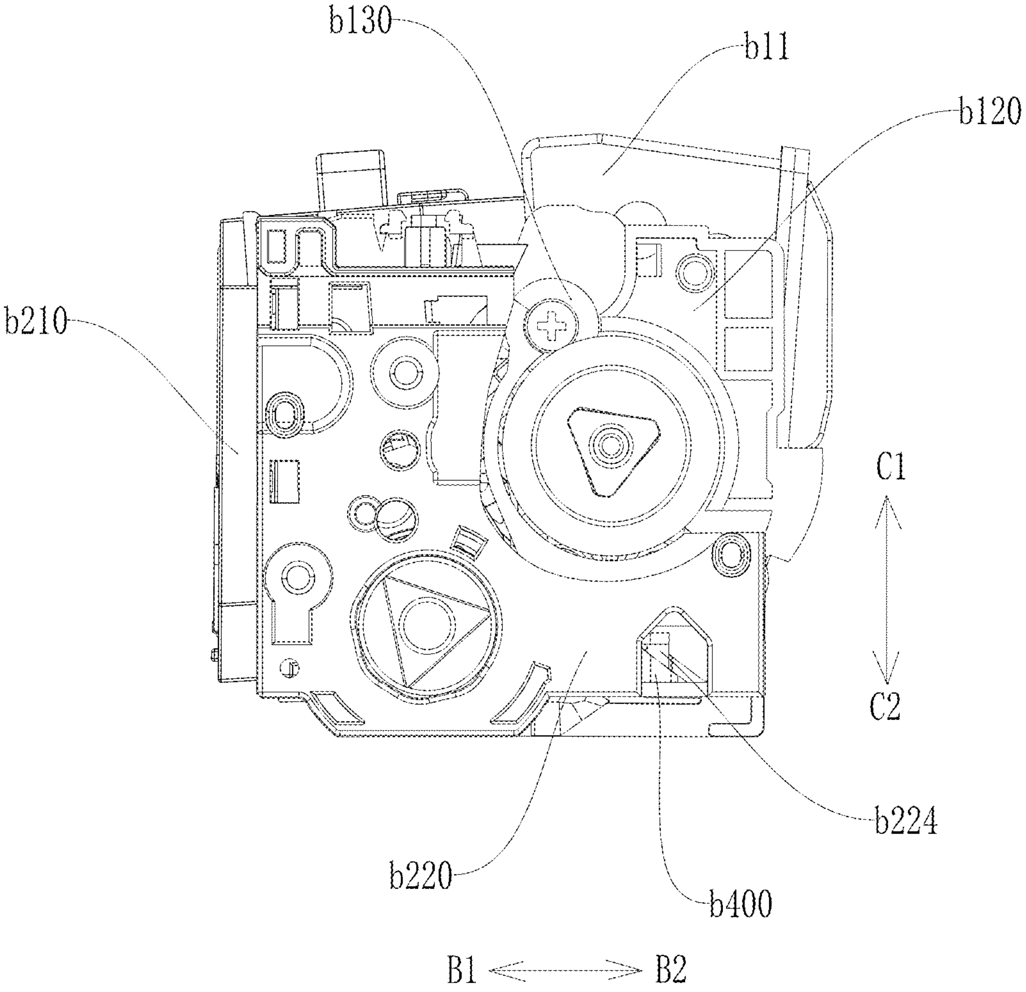
FIG. 96 illustrates a side view of a driving end of a process cartridge according to exemplary embodiment twenty-one of the present disclosure.

Furthermore, as shown in FIGS. 94-95, in order to limit the movement direction of the separating part b400 and facilitate movement on the driving-side end cover b220, a sliding rail b223 may be disposed on the driving-side end cover b220. The sliding rail b223 may be a moving rail on the side of the C2 direction of the driving-side end cover b220. The extension direction of the sliding rail b223 may be along the second direction. The sliding rail may provide a moving space for the separating part b400 and may be matched with the upper structure of the separating part b400. That is, the upper part of the separating part b400 may move in the sliding rail b223. In addition, the lower part of the separating part b400 may be configured to receive the separation force, such that the upper part of the separating part b400 may move, thereby making the first abutting inclined surface b410 to move and lift the developing unit b100. Meanwhile, the sliding rail b223 may limit the movement space of the separating part b400 along the third direction, thereby preventing the separating part b400 from being separated along the third direction. Furthermore, a positioning column b224 may be disposed in the sliding rail b223. The positioning columns b224 may be connected to two sides of the sliding rail b223 along the third direction and are configured to preset the movement direction of the separating part b400. In order to cooperate with the positioning columns b224, a sliding groove b423 may be disposed on the separating part b400. The sliding groove b423 may be a groove structure. The sliding groove b423 may pass through the upper part of the separating part b400 along the third direction, and the side of the B2 direction of the upper part of the separating part b400. That is, the sliding groove b423 may extend to the first abutting inclined surface b410. When in usage, the positioning column b224 may be in the sliding groove b423, and the circumferential side of the positioning column b224 may be in contact with the inner wall of the sliding groove b423. That is, when the separating part b400 moves along the second direction, the positioning column b224 may move relative to the separating part b400 along the sliding groove b423. The positioning column b224 and the sliding groove b423 may define the movement direction of the separating part b400, which may provide a preset sliding trajectory for the separating part b400 and avoid excessive deviation of the separating part b400. Obviously, the structures of the positioning column b224 and the sliding groove b423 may be not limited, as long as the positioning column b224 and the sliding groove b423 can be matched to each other.

Figure 99:
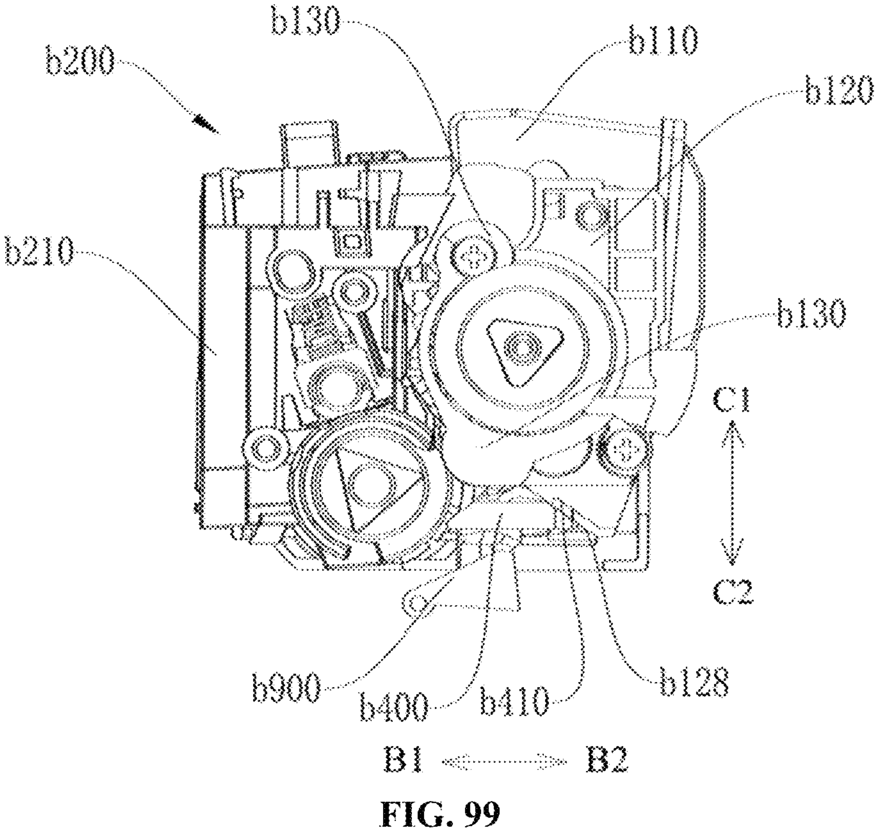
FIG. 99 illustrates a schematic of an initial state of a process cartridge after removing a driving-side end cover according to exemplary embodiment twenty-one of the present disclosure.
Figure 100:
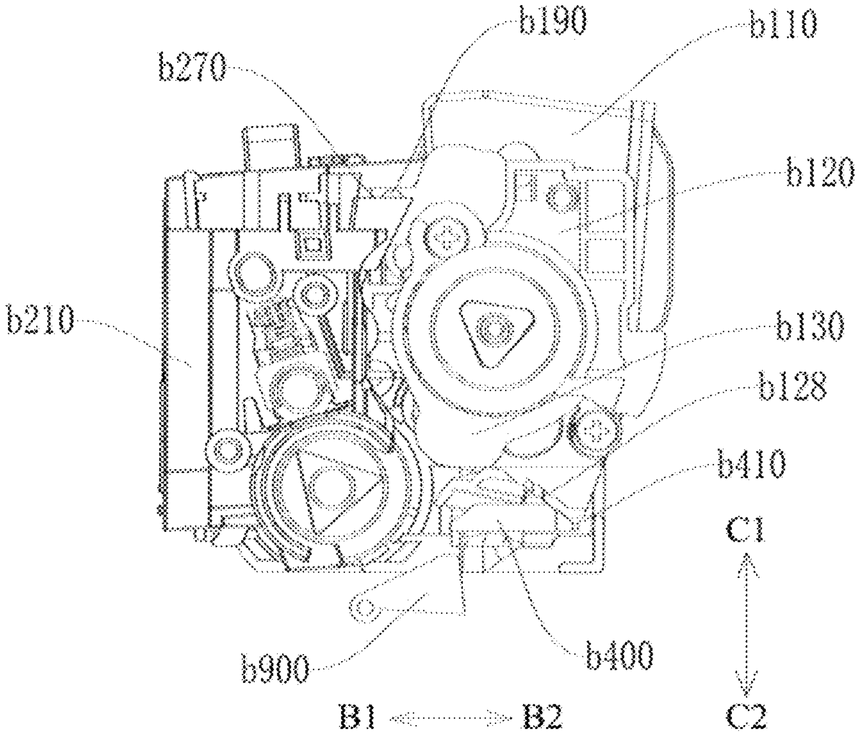
FIG. 100 illustrates a schematic of a separation state of a process cartridge after removing a driving-side end cover according to exemplary embodiment twenty-one of the present disclosure.

In one embodiment, as shown in FIG. 99, the first abutting inclined surface b410 may be in contact with the developing bearing b120, and the developing roller b180 and the photosensitive drum b260 may be separated from each other by lifting the developing bearing b120. The developing bearing b120 may include a second abutting inclined surface b128. The second abutting inclined surface b128 may be on the side of the C2 direction (the lower side) of the developing bearing b120. The second abutting inclined surface b128 may be in parallel with the first abutting inclined surface b410 and abutted against the first abutting inclined surface b410. When the separating part b400 moves along the direction B2, the first abutting inclined surface b410 and the second abutting inclined surface b128 may be in contact with each other and slide along the second abutting inclined surface b128, such that the second abutting inclined surface b128 may be gradually lifted.

Figure 97:
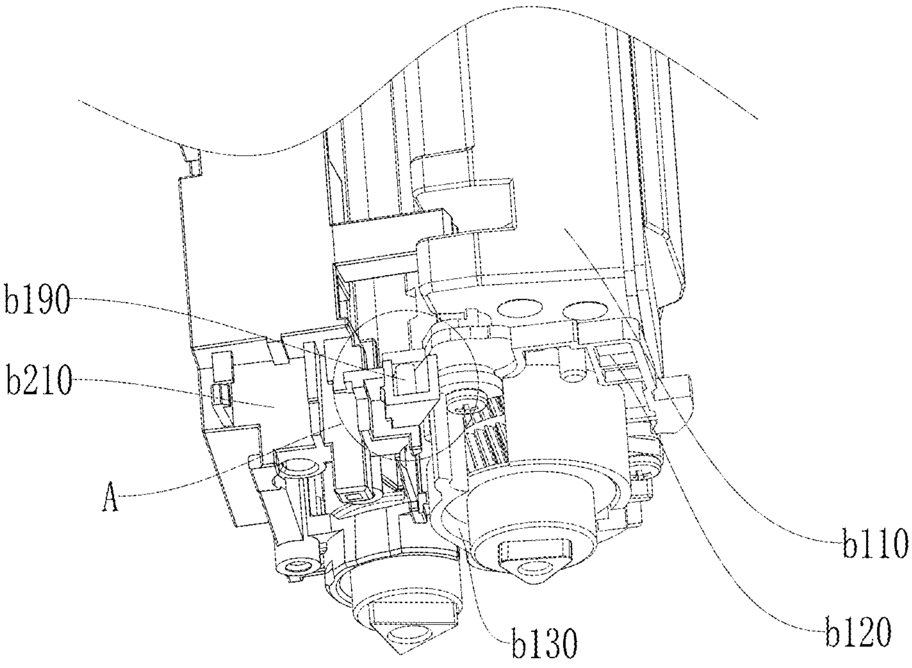
FIG. 97 illustrates a schematic of a driving end of a process cartridge after removing a driving-side end cover according to exemplary embodiment twenty-one of the present disclosure.

Furthermore, as shown in FIG. 97, in one embodiment, the developing unit b100 and the drum unit b200 may be movably connected through the connecting portion; and the developing unit b100 and the drum unit b200 may move relatively along the third direction. For example, the connecting portion may include the fifth supporting portion b190 and the fifth guiding portion b270. The developing bearing b120 may be disposed with the fifth supporting portion b190, and the photosensitive frame b210 may be disposed with the fifth guiding portion b270. The fifth supporting portion b190 and the fifth guiding portion b270 may be inserted and cooperated with each other to realize detachable connection of the developing bearing b120 and the photosensitive frame b210, which may be configured for the separating part b400 to lift the developing unit b100 without being separated from each other. In one embodiment, the fifth supporting part b190 may be constructed as a protrusion b190. The protrusion b190 may be closer to the side of the C1 direction of the developing bearing b120. Along the second direction, the protrusion b190 may be on the side of the B1 direction of the developing bearing b120. The protrusion b190 may be a structure protruding along the A1 direction, and the shape of the protrusion b190 may be not limited in the present disclosure. The outer contour of the protrusion b190 may be disposed with a smooth rounded structure to facilitate sliding up and down. The fifth guiding portion b270 may be constructed as a locking groove b270. The locking groove b270 may be a groove structure on the photosensitive frame b210. The locking groove b270 may be closer to the side of the C1 direction of the photosensitive frame b210, and the locking groove b270 may extend and recess toward the C2 direction. Along the second direction, the locking groove b270 may be on the B2 side of the photosensitive frame b210, which may correspond to the position of the protrusion b190. The side of the C1 direction and the side of the A2 direction of the locking groove b270 may be both hollow structures, such that the protrusion b190 may be inserted from the upper side and move relatively along the third direction. It can be seen that the development unit b100 and the drum unit b200 may be removably connected by locking and cooperation of the protrusion b190 and the locking groove b270. When the developing unit b100 is lifted by the separating part b400, the protrusion b190 may move upward in the locking groove b270. Therefore, the cooperation of the protrusion b190 and the locking groove b270 may provide translational condition for the development unit b100 to move. Obviously, the fifth supporting portion may also be constructed as a groove structure, and the fifth guiding portion may also be constructed as a protruding structure, as long as the fifth supporting portion and the fifth guiding portion may be matched and inserted. The fifth supporting portion may also be disposed on the developing frame b110 or the developing protection cover b130; and the fifth guiding portion may also be disposed on the end cover.

Figure 98:
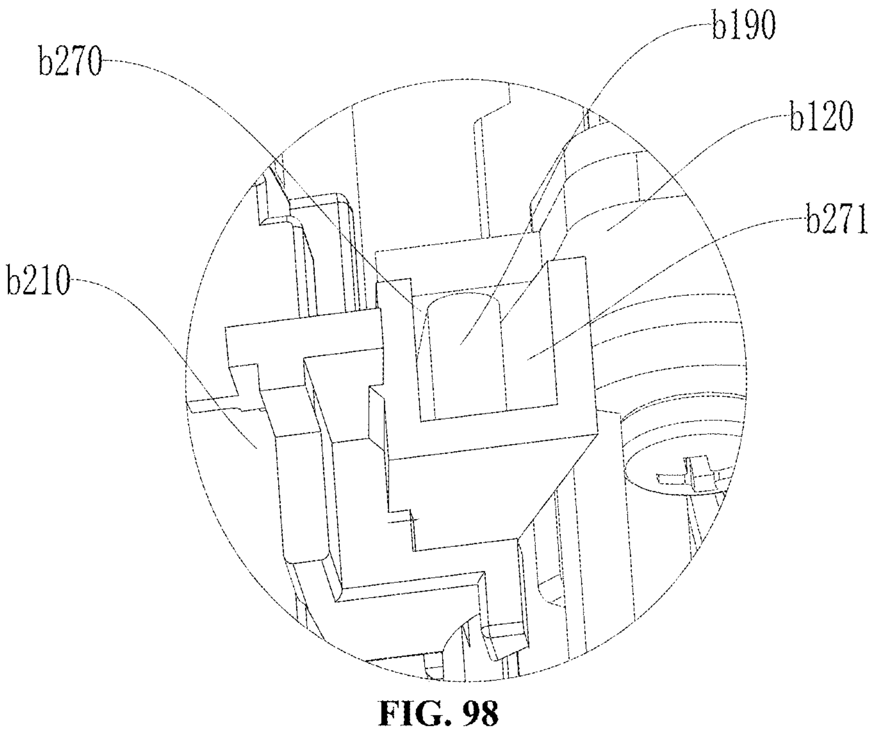
FIG. 98 illustrates an enlarged view of a portion A in FIG. 97.

Optionally, as shown in FIG. 98, the locking groove b270 may be disposed with a sliding inclined surface b271. The sliding inclined surface b271 may be on the B2 side of the locking groove b270. The inclination direction of the sliding inclined surface b271 may be from the side of the C1 and B2 directions to the side of the C2 and B1 directions. The sliding inclined surface b271 may provide space for the protrusion b190 to move along the B1 direction, that is, may allow the developing roller b180 to have deviation space along the B1 direction to achieve desirable drum roller separation effect. For example, due to the lifting effect of the first abutting inclined surface b410, the protrusion b190 may slide along the sliding inclined surface b271 when moving upward. Therefore, the protrusion b190 may have movement component along the B2 direction, and the sliding inclined surface b271 may make the locking groove b270 to form a structure that is wide at the top and narrow at the bottom. In other embodiments, the protrusion b190 may also be constructed an inclined surface structure. Such inclined surface may be in parallel with the sliding inclined surface b271. In addition, the inclined surface of the protrusion b190 may be in contact with the sliding inclined surface b271; and when the protrusion b190 moves upward, the protrusion b190 may desirably match the sliding inclined surface b271. Therefore, the protrusion b190 may have movement components moving along the C1 direction and the B2 direction, which may lift the developing unit b100 obliquely upward, thereby improving the separation effect of the developing roller b180 and the photosensitive drum b260. Furthermore, when the developing unit b100 and the drum unit b200 are detachably connected to each other, that is, when the slot b270 and the protrusion b190 are cooperated with each other, the developing unit b100 and the drum unit b200 may rely on their own gravity to cause the developing roller b180 and the photosensitive drum b260 to be abutted against each other. That is, when there is no developing operation, the separating part b400 may be configured to lift the development unit b100, thereby separating the development roller b180 from the photosensitive drum b260.

As shown in FIGS. 89-100, when the process cartridge is loaded into the printer (electronic image-forming apparatus), that is, after the process cartridge is installed in place, the process cartridge may be in the initial state (the developing roller b180 is in contact with the photosensitive drum b260) by its own gravity; the force-applying part b900 may move along the forward direction (move along the B1 direction); and the force-applying part b900 may push the separating part b400 to deviate along the avoiding surface b421 of the separating part b400. When the force-applying part b900 moves along the sliding avoiding surface b421 to a position separated from the separating part b400, due to the shape of the first abutting inclined surface b410 and the second abutting inclined surface b128 and the gravity of entire developing frame b110, the separating part b400 may reset. After the developing operation is completed, the force-applying part b900 may move along the B2 direction as shown in FIG. 99, thereby being abutted against the force-receiving surface b422 of the separating part b400 and further pushing the separating part b400 to move along the sliding rail b223 in the B2 direction. Meanwhile, the first abutting inclined surface b410 of the separating part b400 may push the second abutting inclined surface b128 of the developing bearing b120, such that the developing bearing b120 may move upward along the preset direction of the slot b270 (the protrusion b190 may move along the sliding inclined surface b271), thereby lifting the developing bearing b120 to realize drum roller separation of the process cartridge. When the developing operation is started, the electronic image-forming apparatus may cancel the separation force of the force-applying part b900, and the development bearing b120 may move downward under the action of gravity; and the separating part b400 may also reset under the pushing force of the developing bearing b120 and return to the initial state. It should be noted that above-mentioned effect on the developing bearing b120 may be equivalent to the effect on the developing frame b110 (entire developing unit b100).

Therefore, the process cartridge of the present application may make the developing roller b180 to be in contact with the photosensitive drum b260 using on its own gravity. That is, the photosensitive drum b260 may be in contact with the developing roller b180 when the electronic image-forming apparatus performs the developing operation, and the photosensitive drum b260 may be separated from the developing roller b180 by the separating part b400 when the developing operation is stopped. Since there is no action of the elastic part, the force that needs to be overcome may be reduced when the (pushing) separation process is performed by the apparatus, which may effectively improve the service life of the apparatus. The movement and reset of the separating part b400 may be achieved by pressing down the developing frame b110 under its own gravity. No elastic part may be needed, such that the structure may be simple with low cost. Failure due to the service life of the elastic part may be eliminated, which may make the processes of process cartridge installation and drum roller separation more stable.

Compared with the existing technology, the technical solutions provided by the present disclosure may achieve at least following beneficial effects.

The developing roller coupling of the process cartridge in the present invention may be rotatably fixedly installed on the developing bearing, and the developing roller coupling may be not supported by the developing protection cover, which may solve the problems in the existing technology that the developing roller coupling is positioned inaccurately, and the driving force cannot be stably transferred due to structural defects of the developing bearing or the developing cover itself.

The above may be only optional embodiments of the present disclosure and may not intended to limit the present disclosure. Any changes or substitutions, which are made by those skilled in the art and within the spirit and principle of the present disclosure, shall be included in the protection scope of the present disclosure.

What is claimed is:

1. A process cartridge, comprising:

a drum unit, including a photosensitive drum and a photosensitive frame;

a developing unit, including a developing roller and a developing frame, wherein the developing unit is capable of moving relative to the drum unit between a first position in which the developing roller contacts the photosensitive drum and a second position in which the developing roller is separated from the photosensitive drum;

a first force-receiving part, configured to receive a rotational driving force and transmit the rotational driving force to the photosensitive drum;

a second force-receiving part, configured to receive the rotational driving force and transmit the rotational driving force to the developing roller; and a driving-side end cover, disposed at one end of the developing unit, wherein the driving-side end cover includes a hole and a notch portion; the notch portion extends upward to an upper end of the driving-side end cover; a portion of the first force-receiving part is exposed to outside of the driving-side end cover through the hole; and a portion of the second force-receiving part is exposed to outside of the driving-side end cover through the notch portion.

2. The process cartridge according to claim 1, wherein: the notch portion further extends backward to a rear end of the driving-side end cover.

3. The process cartridge according to claim 1, wherein: the notch portion is positioned above a rotation axis of the first force-receiving part along a height direction of the process cartridge.

4. The process cartridge according to claim 1, further including:

a connecting portion wherein the developing unit is movably connected with the drum unit; and viewed along a length direction of the process cartridge, the second force-receiving part does not overlap with the connecting portion.

5. The process cartridge according to claim 4, wherein: the connecting portion is positioned below a rotation axis of the second force-receiving part along a height direction of the process cartridge.

6. The process cartridge according to claim 4, wherein: the connecting portion is closer to a lower end of the driving-side end cover than a rotation axis of the second force-receiving part along a height direction of the process cartridge.

7. The process cartridge according to claim 1, wherein: a developing protection cover is further disposed on a side of the developing frame; the developing protection cover is provided with a supporting column; the driving-side end cover is provided with a guiding portion; the supporting column is inserted in the guiding portion; and the guiding portion limits the relative movement of the supporting column.

8. The process cartridge according to claim 7, wherein: the supporting column and the guiding portion are positioned below the second force-receiving part along a height direction of the process cartridge.

9. The process cartridge according to claim 1, wherein: a developing protection cover is further disposed on a side of the developing frame; and viewed along a length direction of the process cartridge, the developing protection cover is at least partially overlapped with the driving-side end cover, or the developing protection cover is partially exposed through the notch portion.

10. The process cartridge according to claim 1, wherein: a developing protection cover is further disposed on a side of the developing frame; the developing protection cover includes a cylindrical portion and a hole formed in the cylindrical portion; a part of the second force-receiving part extends outward through the hole; and viewed along a length direction of the process cartridge, the cylindrical portion is not overlapped with the driving-side end cover.

11. The process cartridge according to claim 1, further including:

a pushing part, disposing at one end of the developing frame, wherein the pushing part is configured to receive a force to move the developing unit from the first position to the second position.

12. The process cartridge according to claim 11, wherein: the pushing part is disposed below the developing frame or the driving-side end cover along a height direction of the process cartridge; or a portion of the pushing part is exposed to outside of the developing frame from a downward side of the process cartridge.

13. A process cartridge, comprising:

a drum unit, including a photosensitive drum and a photosensitive frame;

a developing unit, including a developing roller and a developing frame, wherein the developing unit is capable of moving relative to the drum unit between a first position in which the developing roller contacts the photosensitive drum and a second position in which the developing roller is separated from the photosensitive drum;

a first coupling, configured to receive a rotational driving force and transmit the rotational driving force to the photosensitive drum;

a second coupling, configured to receive the rotational driving force and transmit the rotational driving force to the developing roller; and a driving-side end cover disposed at one end of the developing unit, wherein the driving-side end cover includes a hole and a notch portion; the notch portion extends upward and backward to an upper end and a rear end of the driving-side end cover; a portion of the first coupling is exposed to outside of the driving-side end cover through the hole; and a portion of the second coupling is exposed through the notch portion.

14. The process cartridge according to claim 13, further including:

a connecting portion wherein the developing unit is movably connected with the drum unit; and viewed along a length direction of the process cartridge, the second coupling does not overlap with the connecting portion.

15. The process cartridge according to claim 14, wherein: the connecting portion is positioned below a rotation axis of the second coupling along a height direction of the process cartridge.

16. The process cartridge according to claim 14, wherein: the connecting portion is closer a lower end of the driving-side end cover than a rotation axis of the second coupling along a height direction of the process cartridge.

17. The process cartridge according to claim 13, further including:

a pushing part, disposing at one end of the developing frame, wherein the pushing part is configured to receive a force to move the developing unit from the first position to the second position.

18. The process cartridge according to claim 13, wherein: the pushing part is disposed below the developing frame or the driving-side end cover along a height direction of the process cartridge.

19. A process cartridge, comprising:

a drum unit, including a photosensitive drum and a photosensitive frame;

a developing unit, including a developing roller and a developing frame, wherein the developing unit is capable of moving relative to the drum unit between a first position in which the developing roller contacts the photosensitive drum and a second position in which the developing roller is separated from the photosensitive drum;

a first coupling, configured to receive a rotational driving force and transmit the rotational driving force to the photosensitive drum;

a second coupling, configured to receive the rotational driving force and transmit the rotational driving force to the developing roller;

a driving-side end cover, disposed at one end of the developing unit, wherein the driving-side end cover includes a hole through which a portion of the first coupling is exposed to outside of the driving-side end cover; and a connecting portion, wherein the developing unit is movably connected with the drum unit; the connecting portion is disposed at one end of the process cartridge; and the connecting portion is positioned below a rotation axis of the second coupling along a height direction of the process cartridge.

20. A process cartridge, comprising:

a drum unit, including a photosensitive drum and a photosensitive frame;

a developing unit, including a developing roller and a developing frame, wherein the developing unit is capable of moving relative to the drum unit between a first position in which the developing roller contacts the photosensitive drum and a second position in which the developing roller is separated from the photosensitive drum;

a connecting portion at which the developing unit is movably connected with the drum unit, the connecting portion is disposed at one end of the process cartridge;

a first coupling, configured to receive a rotational driving force and transmit the rotational driving force to the photosensitive drum;

a second coupling, configured to receive the rotational driving force and transmit the rotational driving force to the developing roller; and a driving-side end cover, disposed at one end of the developing unit, wherein the driving-side end cover includes a hole and a notch portion; the notch portion extends upward to an upper end of the driving-side end cover or extends backward to a rear end of the driving-side end cover; a portion of the first coupling is exposed to outside of the driving-side end cover through the hole; a portion of the second coupling is exposed to outside of the driving-side end cover through the notch portion.

* * * * *